(12) United States Patent
Halton et al.

(10) Patent No.: US 9,710,435 B2
(45) Date of Patent: Jul. 18, 2017

(54) OBJECT-FIELD-BASED MATHEMATICS SYSTEM

(76) Inventors: P. Karl Halton, Kelowna (CA); Ben Smith, Toronto (CA); Gregory James Fee, Burnaby (CA)

(*) Notice: Subject to any disclaimer, the term of this patent is extended or adjusted under 35 U.S.C. 154(b) by 629 days.

(21) Appl. No.: 12/925,790

(22) Filed: Oct. 29, 2010

(65) Prior Publication Data

US 2012/0107779 A1    May 3, 2012

(51) Int. Cl.
  *G09B 23/02*   (2006.01)
  *G06F 17/21*   (2006.01)
  *G06F 17/10*   (2006.01)
  *G06F 17/24*   (2006.01)

(52) U.S. Cl.
  CPC ............ *G06F 17/215* (2013.01); *G06F 17/10* (2013.01); *G06F 17/24* (2013.01)

(58) Field of Classification Search
  USPC ........................................ 434/188, 191, 202
  See application file for complete search history.

(56) References Cited

U.S. PATENT DOCUMENTS

| | | |
|---|---|---|
| 5,469,538 A | 11/1995 | Razdow |
| 5,827,066 A | 10/1998 | Henter |
| 6,610,106 B1 | 8/2003 | Jenks |
| 2001/0007109 A1 | 7/2001 | Lange |
| 2002/0007385 A1 | 1/2002 | Stoutmeyer |
| 2002/0169822 A1 | 11/2002 | Packard |
| 2003/0041078 A1 | 2/2003 | Child |
| 2003/0088596 A1 | 5/2003 | Child |
| 2003/0210260 A1 | 11/2003 | Palmer |
| 2004/0054701 A1 | 3/2004 | Garst |

OTHER PUBLICATIONS

Screen shot of web-site "www.bagatrix.com/input_system.htm, Bagatrix"; Inc., Coopersburg, PA (USA); Oct. 28, 2010.

*Primary Examiner* — Kesha Frisby
(74) *Attorney, Agent, or Firm* — John S. Reid

(57) ABSTRACT

An apparatus includes a processor, a computer memory, a user interface, and computer-executable instructions which enable a user to formulate mathematical expressions via the user interface. The mathematical expression is composed from objects selected from a library of object types in the memory. The object types include primitive objects and non-primitive objects. Non-primitive objects contain at least one field which in turn can contain additional objects; primitive objects have no fields. The mathematical expression is defined by a computer-readable data structure in the memory, and each object and field has a mathematical significance assigned thereto. The data structure uniquely identifies each object and each field, and includes pointers to define nesting of the objects and fields in the mathematical expression. The computer-executable instructions include steps to identify user inputs with at least some of the objects, and to display the mathematical expression represented by the data structure via the display.

59 Claims, 52 Drawing Sheets

EQN. 1 — $9 - 4\left[\dfrac{3X-5}{X+1}\right]^2$   Fig. 8A

EQN. 1 — $9 - 4\left[\dfrac{3X-5}{X+1}\right]^2$   Fig. 8B

EQN. 1 — $9 - 4\left[\dfrac{3X-5}{X+1}\right]^2$   Fig. 8C

EQN. 1 — $9 - 4\left[\dfrac{3X-5}{X+1}\right]^2$   Fig. 8D

EQN. 1 — $9 - 4\left[\dfrac{3X-5}{X+1}\right]^2$   Fig. 8E

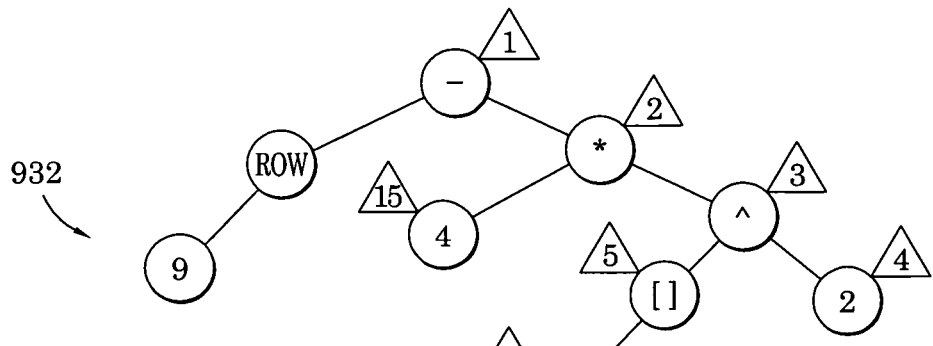
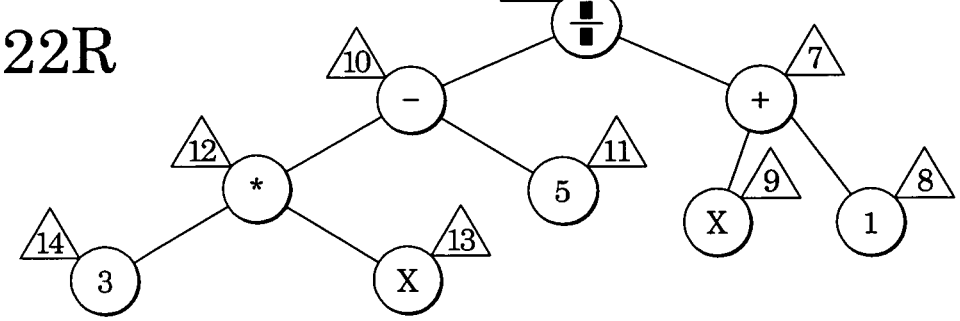
Fig. 22R
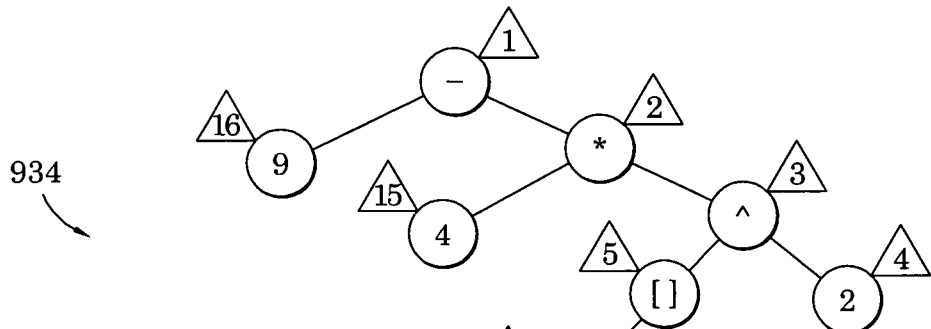
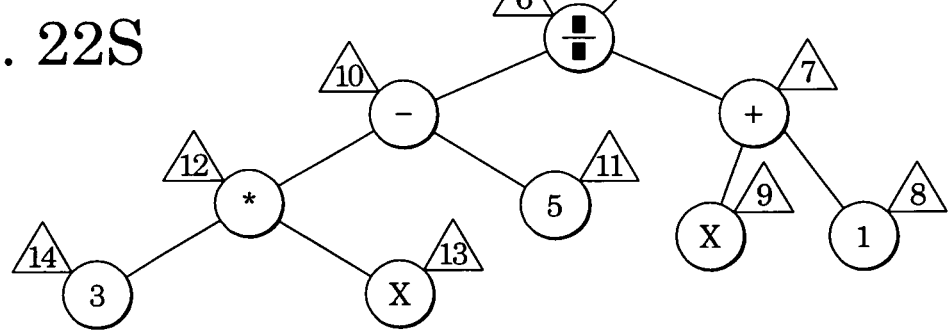
Fig. 22S

OBJECT-FIELD-BASED MATHEMATICS SYSTEM

BACKGROUND

In formulating mathematical expressions it can be useful to employ computer-based programs which allow a user to enter the mathematical expressions for display on a screen. The program should also allow for formatting and editing of the mathematical expressions. These programs are typically and generically identified as equation editors, mathematics editors, and/or expression editors, and are usually based on presentation-tree type object oriented data structures.

In addition to providing equation editors, users frequently have the need of a computer algebra system (CAS) program which allows for the manipulation of mathematical expressions in symbolic form. Such programs typically also can be used to determine a numerical solution to a mathematical equation. These programs are usually based on content-tree type object oriented data structures. One such program is sold under the name "Maple" by Maplesoft of Waterloo, Ontario, Canada.

Mathematical expressions can be represented by different types of expression trees. Conventional expression trees for mathematical expressions can be in the form of presentation trees or content trees. Presentation trees are primarily for entering, editing and displaying (i.e., presenting) the expressions. Content trees are primarily used to allow mathematical expressions to be manipulated and/or solved using a CAS program, or calculated numerically as with a scientific calculator.

U.S. Pat. No. 6,610,106 ("Jenks") describes an "Expression Editor" for creating and editing mathematical formulas, implemented as a computer software program. As a formula is entered by a user, the program forms a first expression tree in the form of a presentation tree which allows editing of the formula. The program also generates a second expression tree in the form of a content tree which allows use with a CAS program. Editing of the mathematical formula results in automatic modification of both of the expression trees.

Prior art equation editors do not inherently take into account mathematical meaning when entering, editing and manipulating mathematical expressions into the editor. It is desirable to provide an equation editor which allows for formatting and editing of mathematical expressions in a manner which enhances comprehension by the user of mathematical fundamentals, and which can also convert a presentation version of the mathematical expressions into content versions for use with CAS programs. Further, prior art mathematics systems need both the presentation tree data structure and the content tree data structure in order to allow editing and solving of mathematical expressions. It is desirable for an expression editor to take into account mathematical meaning so as to provide a more natural user interface. Prior art equation editors inherently do not do this.

Embodiments provided for herein include a class of data structures that can serve as the basis for expression editors as well as for mathematical computation software (both symbolic and numeric). The expression editors allow a user to create and edit mathematical expressions in real time—that is, in so-called "what-you-see-is-what-you-get" or "WYSIWYG" style. Other embodiments include a method for converting between the data structure described herein and a conventional content-tree data structure which can be used with conventional CAS or numerical calculation software.

BRIEF DESCRIPTION OF THE DRAWINGS

FIGS. 8A through 8E depict sequential highlighting of portions of a mathematical expression using a select-more function as provided for herein.

DETAILED DESCRIPTION

One embodiment of the present disclosure provides for an object-field-based mathematics system which can be used for formulating and editing mathematical expressions and/or performing computer algebra. The mathematics system can also be used in a numerical calculator. Further, the object-field-based mathematics system allows for a more natural learning tool for students, allows for improved editing capabilities over the prior art, and can be used with existing CAS programs and numerical calculator programs.

The object-field-based mathematics system described herein is intended for use with an electronic device such as a computer or a handheld calculator. As such, one embodiment described herein provides for an apparatus which allows a user to run a program to implement the mathematics system. One example of such an apparatus is depicted in a schematic drawing in FIG. 1. A discussion of the apparatus 10 of FIG. 1 facilitates further description of the object-field-based mathematics system herebelow.

Figure 1:
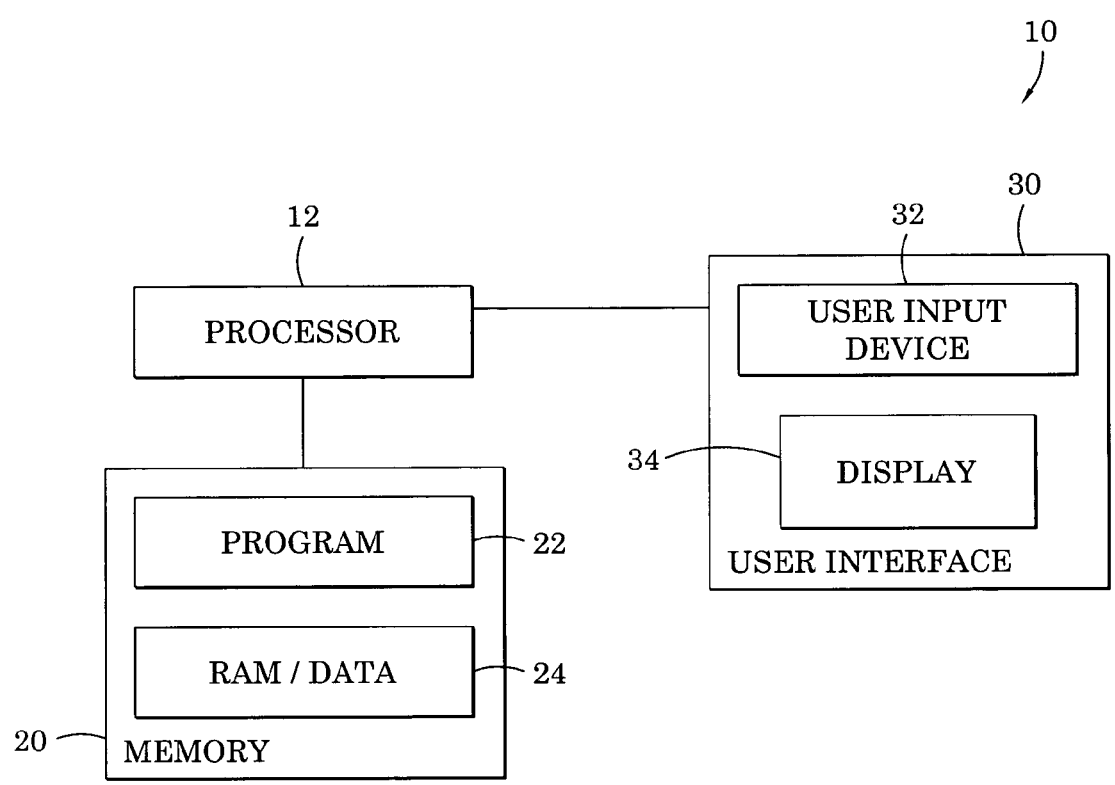
FIG. 1 is a schematic showing exemplary components of a mathematics system as provided for herein.

The apparatus 10 of FIG. 1 includes a processor 12 (such as a microprocessor or other computing means), a computer readable memory 20, and a user interface 30 which includes a user input device 32 and a display 34. The computer readable memory 20 can contain a series of computer readable and computer executable program steps (indicated as "program" 22), as well as data which can be stored in random access memory 24. The processor 12 can execute the steps of the program 22 to enable a user to access the mathematics system as viewed on the display 34, and to allow the user to input and edit mathematical expressions using the system 10 via the user input device 32. The user input device 32 can be any device configured to receive inputs from a user and convey them to the processor 12 for implementation. Non-limiting examples of the user input device 32 include a keyboard, a computer mouse, a touch screen, a touch pad, a microphone (when used with voice recognition software, which can be stored in the memory 20), a digital pen and tablet, a gesture-drive screen display, and combinations thereof. The display 34 can be any device which can display mathematical expressions as rendered by the program 22. Common examples of the display 34 can include an LCD screen, a CRT screen, a plasma screen, a projector, etc. In one example the user input device 32 and the display 34 can be combined into a single unit in the form of a touch screen.

It will be appreciated that the apparatus 10 can be provided as a single entity, such as a laptop computer, a handheld calculator, or a PDA. It will be further appreciated that the components of the apparatus 10 can be provided in a distributed environment. For example, the program 22 which implements the mathematics system can reside on a computer server which then communicates with the user interface 30 via a communications link such as the internet or a cell phone connection. In that instance the processor 12 can have processing components both on a remote server as well as on a user's local input/display device (e.g., laptop computer, cellular or mobile telephone, PDA, etc.). Further, the system 10 can be configured to have multiple user input devices and displays connected to the same processor 12, such as in a classroom environment. It is also understood that the computer readable memory 20 can be provided in different forms, and as a plurality of constituent parts. For example, the computer readable memory 20 can include read-only memory and random access memory, and can be provided on a magnetic disk (e.g., a hard drive), on a semiconductor, and on an optical disk, to include only a few examples. Further, the computer readable memory 20 can be distributed geographically and connected, either directly or indirectly, by various communication means such as the Internet or a local area network.

The object-field-based mathematics system described herein can thus be provided as part of an apparatus (as in FIG. 1), or as a program (i.e., a series computer-executable instructions stored on a computer readable medium). The object-field-based mathematics system also includes various methods for enabling the formatting, editing and solving of mathematical expressions.

The data structure used for the mathematics system disclosed herein can be encoded using object oriented programming languages. Exemplary programming languages include Java and C++. Other programming languages can also be used.

Data Structures for the Mathematics System

In one embodiment a mathematics system in accordance with the present disclosure is based on a data structure which can be stored in a computer readable memory (e.g., memory 20, FIG. 1), and be created and manipulated with a series of computer-executable instructions (program 22, FIG. 1). The mathematics system (program) enables the formulation of mathematical expressions by a user via a user interface (30, FIG. 1). The mathematical expression is defined by a computer readable data structure which can be stored in the computer readable memory. More particularly, the data structure which represents the mathematical expression describes a selection of objects from a library of object types contained in the computer readable memory. The object types include primitive objects and non-primitive objects. Primitive objects represent a single symbol, such as "5", or "+", while non-primitive objects have at least one constituent field which can contain additional objects. A field that contains no objects is referred to as an empty field. By definition, primitive objects have no constituent fields. An example of a non-primitive object is a fraction object which has two constituent fields—a numerator field and a denominator field. So, for example, in the fraction $$\frac{x+5}{y-1}$$

the numerator field contains three primitive objects—"X", "+" and "5", while the denominator field contains the primitive objects "Y", "−" and "1". As indicated, a field can contain both primitive and non-primitive objects, so in the above example if the formula is changed to $$\frac{x+5}{\sqrt{y}-1}$$

then the denominator field contains a radical (or square root) object, which is a non-primitive object, together with the primitive objects "−" and "1". The single constituent field of the square root object contains only the primitive object "Y".

The number of constituent fields that belong to a non-primitive object, and their mathematical meaning, are defined by the type of object. For example, the constituent fields belonging to a fraction object are its numerator field and its denominator field.

An object contained in a constituent field is said to be a member, element, or guest object of that field. The containing field is said to be the host field of each of its guest objects. Similarly, the non-primitive object to which the containing field belongs, is said to be the host object of the guest object. Reflexively, the guest object is said to be the guest object of the host object.

Certain non-primitive objects in the library of objects have commonly accepted mathematical notation associated therewith, and therefore a mathematical significance assigned thereto (as will be explained below). Examples of non-primitive objects having a commonly accepted mathematical notation associated therewith include, without limitation: square-bracket objects; parenthesis-style bracket objects; fraction objects; radical objects (i.e., the $n^{th}$ root of a quantity); exponent objects; summation objects; integral objects (both definite and indefinite); matrix objects; absolute value objects; and set objects. Further, non-primitive objects in the library of objects have one or more fields associated with the object, which can be presented to the user via a display device to enable the user to provide inputs for the field. For example, a graph object can provide fields to allow the user to provide a mathematical expression to be graphed, and minimum and maximum values to be graphed for variables within the mathematical expression. Thus, in one embodiment each non-primitive object in the object library includes a function call to a subroutine contained within the computer readable memory for performing the mathematical routine associated with the non-primitive object.

In general, the mathematics system described herein allows a user to enter a mathematical expression via the user interface. The mathematical expression can be entered by the user by selecting objects to be inserted into a root field which contains the overall mathematical expression. Whenever the user inserts an empty non-primitive object, the object is displayed on the display device along with its constituent fields, which are initially empty. The user can then populate the empty constituent fields by inserting other objects. As each constituent field in a non-primitive object is populated, the user can move to the next constituent field within the non-primitive object merely by giving a simple command (e.g., using the "enter" key on a keyboard, the right-direction-arrow command, click of a computer mouse button, etc). After the last constituent field of a non-primitive object is populated, the user can move out of that object and into its host field by using a single command (e.g., "enter"). The ordering of constituent fields of a non-primitive object is defined based on an established infix entry sequence, such that the user can move through the fields in a natural way. This obviates the need to navigate from one field to another by the use of a pointing device, although that functionality can still be provided. In this embodiment, and within the data structure which is used to represent the mathematical expression, each object and each field has a mathematical significance assigned thereto. For example, the primitive object "5" has an associated numeric value of 5.0. This is in contrast to the character "5" in prior art equation editors merely having an associated code (such as ASCII) for graphical representation of the character, and no associated numerical value. Likewise, the primitive object "+" has an associated mathematical routine to add a quantity immediately preceding the object to a quantity immediately following the object. Again, this is in contrast to the character "+" in prior art equation editors merely having only an associated code for graphical representation of the character, but no associated mathematical significance. Further, each non-primitive object in the library of objects also has its own mathematical significance assigned to it. Some examples of non-primitive objects and their associated mathematical significance include: a fraction object having an associated mathematical routine to divide the numerator field by the denominator field; a bracket object having an associated mathematical routine to perform mathematical operations on the objects contained within the brackets prior to performing any further mathematical operations on the entire expression; and a summation object having an associated mathematical routine to perform a summation of the summand field (which follows the summation symbol) between the values specified in a lower-limit field and an upper-limit field, with respect to the variable specified in the index of summation field.

Likewise, each field (and specifically, each constituent field which belongs to a non-primitive object) has a mathematical significance assigned thereto. For example, within a fraction object the numerator field has assigned thereto the mathematical significance of being the value or quantity which is to be divided by the denominator field and the denominator field has assigned thereto the mathematical significance of being the divisor for the numerator field. The mathematical significance assigned to any given constituent field of a non-primitive object is governed by the mathematical significance assigned to the non-primitive object, and generally follows commonly accepted mathematical notation which is associated with the non-primitive object. Other rules in the program for the mathematics system can determine the mathematical significance of a primitive object based on that objects position within the host field, and any objects immediately juxtaposed to the object. For example, if an object was entered by the user as a minus-sign, and that object is the first guest object of a field (i.e., there are no other guest objects of that field which are to the left of that object) then the mathematical significance assigned to that object is that of a unary negative sign object (for a sign-change operation). However, if that object is between two other guest objects of the field, then the mathematical significance assigned to that object is that of a binary negative sign object (for a subtraction operation). The user interface can format unary and binary negative sign objects differently, for example by allowing more space around the symbol for a binary negative sign object. Both primitive and non-primitive objects can also have mathematical significance assigned based on context. For example, a bracket object may be interpreted together with one or more comma objects in connection with a point, with the comma objects separating the coordinates, as in the three-dimensional point "(3, −2, 5)". One or more comma objects may also be interpreted together with a parentheses object in connection with a finite set, with the comma objects separating the elements of the set, as in the set {1, 2, 3}.

The value of assigning mathematical significance to each object, and each field, in the data structure is that it allows a single data structure that serves two disparate purposes: 1) formatting in an equation editor in order to present mathematical expressions to the user for viewing and editing), and 2) performing calculations based on the mathematical content of mathematical expressions. This feature will be described more fully below.

The computer readable data structure of the present embodiment which is used to represent a mathematical expression uniquely identifies each object and each field in the mathematical expression. Further, the computer readable data structure includes pointers to describe nesting of the objects and the fields in the mathematical expression. In general, the data structure provided for herein which is used to represent a mathematical expression includes a data string for each object in the mathematical expression. Thus, for a mathematical expression having "n" objects, there will be "n" data strings, identified from data string (or object) "1" to data string (or object) "n".

The overall mathematical expression is contained in the field of a non-primitive object known as the root, or initial, object. The root object is not hosted by any field or object of the mathematical expression, and is thus the highest level object in the mathematical expression. For purposes of organizing data in the memory device and for data referencing purposes, it is convenient to assign an object number "0" (zero) to the root object. When there is more than one mathematical expression stored in the memory device, each mathematical expression (and thus, each root object) is assigned a unique identifier. An example is a document object, which can contain several mathematical expressions in its single document field, such as a mathematical derivation which can be displayed to the user on the display device as a vertically stacked sequence of mathematical expressions. This is distinct from a line-wrap feature whereby an expression that is becoming too long horizontally continues on a line below.

To create a unique identifier, when several expressions are present, the object number is paired with a unique identifier for the expression. Thus, the root object of a first mathematical expression can be assigned an identifier of "ME1", the root object of a second mathematical expression can be assigned an identifier of "ME2", and so on, with each mathematical expression being identified with its respective root object. It will be appreciated that the assignment of object number "0" (zero) to the root object of a mathematical expression is an arbitrary, but convenient, assignment, and thus allows objects within the mathematical expression to be assigned numbers which allow for easier association in the following discussion. For example, if the overall mathematical expression "X+1" is assigned object number "0" for the root object, then object number 1 is "X", object number 2 is "+", and so on. This provides a logical assignment of objects since the first object which will be entered and/or viewed by the user via the display (in a left-to-right configuration) will be the object "X". However, the overall mathematical expression "X+1" can also be assigned root-object number "1", in which case object "X" would be referred to as "object number 2". As can be appreciated, the latter form of assigning object numbers (i.e., assigning the root object the value of "object 1") can lead to confusion, since the object "X", which is the first-entered object, will then be referred to as "object number 2." Thus, for purposes of the following discussion, we will adopt the convention of referring to the root object as "object number 0 (zero)", and all objects contained within the mathematical expression itself will have sequential numbers starting with "1" through "n" ("n" being the last object in the mathematical expression). Each object in a mathematical expression can be given a unique object identifier by combining its object number with an object descriptor for objects of its type. For example, if a fraction is object number "5" in a mathematical expression, that object can be identified as "(5, fr)", where "fr" stands for "fraction".

The root object has as a single constituent field, referred to as the root, or initial, field. Other than the root object and the root field, all objects and fields of the mathematical expression are nested inside the root field. While other fields can be nested inside the root field (by way of non-primitive objects), it will be appreciated that these other fields are not constituent fields of the root object. For purposes of the following discussion, each field (including the root field) will be assigned herein a field identifier. Specifically, and as will be discussed more fully below, the assignment of field identifiers allows for nesting counts. Field identifiers also allow for ordering of constituent fields of a non-primitive object with respect to an infix entry sequence. Nesting counts allow for limitations to be placed on the types of nestings of fields or objects within other fields or objects (as will also be described more fully below).

Recall that a non-primitive object can have more than one constituent field. Each constituent field is identified by its field identifier with respect to its corresponding non-primitive object. A field identifier can simply be an enumeration (e.g.: "fraction field 1", "fraction field 2"), or descriptive (e.g.: In a fraction, "num" and "den" for the numerator and denominator, respectively). Another methodology for the use of field identifiers can include not only a descriptive form of identification, but also a numbering showing the order in which the field will be populated by the user using the infix entry process. One technique to uniquely identify a field within the overall mathematical expression is to specify both the field identifier, and identifier of the field's associated non-primitive object. In an above example, a fraction object was assigned object number "5" in a mathematical expression, so that it could be assigned the object identifier "(5, fr)". Each fraction object contains two fields, namely the numerator and denominator fields, which (as discussed above) can be assigned the field identifiers of "fraction field 1" and "fraction field 2" respectively. By combining the object identifiers, and field identifiers, it is now possible to uniquely identify a field (e.g.: the numerator field of the fraction in the above example can be assigned the identifier "(5, fr, 1)", while its denominator field can be assigned the identifier "(5, fr, 2)"). Using this methodology, the root field can be assigned the identifier "(0, ro, 1)", since the object number of the root object is "0", and the field number of the constituent field is "1" (since the root object has only one constituent field), where "ro" stands for "root object".

In general, most non-primitive objects are defined by a fixed number of constituent fields. However, certain objects can allow a user to specify the number of fields according to rules established specific to the type of non-primitive object. For example, a matrix object can allow a user to specify the number of rows and columns for the matrix, and thus the overall number of fields for that matrix object.

Preferably, the ordering of fields within a non-primitive object follows an infix entry process. This process is discussed further below.

An object's identifier can uniquely identify that object, but not its overall position in the mathematical expression. To define the overall position in the mathematical expression, each object can be provided maintain its own identifier, as well as a reference to its host object and host field. An exception is the root object, which has no host object or field within the mathematical expression, and can be identified by this property. More details regarding uniquely identifying an object's position are provided below.

As indicated above, each non-primitive object will have one or more constituent fields associated with the non-primitive object. As also indicated above, a field can be populated with other objects, including non-primitive objects having their own constituent fields, and thus the overall mathematical expression gives rise to nesting sequences alternating between fields and objects, also known as object-field sequences. A non-primitive object can have one or more fields nested inside of it that are not its own constituent fields, by virtue of having a non-primitive guest object. For example, in the mathematical expression X/(Y+2) the denominator field (a constituent field of the fraction object) has as its only guest object a bracket object. The bracket object in turn has one constituent field, the guest objects of which are the primitive objects "Y", "+" and "2". So in this example the fraction object has two constituent fields (numerator and denominator), and the denominator field has one additional field nested inside it—namely, the single constituent field of the bracket object. And in this example, the constituent field of the bracket object has three primitive guest objects. It will be appreciated that nesting can be described for fields nested within fields, objects nested within objects, fields nested within objects, and objects nested within fields.

The description of the data structure of the present disclosure is preferably based on commonly established data infix entry and notation procedures. However, alternative methodologies for data entry can be employed to equal effect. Infix entry procedures typically follow common conventions regarding precedence of operations, and to some degree are guided by the definition of the mathematical terms associated with the specific operands. For example, typical infix entry of fraction components (and in particular, when entering a fraction equation via a keyboard or the like) is to first enter the numerator, and thereafter enter the denominator. This is due to the convention that a fraction of "X/Y" is typically translated to spoken language as "X divided by Y". Therefore, the general convention when entering a fraction of "X/Y" into an equation editor is to first enter the value "X", and thereafter enter the value "Y" (thus following the order in which these two values are generally ordered for the spoken and written definitions of a fraction). Other common mathematical expressions are also typically entered by users using an infix entry routine based on the definition of the mathematical operation to be performed—e.g., when desiring to find the $n^{th}$ root of the value X, the user will draw the radical symbol ($\sqrt{}$), followed by placing the root to be desired (i.e., the value "n") in the carat of the radial, followed by placing the value ("X") under the horizontal line of the radical symbol. More generally, when writing a mathematical expression (either on paper or on a display device) users generally follow a left-to-right convention of infix entry, subject to variations based on commonly accepted mathematical procedures. Further, in addition to commonly practiced left-to-right entry procedures for entering mathematical expressions, there are commonly accepted infix entry procedures regarding up-and-down data entry. For example, with respect to a definite integral when using the common left-to-right entry procedure, it is common to first enter the lower limit, and then the upper limit, and thereafter the integrand, followed by the variable of integration. Likewise, for an object having a subscript and an exponent (e.g., $X_k^2$), the subscript is typically entered prior to entering the exponent. This common methodology for entering (or writing) a mathematical expression will be referred to herein as an infix entry process. Accordingly, the order of listing of the objects in the data structure (which overall represents a mathematical expression) are generally ordered within the data structure to follow commonly accepted infix entry procedures. Thus, for example, for the mathematical expression "3(X+Y/2)", the typical infix entry process will be to first enter the object "3", next enter the bracket object "( )", thereafter enter the objects "X" and "+", then the fraction object within the bracket object, then enter the numerator field (here consisting of the object "Y"), and finally to enter the denominator field (here consisting of the object "2"). Accordingly, the seven objects present in this example of 3(X+Y/2) can be ordered (in the data structure described herein) as follows: object number 1 is the primitive object "3"; object number 2 is the non-primitive bracket object; object number 3 is the primitive object "X"; object number 4 is the primitive object "+"; object number 5 is the non-primitive fraction object; object number 6 is the primitive object "Y" in the numerator field of fraction object number 5; and object number 7 is the primitive object "2" in the denominator field of fraction object number 5. It will be appreciated that other ordering of the objects in this example can be arranged in the data structure to equal effect, but in the preferred embodiment the ordering of objects in the data structure of the present disclosure follows generally accepted conventions for infix entry procedures. It will be appreciated that variations within infix entry methodologies are not critical to the operation of the mathematics system described herein.

Since there is no formally established and agreed-upon convention for infix entry, the rules of infix entry to be used within a specific program implemented in accordance with the present disclosure will preferably be established as a set of rules within the program itself. The set of rules establishing the infix entry process for any given implementation will also preferably establish the order in which a cursor (presented on a display device) will move through the mathematical expression as the cursor is moved from left to right (using a right-direction command) by a user via the user interface.

As above, the infix entry process (i.e., rules) established for the particular implementation of the mathematics system disclosed herein also, and preferably, establishes the sequential order in which the objects are identified within the data structure of the of the program which implements the mathematics system. Thus, the first object which is to be entered accorded to the established infix entry process is assigned the first object identification, the second object which is to be entered accorded to the established infix entry process is assigned the second object identification, and so on. As an example, for the mathematical expression "X+Y", the typical infix entry process is first "X", then "+", and finally "Y", and accordingly the object "X" will be identified as the first object in the mathematical expression, the object "+" will be identified as the second object in the mathematical expression, and the object "Y" will be identified as the third object in the mathematical expression. Further, as a mathematical expression is modified by the user, the infix entry rules apply to modify the object identification assigned to the objects. For example, in the above example of the mathematical expression "X+Y", if the expression is modified to be "X−Z+Y", the infix entry process for the objects is, in order, X, −, Z, + and Y, and in this case the object "−" is now identified as the second object, "Z" is now identified as the third object, and so on such that "Y" is now identified as the fifth object.

Following the above description, it will be appreciated that non-primitive objects preferably include sequential object-identification of their guest objects according to the established infix entry process. For example, in a mathematical expression having "n" objects sequentially identified as objects 1, 2, . . . , i−1, i, i+1, n, if object "i" is a summation object, then object i+1 can give the variable for the index of summation, object i+2 can be the beginning value for the summation, object i+3 can be the ending value for the summation, and object i+4 can be the first guest object of the summand field (the summand field containing the expression over which the summation is performed).

From the above discussion, it will be appreciated that each data string describing each object in the data structure (which is in turn representative of the overall mathematical expression) can include the following information:
 a unique identifier for the object;
 a description of the object itself (i.e., an object description);
 a reference (or pointer) to the host object of the currently-identified object;
 the description of the host object type for the currently-identified object; and
 a reference (or pointer) to the host field of the currently-identified object.

Each of the above terms will be discussed more fully below.

An example of a unique identifier for an object in a mathematical expression is a sequential number—e.g., 1 for the first object number, 2 for the second object number, and so on to "n" for the last object number. The object numbers can also be expressed as 0001, 0002, etc.

Object descriptions can be assigned to the objects within in the library of objects. Examples of a description of an object can include the object itself, or a code for the object. For example, if the object is the primitive object consisting of the number 5, then the description of the object can be "5". If the object is a non-primitive object, then the description of the object can be a two-letter code—e.g., "fr" for a fraction object, "br" for parenthesis-style brackets (i.e. round brackets), "sq" for square brackets, "sr" for square root object, "cr" for cube root objects, "ra" for a radical object, "di" for a definite integral, etc. The root object can be identified as "ro", or "in" (for "initial object"). The choice of a code for an object is arbitrary, but is preferably unique for each type of object, and is also preferably somewhat descriptive of the object.

A reference (or pointer) to the host object of the currently-identified object is a backward pointer in that it points backward to previous objects of the object sequence. As an example, for the mathematical expression "2+3", all of the shown objects are guest objects of the root object (i.e., object "0", as discussed above), and thus the backward pointer to the host object of these objects (2, + and 3) will be "0". It will be appreciated that the mathematical expression can include further backward pointers so that more than one object in a chain of nested objects can be identified.

The description of the host object for the currently-identified object follows from the reference (or pointer) to the host object of the currently-identified object. For example, if the currently-identified object is hosted by the root object, then the description of the host object can be "ro" or "in" (for "root" or "initial", as discussed above). Likewise, if the currently-identified object is a guest of a constituent field of a fraction object, then the description of the host object can be "fr" (for "fraction"). The value of including a reference to the host-object type is that it can provide a guide as to the significance of the currently-identified object with respect to its host object, according to the established infix entry process and in conjunction with its overall order in the object identification sequence. However, since a non-primitive object can have more than one constituent field, it is also desirable to identify the host field of the currently-identified object. For example, if the currently identified object is object "i", having a fraction as host object, it is desirable to know whether object "i" is a guest object of the numerator field as opposed to the denominator field of that fraction. This is further discussed immediately below.

As indicated, the data structure can include a reference (or pointer) to the host field of the currently-identified object. Further, the host field of any particular object is defined by the non-primitive object to which that field belongs. (It will be recalled that each object in the mathematical expression (with the exception of the root object) is the guest object of a field in the mathematical expression. The root object has the root field as its only constituent field, and thus all objects (with the exception of the root object) are ultimately nested within the root field.) Thus, a guest object of the root field can have a pointer to field "1" of object "0". However, non-primitive objects can have more than one constituent field. For example, a fraction object has two constituent fields—a numerator field and a denominator field. Thus, for any fraction object the numerator field can be assigned as field 1 of that object, and the denominator field can be assigned as field 2 of that object, based on the relative order (with respect to an established infix entry process) in which the two fields are populated. The constituent fields for each non-primitive object type can similarly be ordered based on the relative order (with respect to an established infix entry process) in which those fields are populated. It therefore follows that a reference (or pointer) to the host field of a currently-identified object (other than the root object) will identify the field of the host object of which the currently-identified object is a guest object. In the above example the information that a field is field 2 of a non-primitive object, together with the information that the non-primitive object (of which that field is a constituent field) is a fraction object, determines that the field is a denominator field.

Thus, following the above discussion, one data structure which can be used to represent a mathematical expression in accordance with the present disclosure can be in the form of (for each object within the overall mathematical expression) a 5-tuple: (OI, OD, HOI, HOD, FD), wherein:

"OI" (for "Object Identifier") is a unique identifier for the currently identified object within the overall mathematical expression, and can be assigned sequentially based on an established infix entry process;

"OD" (for "Object Descriptor") gives a description of the object type itself (i.e., an object type descriptor), as set forth in the object library;

"HOI" (for "Host Object Identifier") is a reference (or pointer) to the host object of the currently-identified object consisting of the OI of the host object;

"HOD" (for "Host Object Descriptor") gives a description of the host object type for the currently-identified object (i.e., the object descriptor OD for the host object); and "FD" (for "Field Descriptor") gives a description of the field of which the currently-identified object is a guest object, and can be assigned sequentially based on an established infix entry process for the type of non-primitive object given by the HOD.

In this example, each object within the mathematically expression is uniquely identified by five reference coordinates, which not only identify the order of the object within the mathematical expression, but also lend mathematical significance to the object itself. Adapting the above examples, one may consider the case of a mathematical expression having object number "5" as a fraction object, and object number "9" as a parentheses-style brackets object that is nested in the denominator of the fraction object. Using the above methodology, object number "9" can be assigned the 5-tuple "(9, br, 5, fr, 2)".

The data structure can also include forward pointers, which, with respect to the object sequence, point to subsequent objects (or fields thereof). For example, a data string for a given non-primitive object can include the object identifiers for the guest objects of the currently identified object. As another example, a data string for a given field can include the guest object identifiers for the guest objects of the currently identified field. As objects and fields are added to, or deleted from, a mathematical expression, the forward pointers for any given object or field can be updated to reflect the changes.

As indicated above, field types can be identified with respect to their host object types. For example, if the currently identified object is the guest object of a constituent field of a fraction object (which has by definition a numerator field and a denominator field), then the data structure describing the currently identified object can include a description of the field type as either being the numerator field or the denominator field. Likewise, any object contained in the root field can include, within the data string for that particular object, a host field descriptor of "ro" (for "root"), and a descriptor for the host object as being the root object.

As can be appreciated from the above discussion, the data structure in general identifies, for each object in the overall mathematical expression, alternating (and ascending) levels of host fields and host objects, ending in each instance with the highest level object (i.e., the root object) having a single constituent field (i.e., the root field). As discussed above, the root field has nested inside it all further objects and fields which make up the mathematical expression. It will thus be recognized that alternative configurations for the data structure can be provided, but in general there will be a highest-level terminal point for containing the overall mathematical expression, and a nesting arrangement of objects and fields with each object and field to be desirably uniquely identified and mathematically associated with one or more objects or fields within the overall mathematical expression.

The series of computer-executable instructions which enable the data structure to be completed for a mathematical expression further include a series of steps to identify user inputs with at least some of the objects, and to communicate the mathematical expression represented by the data structure via the user interface. That is, the computer program which implements the mathematics system described herein accepts inputs from the user via the user interface to enable the user to enter a mathematical expression, and to edit a mathematical expression, and the mathematical expression as-entered (and/or as edited) is communicated to the user, also via the user interface. In one example the user interface includes a graphical user interface (or GUI) which is displayed to the user on the display. The GUI displays the mathematical expression as it is entered (or as it is recalled from the memory device), and includes icons which allow a user to select objects to be added to the mathematical expression. The icons can be selected, for example, via a computer mouse, a touch-screen, a keyboard, or a voice command. Preferably, the presentation of the mathematical expression is updated on the display device each time the user makes a selection to insert an object into the mathematical expression via the user interface. Further, the user interface can provide controls to allow a user to edit a mathematical expression, and, as the mathematical expression is edited by the user, the edited version of the mathematical expression is presented to the user via the display in essentially real-time. The user interface can also provide controls to allow a user to select portions of a mathematical expression, and, as portions of the mathematical expression are selected by the user, the selected portions of the mathematical expression are presented to the user via the display in essentially real-time. A further description of editing and selecting features of the program is provided more fully below.

In addition to including a data string for each object in the mathematical expression, the data structure can further include information regarding potential cursor positions (or slots) within the mathematical expression. A potential cursor position is any position within the mathematical expression where a user can place a cursor using the user interface (e.g., by clicking on a computer mouse button). We will use the term slot herein to refer to a potential cursor position. Slots can be provided for the following positions: between two adjacent objects; at the beginning of each field; and/or at the end of each field. For a slot between two adjacent objects it is convenient to assign the slot to one or the other object. For convenience of discussion, we will use the convention that the slot associated with an object is located to the immediate right of the object. An object (including, in the case of a non-primitive object, any other objects nested therein) and its associated slot will be referred to herein as an object segment, with the slot referred to as the object slot of that object. Accordingly, using this convention, a sequence of slots is formed corresponding to the infix entry sequence of objects. Further, for identification purposes, a slot to the immediate right of an object will be termed slot 0 (zero) for that object, and thus slot 0 of an object can be identified with the corresponding object segment. When the object is a non-primitive object, then, for each of its constituent fields, the slot at the beginning of that field can be identified with the field itself, with each such slot referred to as the field slot of its associated field. For example, a fraction object has two constituent fields—field 1 being the numerator field, and field 2 being the denominator field (following generally accepted infix order). Thus, the slot at the beginning of the numerator field can be assigned the slot identifier of "slot 1" of the fraction object (corresponding to field 1 of the fraction object), and the slot at the beginning of the denominator field can be assigned the slot identifier of "slot 2" of the fraction object (corresponding to field 2 of the fraction object). As indicated above, field slots can be either left or right justified within the field. One or more contiguous object segments will be referred to herein as a field segment. The use of slots in the mathematics system described herein is that they can be used to facilitate editing of the mathematical expression, and particularly in selecting and deleting portions of the mathematical expression, as described more fully below. Slots also serve as points of a field where new field segments can be inserted. Editing of expressions thus consists of operations on field segments. The cursor is considered to be in a field (or contained in a field) if the cursor occupies the field slot of that field or the object slot of one of the guest objects of that field. Likewise the cursor can be considered to be in (or contained in) a non-primitive object if the cursor is in (or contained in) one of the constituent fields of that non-primitive object.

Thus, according to one embodiment, the data structure for representing a mathematical expression can include data representing of slots, comprising object slots and field slots, with an associated slot sequence. In this embodiment the assigned object indices give the order of the objects with respect to the infix entry sequence. For each field, the relative order (with respect to the slot sequence) of the object slots of guest objects of that field is the same as that of their respective object indices. In other words, the object slots of guest objects of that field form a subsequence of the slot sequence of the overall expression. For every non-primitive object its fields are assigned field indices which give the order in which the fields are populated with guest objects with respect to the infix entry sequence. The relative order of the field slots of a non-primitive object with respect to the slot sequence is the same as that of their respective field indices. In other words the field slots of the non-primitive object form a subsequence of the slot sequence of the overall expression. The slot sequence can be recursively defined by the infix entry process, whereby the entry of each new object involves the insertion of the sequence of its slots into the previous slot sequence. Preferably the field slot of each field comes before the object slots of all guest objects of that field, the object slots of the guest objects of a host object have the same relative order as their respective objects, the field slots of the fields of a non-primitive object have the same relative order as their respective fields, and the object slot of each non-primitive object (other than the root object) immediately follows the last slot in the last of its constituent fields.

Nesting Counts

In one embodiment a computer program which implements a mathematics system in accordance with the present disclosure can be provided with a set of rules to limit the kinds of mathematical expressions which a user can enter. Limitations on the kinds of mathematical expressions which a user is allowed to enter can be based on the anticipated level of skill of the user. For example, if the system is intended for use by middle-level students it may be desirable to limit the level of complexity (such as types of, and extent of nesting) within mathematical expressions. A specific example of this is given by disallowing nesting of fraction objects or division sign objects within exponent fields. As a more advanced example, it may be desirable to restrict nesting of a second definite integral object inside a first definite integral object to the integrand field of the first definite integral object. Similarly it may be desirable to restrict nesting of a second summation object inside a first summation object to the addend field of the second summation object. The rules which limit the kinds of mathematical expressions a user can enter are implemented in conjunction with the data structure. More specifically, the data structure can be used to determine nesting counts for each type of field or non-primitive object, and the rules can limit the nesting count for each type of field or non-primitive object, or more generally, use nesting counts to prevent the user from nesting various types of objects within a particular object or field. Nesting counts can be based on the number and kind of fields or non-primitive objects in which a particular field or non-primitive object is nested (it is less efficient to base nesting counts on nesting of field or object types within a particular field or non-primitive object, as there can be numerous nesting sequences within a particular object or field, requiring comparison between them as to type and extent). Further, regarding a particular field, its object nesting counts for each non-primitive object type can be calculated by adding together the nesting counts for the constituent fields of the non-primitive object type in question. Furthermore, for a particular non-primitive object, its object nesting count for a particular non-primitive object type is the same as the corresponding object nesting count for each of its constituent fields. For these reasons the most useful nesting counts enumerate the numbers of different types of fields that a particular field is nested in.

One exemplary exhaustive method to compute field-based nesting counts for all the fields in an expression is as follows: Starting with the root object, set each of the root field's nesting counts to zero for all field types other than the root field (the count indicating nesting in the root field is trivially 1). Then proceeding through the object sequence, for each non-primitive object after the root object, each of its constituent fields is assigned field nesting counts equal to those of the host field of that non-primitive object, with the exception of the nesting count for fields of the same type as that constituent field, which is assigned a value of one more than that of the host field of the non-primitive object. For example, in the case of a numerator field nesting count, the root field is assigned a value of zero. Proceeding through the object sequence, every non-primitive object following the root object has its fields assigned the same value as that of the host field of that non-primitive object, with the exception of a numerator field, which is assigned a value one more than that. Analogously, object-based nesting counts for all the objects in an expression can be calculated as follows: Start by assigning zero to all the object nesting counts for the root object (the nesting count indicating nesting in the root object is trivially 1). Then proceeding through the object sequence, each non-primitive object after the root object is assigned the same object nesting counts as its host object, with the exception of the nesting count for its own non-primitive object type, which is a assigned a value of one more than that of its host object. For example, in the case of a fraction object nesting count, the root object is assigned a value of zero. Proceeding through the object sequence, every non-primitive object following the root object is assigned the same value as that of the host object of that non-primitive object, with the exception of a fraction object, which is assigned a value one more than that. Some nesting counts can be initiated once a specific type field or object type is encountered while progressing through the object sequence. For example, it may be desirable to place different limitations on the complexity of fractions that can be nested in an exponent field compared to fractions in which the corresponding exponent object can be nested. To accomplish this, post-exponent-field numerator and denominator nesting counts can be initiated when an exponent object is reached while progressing through the object sequence (that nesting count can be initiated in the exponent field of the exponent object). Such post-exponent nesting counts apply to fields nested inside that exponent field. In the case of a large number of nesting types, an efficient approach can be to compute object and field nesting for specific types as needed, and cache the results.

Figure 9:
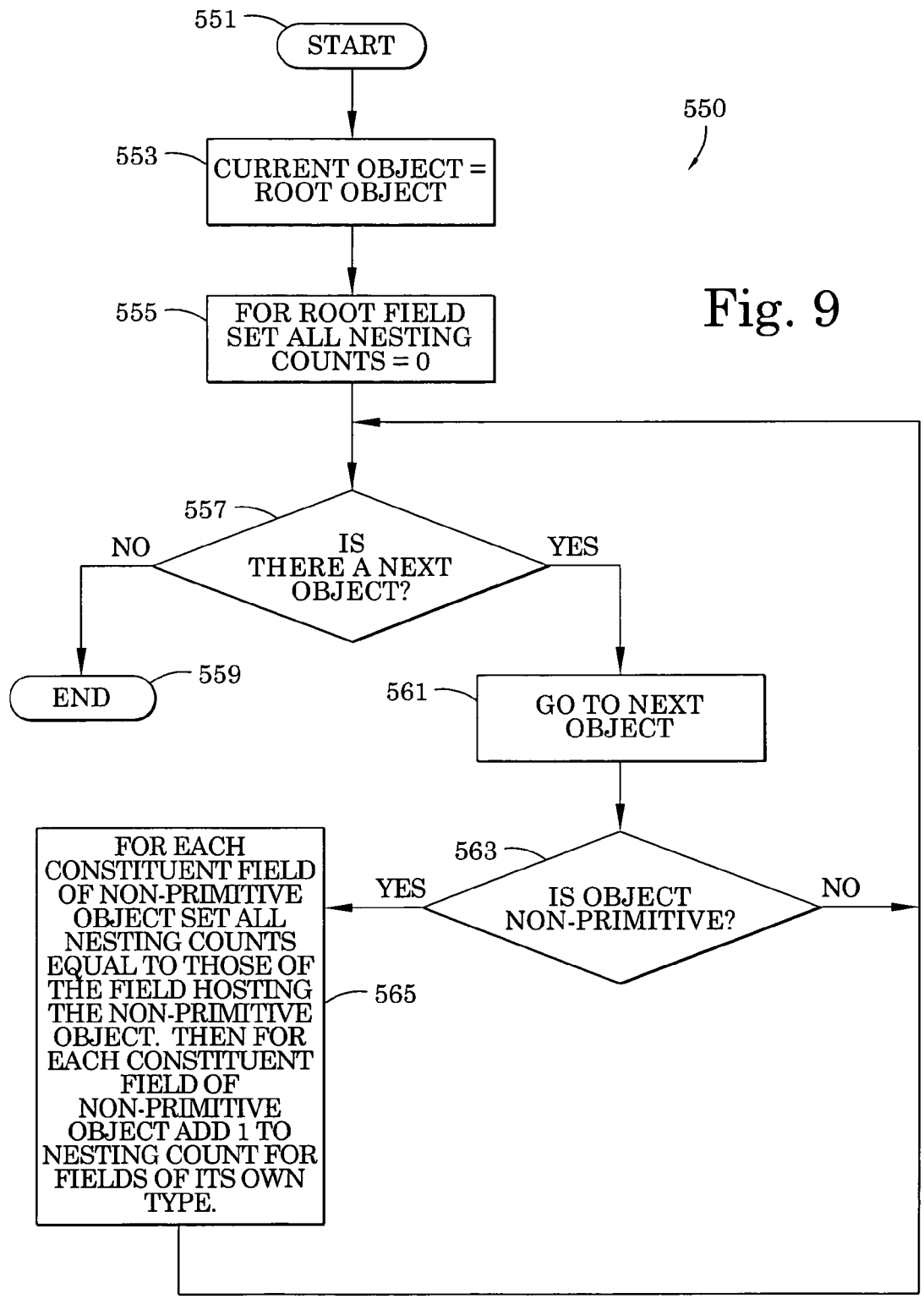
FIG. 9 is a flowchart depicting one method for determining nesting counts using an embodiment of a mathematics system as provided for herein.

An exemplary method for implementing the nesting count operation for fields nested in fields can thus follow the representative steps indicated in the flowchart 550 of FIG. 9. The flowchart 550 can be implemented as a series of computer executable instructions which can be stored in a computer readable memory and executed using a processor. The process begins at step 551, and at step 553 the current object is set as being the root object. At step 555, for the root field all nesting counts are set equal to zero. Then at step 557 a determination is made whether or not there is a next object (with respect to the object sequence). If the answer is "no", then the process ends at step 559. However, if at step 557 it is determined that there is a next object, then at step 561 the program goes to the next object, and at step 563 a determination is made whether or not that next object is a non-primitive object. If the object at step 563 is determined to be a primitive object, then control returns to step 557. However, if at step 563 it is determined that the current object is a non-primitive object, then at step 565 for each constituent field of the non-primitive object, all nesting counts are set equal to those of the field hosting the non-primitive object. Then, for each constituent field of the non-primitive object, a value of one (1) is added to the nesting count for fields of its own type. Thereafter, control returns to step 557.

For example, if a fraction object is populated with additional objects to generate the expression $((\frac{2}{3})/5)/9$ and a nesting count of numerator fields is performed on the numerator field of the fraction object $\frac{2}{3}$ (having the number "2" as the single guest object of its numerator field), then the nesting count of numerator fields for this numerator field will be three. That is, starting with zero numerator nesting count for the root field, add one for the numerator "$(\frac{2}{3})/5$" of the fraction object $((\frac{2}{3})/5)/9$, add another one for the numerator "$\frac{2}{3}$" of the fraction object $(\frac{2}{3})/5$, and add another one for the numerator "2" of the fraction object $\frac{2}{3}$, for a numerator nesting count of three for this particular numerator field. (By comparison, the numerator nesting count for the denominator field of the above nested fraction $\frac{2}{3}$ is two.)

As another example, a radical object $$\sqrt[x]{Y}$$

has two fields—field 1 is the radical index field (here represented by "X"), and field 2 is the radicand field (here represented by "Y"). Although this mathematical expression is read as "the $X^{th}$ root of Y", we will avoid calling field 1 "the root field" in order to avoid confusion with the field that contains the entire radical object, which was earlier defined as being the root field of the root object that is the overall mathematical expression. The rules assigned to the radical object can limit the kinds (and number) of fields and/or objects which can be nested inside the radical object fields. For example, field 1 can be limited to having nested inside it only primitive objects, bracket objects, and absolute value objects. Thus, for example, if a user tries to nest a fraction object inside field 1, the program will indicate to the user (via the user interface) that the operation is not allowed, even if the fraction object would not be a guest object of field 1, but rather the guest object of another field type (such as a bracket field) that is allowed to be nested inside field 1. It will thus be appreciated that the nesting count rules can be established for any particular field type or any particular non-primitive object type in order to allow or disallow particular types of expressions.

From the above discussion regarding the information that can be contained in each data string that describes each object, and the pointers that can be contained in the data strings, it can be seen that by using backward and/or forward pointers, nesting counts can easily be determined for either expressions that have been accepted as input or expressions that the user attempts to input. Once this information is known, the nesting counts can be compared to a set of established rules to determine if any of those rules would be violated by a particular operation. If so, the operation can be denied and the user notified. The denial can be in advance of the operation attempt, such as by disabling a control for the operation. To illustrate using the previous example, if nesting of fraction objects within radical index fields is to be disallowed, once the radical index field nesting count is nonzero for any field containing the cursor, the controls for inserting a fraction object at the cursor position can be disabled, as can be the paste operation controls if the expression to be pasted contains any fraction objects.

Another example of the use of nesting counts can be to limit the number of nestings of one or more object types. For example, rules within the program can specify that for any overall mathematical expression the sum of the nesting counts of round bracket objects and square bracket objects do not exceed two. In this example, the mathematical expression $[((z+4)*2)+x]$ would not be allowed, since a first set of round brackets is nested within a second set of round brackets, which are in turn nested within a set of square brackets—i.e., the sum of nesting counts for the innermost round bracket object is two round brackets plus one square bracket for a total bracket nesting count of three. However, using this rule the mathematical expression $[(m+3)*(n-1)]$ would be allowed, since the highest sum of bracket object nesting counts is only two—that is, for the round bracket objects that are nested within a square bracket object (each has a sum of bracket nesting counts equal to one round bracket plus one square bracket). In this latter example it will be noted that the two round bracket objects are not nested (i.e., one is not placed inside the other), but are rather separate guest objects of the same (square bracket) field. This result could also have been accomplished using nesting counts for round bracket fields and square bracket fields, since counting nestings of single-field non-primitive objects is essentially the same as counting nestings of their fields.

Yet another example of the use of nesting counts can be to limit the number of nestings of a particular object or field type. For example, rules that for each field limit the fraction object nesting count to two or less would allow the expression $(\frac{1}{2})/(\frac{3}{4})$, but not the expression $((\frac{1}{2})/3)/4$ or the expression $(1/(\frac{2}{3}))/4$. The fraction object nesting counts can be calculated together with all the other object counts for the entire expression as detailed above. As another alternative, as also indicated from the previous discussion, all of the field-based nesting counts can be calculated for all fields in the expression. For any particular field we can add together all of its nesting counts for constituent fields of the fraction object type so as to obtain a fraction object nesting count for that field. Thus for each field we can add together its numerator nesting count and its denominator nesting count to determine the fraction object nesting count for that field. This results in the equivalent rule that for each field in the expression, the sum of its numerator and denominator nesting counts cannot exceed two. The first expression above has among its fields a maximum fraction object nesting count of two, while the second and third expressions each have a maximum of three, which disallows them according to the above rule.

Object-Field Diagram Embodiment

Figure 2:
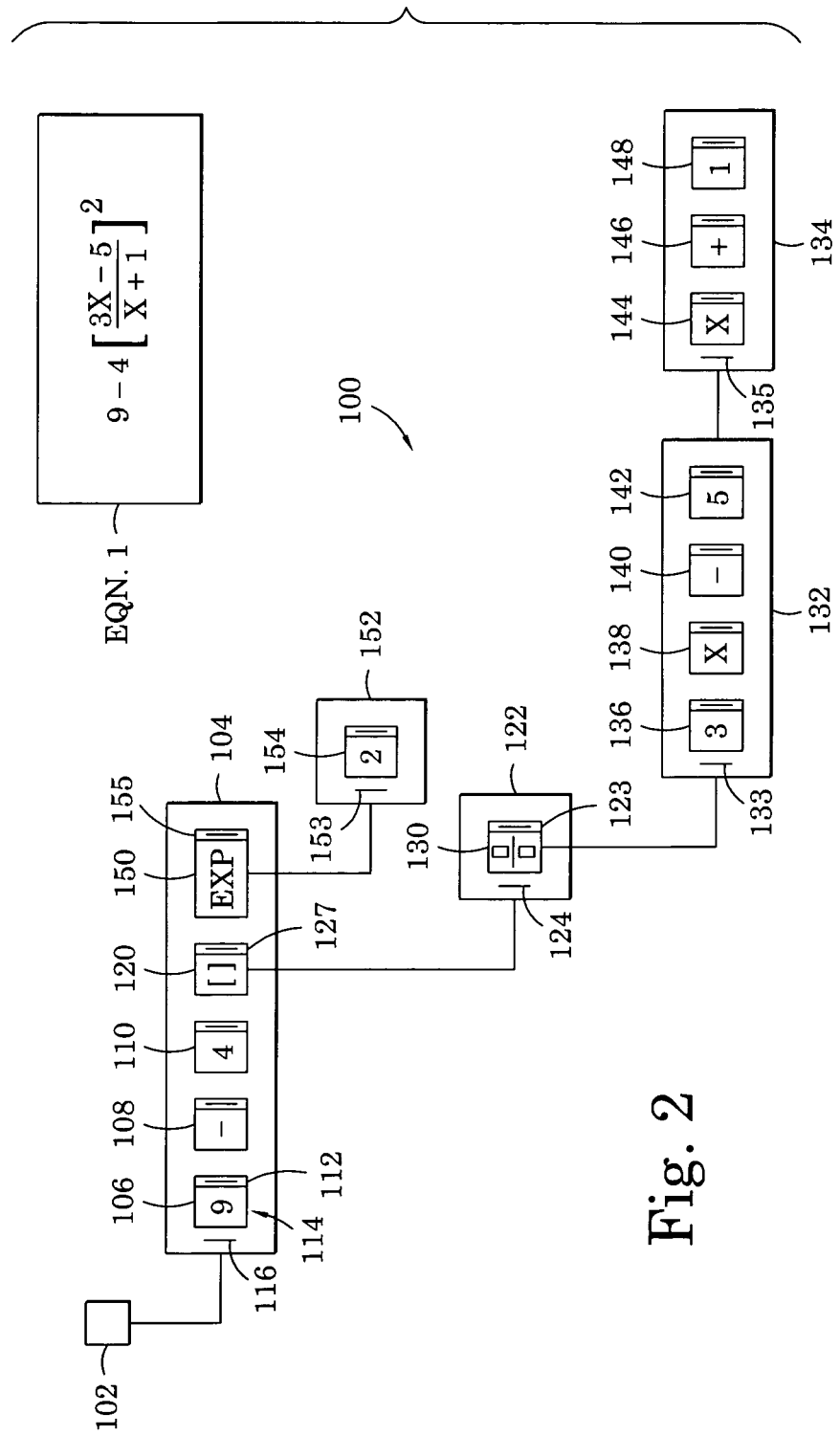
FIG. 2 is a schematic of an object-field diagram representing one kind of data structure that can be used for a mathematics system as provided for herein.

A mathematics system in accordance with the current disclosure can be graphically represented in at least two different manners, and the manner of representation is somewhat dependent on the specific implementation of the data structure used to represent the overall mathematical expression. In a first embodiment, the data structure is represented by an object-field diagram. One example an object field diagram is depicted in FIG. 2. The object-field diagram 100 of FIG. 2 represents the mathematical expression $$9 - 4\left[\frac{3x-5}{x+1}\right]^2$$

(The above expression will be referred to herein as "Equation 1" or "EQN. 1" for convenience.) The object-field diagram 100 includes a root object 102 which will be assigned the object identifier of "object 0" (as discussed above). The root object 102 has a single constituent field 104, which is the root field (also described herein as the initial field). The root field 104 can thus also be described as "field 1 of object 0". The root field 104 has a field slot 116 which can be termed as slot "1" of the initial object 102.

In the example shown in FIG. 2, the root field 104 has five guest objects as follows: the primitive object 106 (here, the number (digit) 9); the primitive object 108 (here, a subtraction operator (or minus sign)); the primitive object 110 (here, the number 4); the non-primitive object 120 (here, a square-bracket object); and the non-primitive object 150 (here, an exponent object). Each object in the object-field diagram 100 is provided with an object slot to the immediate right of the object. In FIG. 2 the only specifically numbered object slots are object slot 112 which is associated with the primitive object 106, object slot 123 which is associated with the non-primitive fraction object 130, and object slot 155 which is associated with the non-primitive exponent object 150. Object 106 and object slot 112 together make up object segment 114. It will be appreciated that object segments also exist for each of the other objects in FIG. 2 in conjunction with their respective object slots (not shown).

In one variation the field slot 116 can be located at the far right of the field 104—i.e., to the right of object 150, with object slots on the left of each object.

In the example of FIG. 2, the non-primitive square-bracket object 120 has a single constituent field 122, and a field slot 124 to the left of the field. In this example, field 122 belonging to object 120 hosts a fraction object 130 as its sole guest object (field 122 is the designation with respect to FIG. 2 rather than the infix entry sequence). Fraction object 130 has two constituent fields—the numerator field 132 and the denominator field 134. Note that the numerator field 132 can be described as field 1 of object 130, and the denominator field 134 can be described as field 2 of object 130. Field 132 has a field slot 133 at the left side of the field, and field 134 likewise has a field slot 135 at the left side of the field. Field 132 hosts four primitive guest objects—object 136 (the number "3"), object 138 (the variable "x"), object 140 (a subtraction operator or minus sign "−"), and object 142 (the number "5"). The denominator field 134 hosts three primitive guest objects—object 144 (the variable "x"), object 146 (an addition operator "+"), and object 148 (the number "1"). As can be seen from the object-field diagram 100, the primitive objects 136, 138, 140, 142, 144, 146 and 148 are nested within the square-bracket object 120 by virtue of the non-primitive fraction object 130, which is itself nested in object 120.

Finally, in FIG. 2 the exponent object 150 has a single constituent field 152 which has an associated field slot 153 at the left side of the field. In the example, field 152 hosts a single primitive guest object 154, which is the number "2".

Figure 3:
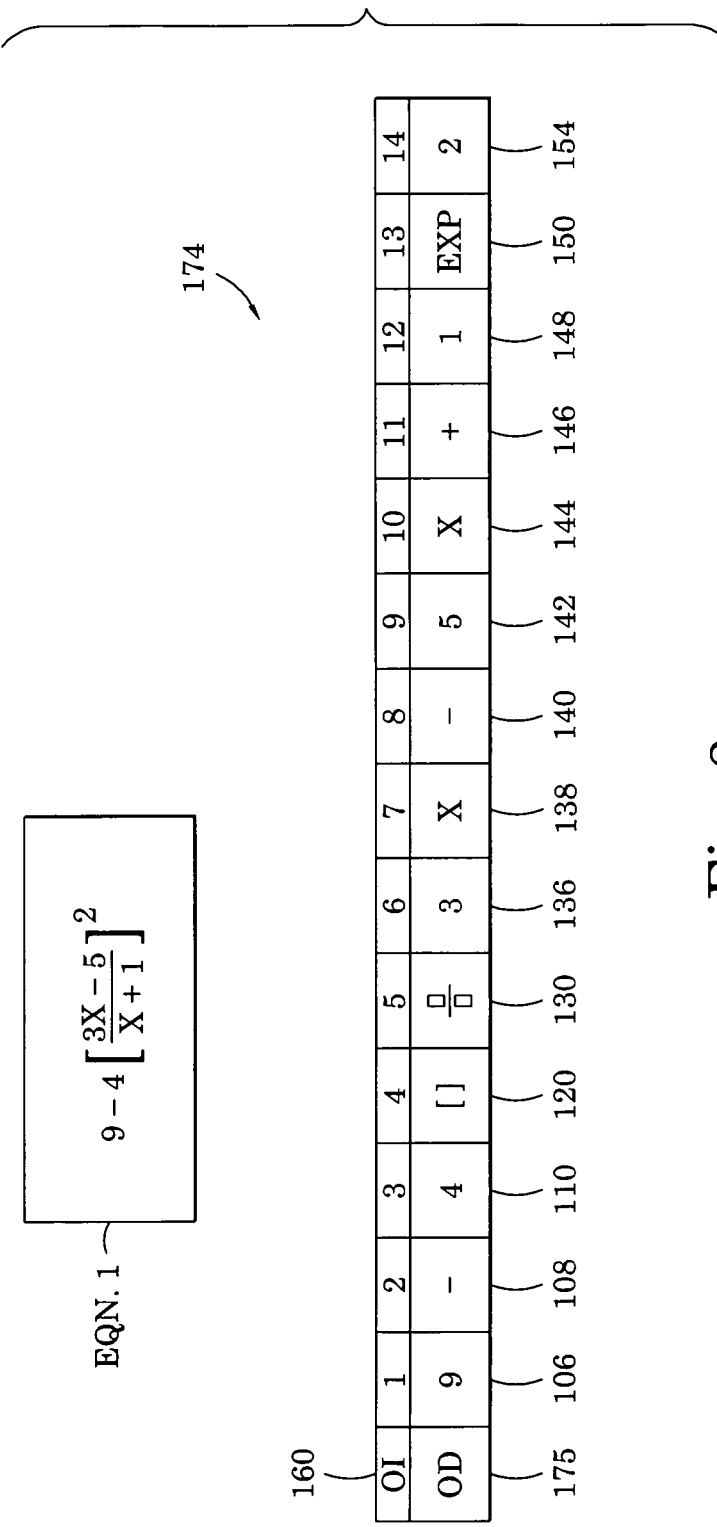
FIG. 3 is a schematic diagram showing the assignment of object identifiers for objects depicted in the object-field diagram of FIG. 2.
Figure 4:
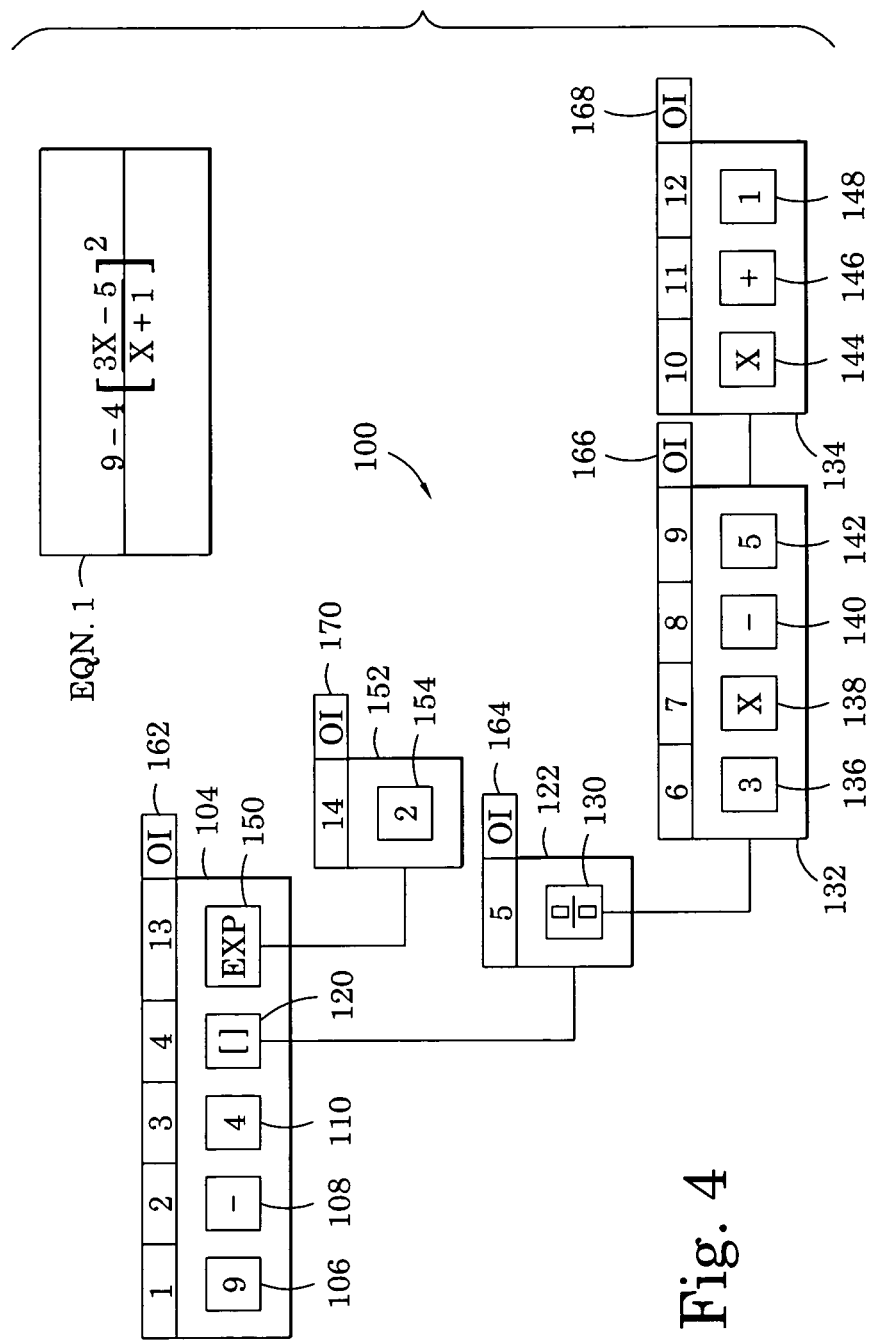
FIG. 4 is a modified version of the object-field diagram of FIG. 2, and showing the locations of the object identifiers of FIG. 3

As indicated above, each object in the object field diagram 100 can be assigned a respective object identifier or object index. Turning now to FIG. 3, a diagram depicts how object identifiers can be assigned to the objects of FIG. 2. FIG. 3 includes a table 174 having a first row 160 which is identified as "OI" for "object identification", and a second row 175 identified as "OD" for "object description". The object identification row includes a linear series or sequence of numbers, starting with the number 1 and ending with the number 14 (for convenience, the root object from FIG. 2 has been omitted in FIG. 3). Immediately beneath each object identifier is the associated object. So, for example, the square-bracket object 120 is identified as object 4 in the sequence of object identifiers (here, object numbers). Turning now to FIG. 4, the object-field diagram 100 of FIG. 2 is again depicted but now also depicting the objects with their respective object identifiers from FIG. 3. (For convenience, the root object, object slots and field slots from FIG. 2 have been omitted in FIG. 4.) Specifically, immediately above each field in FIG. 4 the an object identifier line has been added, indicated by "OI", and the object identifiers for the objects within each field have been placed in the object identifier lines immediately above their respective objects. So, for example, the root field 104 has associated object identifier line 162, the constituent field 122 belonging to the square-bracket object 120 has associated object identifier line 164, the numerator field 132 of the fraction object 130 has associated object identifier line 166, the denominator field 134 of the fraction object 130 has associated object identifier line 168, and the field 152 belonging to the exponent object 150 has associated object identifier line 170. Each object identifier line in FIG. 4 represents a subsequence of the full sequence of object identifiers (i.e., objects 1 through 14) shown in FIG. 3. For example, the subsequence of object numbers (object identifiers) associated with field 104 is {1, 2, 3, 4, 13}. In like manner the guest objects of the numerator field 132 of the fraction object 130 are identified by the subsequence of object indices (object identifiers) consisting of indices 6 through 9, and the guest objects of the denominator field 134 of fraction object 130 are identified by the subsequence of object indices 10 through 12. Likewise, the subsequence of object identifiers (object indices) for the exponent field 152 is the single object identifier 14, referring to the object 154 consisting of the number "2".

For example, with respect to FIG. 4 and the above described 5-tuple form of a data structure for describing mathematical expressions, the primitive object 144 ("x") can be associated with the 5-tuple "(10, x, 5, fr, 2)" wherein: the first coordinate "10" gives the object identifier (OI) which indicates that object 144 is the $10^{th}$ object entered in the mathematical expression according to the infix entry process; the second coordinate "x" gives the object descriptor (OD) which indicates the type of object; the third coordinate "5" is the host object identifier (HOI) which is the object identifier (OI) of the host object of object 144 (further indicating that the host object is the $5^{th}$ object entered according to the infix entry process); the fourth coordinate "fr" is the host object descriptor (HOD) which is the object descriptor (OD) of the host object, indicating that the host object of object 144 is a fraction object; finally the fifth coordinate "2" is the field descriptor (FD) of the host field of object 144, which indicates that the host field is field number 2 (with respect to the infix entry process) of the host object, which together with the host object descriptor "fr" also indicates that the host field is a denominator field.

In one embodiment the slots in any field in the object-field diagram 100 appear from left to right in the order in which they are created, and have the same order as their relative order in the slot sequence, the slot sequence being created by the infix entry process as described above.

As described above, in the object-field diagram embodiment of FIGS. 2-4 the sequence of the object identifiers can be assigned according to an infix entry process. In this process, as objects are entered by the user, they are automatically assigned object identifiers (object indices) by the program which controls the mathematics system. Within any given field which describes the overall mathematical expression, contiguous primitive objects within that field are assigned sequential object identifiers. (Thus, for the numerator field 132 of the fraction object 130 of FIG. 4, the contiguous primitive objects 136, 138, 140 and 142 are assigned sequential and respective object identifiers of 6, 7, 8 and 9.) However, any object immediately following a non-primitive object within a field is assigned the next higher object index following the last (i.e., immediately previous) object index following the infix entry process. Thus, in the example of FIG. 4, the exponent object 150 (following the non-primitive square-bracket object 120) is assigned the object identifier (object index) of 13, since in the infix entry process which is provided for this embodiment, the last prior object entered prior to entering the exponent object 150 will be object 148, which is assigned the object index of 12.

More specifically, with respect to FIG. 4, a user entering the mathematical expression of EQN. 1 will enter the mathematical expression according to the assigned infix entry process as follows. Upon initiation of an expression entry routine in the program, the program will present to the user (via the display device 34 of FIG. 1) the empty root (or initial) field 104. The user will then enter the first object (object 106), and the program will assign this object the object identifier or index of "1". The user will next enter the primitive objects 108 and 110, and the program will assign these primitive objects the respective indices of "2" and "3". Following entry of the primitive object 110, the user will then next enter the non-primitive square-bracket object 120, to which the program will automatically assign the object identification number 4. (Entry of the non-primitive square-bracket object 120 can be accomplished by, for example, the user selecting the object 120 from a graphical object menu via a graphical user interface ("GUI"), or by a hot-key (e.g., the left square-bracket of a keyboard, and the program will thus automatically provide the square-bracket object 120 which includes both left and right square brackets).) Once the square-bracket object 120 is presented to the user on the display device, the cursor will be placed within the square brackets themselves at field slot 124 (FIG. 2), which is representative of the first (and only) field 122 of the square-bracket object 120. The user then enters a fraction object 130 in the field 122 of the square-bracket object 120, and the program will automatically assign the fraction object 130 the object identification number 5. At this point the fraction object 130 is presented to the user on the display device, showing the two fields 132 and 134 of the fraction object, with the cursor being placed at field position 133 (FIG. 2) in the numerator field 132. (Both of these fields are empty at this point.) The user then populates the numerator field 132 with the four primitive objects 136, 138, 140 and 142, to which the program automatically assigns respective object identifiers of 6, 7, 8 and 9. Once the user has finished populating the numerator field 132 with objects, the user can move to the denominator field 134 merely by pressing "enter", a right-arrow key, or a down key, at which point the cursor moves to field slot position 135 of the denominator field 134. The user then populates the denominator field 134 with the primitive objects 144, 146 and 148, and to which the program automatically assigns the respective object identifiers of 10, 11 and 12. To indicate completion of populating the denominator field 134, the user can merely press "enter" or a right-arrow key, at which point the cursor moves to object slot 123 of the fraction object 130 (FIG. 2), thus allowing the user to enter additional objects within the square-bracket object 120 following the fraction object 130. (Fraction object 130 only contains two fields 132 and 134, and thus when a user has completed population of the second field 134, the cursor moves to the object slot 123 of the fraction object 130.) If the user does not wish to enter any additional objects into the square-bracket object 120, the user can then again press "enter" or a right-arrow key, at which point the cursor moves to object slot 127 of the square-bracket object 120, at which point the user can enter the exponent object 150. Exponent object 150 is automatically assigned the next sequential object identifier, being object identifier or index 13, and the exponent object 150 is presented on the display device to the user indicating the single field 152 for that object. The user then populates the field 152 of the exponent object 150 with the primitive object 154 (being the number (digit) "2"), which is automatically assigned the next sequential object identifier of 14. At this point the entry of the expression of EQN. 1 is complete, but the user can press enter or use a right arrow key or a down arrow key to send the cursor to the object slot 155 of the exponent object 150, which places the cursor in the last slot of the root field, i.e. the last slot in the slot sequence of the mathematical expression.

In general, following the population of a field, the user can indicate that the content of the field is complete by a single command from a keyboard or the like, e.g., pressing "enter" on a keyboard, or using a right-arrow key to move the cursor to the field slot of the next field so that the next is ready to be populated. Further, if there are no more fields in the host object, the cursor is moved to the object slot of the host object (immediately to its right).

One advantage of assigning object identifiers to the objects of a mathematical expression according to an established infix entry process is that a user can navigate entry of a mathematical expression by merely using simple keyboard (or other) commands such as "enter", "left" and "right". Further, a user can traverse the entire mathematical expression using only "left" and "right" cursor controls. More specifically, using an infix entry process (along with specific rules assigned to non-primitive objects for data entry) avoids the requirement of a user having to use a pointing device to move a cursor in order to indicate that population of a field is complete.

Figure 19A:
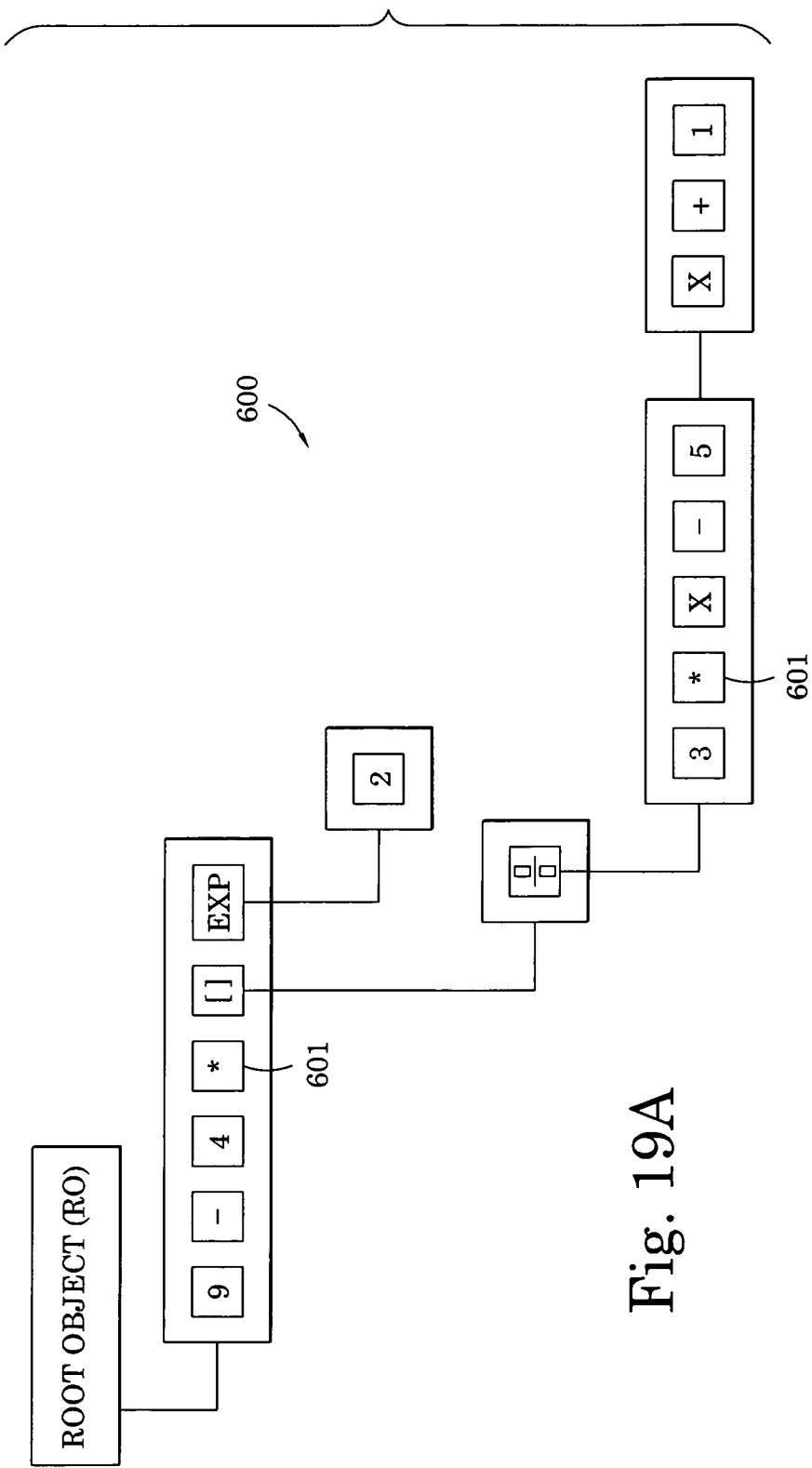
FIGS. 19A through 19R (excluding FIG. 19O) are diagrams depicting a sequential transformation of an object-field diagram into a content tree.

For purposes of mathematical calculation, the object-field-diagram-based data structure can be used, although certain modifications from the form used to edit mathematical expressions are typically done in order to facilitate mathematical calculation. (This assumes an absence of error conditions such as syntax errors, incorrect juxtaposition of objects, empty fields, etc.) As a first step, all slots can be removed from the data structure (although we can still refer to object segments and field segments much as before). Then implicit multiplication objects can be inserted into the object-field diagram (data structure). (For example, the field segment "3X" becomes "3*X", where "h" denotes the implicit multiplication operator, to indicate that the object "X" is multiplied by the object "3".) Note that having a "virtual" object slot for an implicit multiplication object is not necessary, and such an artificial construct would have no significance as a cursor position. FIG. 19A shows implicit multiplication operators inserted into the object-field diagram of EQN. 1. Note that while implicit and explicit multiplication operators are mathematically equivalent, in certain instances they may not be considered interchangeable where further processing of the data structure is performed (e.g., where the program performs a step-by-step solution of an equation to the user). The same consideration applies to using fraction notation versus a division sign. Next, decimal and/or digital strings and repeating objects in the object-field data structure are tokenized (bundled) into different types of number objects such as integers, finite decimals and repeating decimals. (These number objects can include unary signage.) For example, for a contiguous string of two or more primitive digit objects, rules can be applied to tokenize (bundle) the string as a single primitive number object (e.g. "7", "3", and "1" will be tokenized to the primitive number object "731"). Likewise, if two primitive number objects are separated by a decimal point object (also known as a "period" object), then the rules in the program for the mathematics system can tokenize that string as a single primitive decimal object.

Object-Field Tree Embodiment

Figure 5:
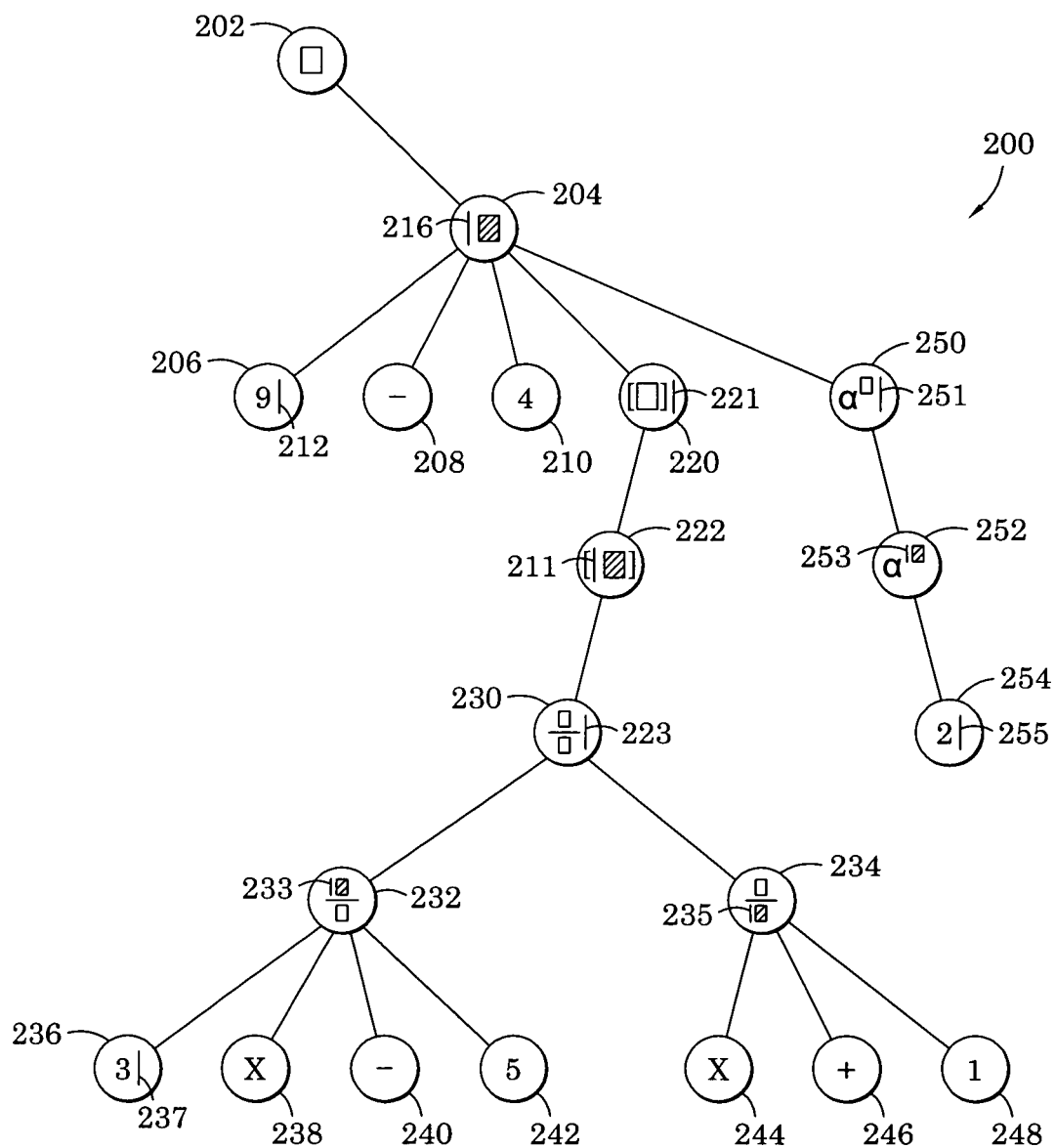
FIG. 5 is a schematic of an object-field tree representing another kind of data structure that can be used for a mathematics system as provided for herein.

In another embodiment, a mathematical expression in accordance with the present disclosure can be represented by an object-field tree (in contrast to the object-field diagram of FIG. 2). An example of an object-field tree 200 of EQN. 1 is depicted in FIG. 5. In the example of FIG. 5 we will use an open square to represent a field in the depiction of the object node corresponding to its associated non-primitive object, and a shaded square to represent that field in the depiction of the field node corresponding to that field (the other fields of its associated non-primitive object being represented therein by open squares). The object-field tree begins with the root object 202, from which descends a single node 204, being the root field for the mathematical expression. The root field 204 is singular, as indicated by the single box contained within the circle 204 depicting the root field. Further, a field slot 216 can be associated with a cursor position for the field 204. The root field 204 hosts the primitive guest objects 206, 208 and 210, as well as the non-primitive guest objects 220 (a square-bracket object) and 250 (an exponent object). Each object within the object-field tree 200 can have an associated object slot, as indicated by object slot 212 which is associated with object 206.

Still referring to FIG. 5, square-bracket object 220 is defined by a single field 222, as indicated by the single box contained within the circle 222 depicting the field of the square-bracket object. In turn, the single field 222 of the square-bracket object 220 hosts (in this example) a single fraction guest object 230. The fraction object 230 has an associated fraction object slot 223 which is similar to the fraction object slot 123 for the fraction object 130 of FIG. 2. As indicated in circle 230 by the graphic symbol, the fraction object 230 has two constituent fields, indicated by field nodes 232 (the numerator field node) and 234 (the denominator field node). Field nodes 232 and 234 have associated and respective field slots 233 and 235. Numerator field 232 hosts guest objects 236, 238, 240 and 242, and denominator field 234 hosts guest objects 244, 246 and 249. In like manner, exponent object 250 is defined by a single constituent exponent field 252, which in this example hosts the single primitive guest object 254. The exponent object 250 has an associated object slot 251, the exponent field 252 has an associated field slot 253, and the object 254 (the number "2") occupying the exponent field 252 has an associated object slot 255.

In viewing FIG. 5 it will be appreciated that as the object-field tree 200 descends from the root object 202 downward, the alternating sequence of nodes (following a continuous path) is from object to field to object, etc. (E.g., from root object 202 to root field 204; then from root field 204 to square-bracket object 220; then from square-bracket object 220 to square-bracket field 222; then from square-bracket field 222 to fraction object 230; then from fraction object 230 to numerator field 232; and then (and finally) from numerator field 232 to primitive object 236.) As can be appreciated, there can be several different alternating sequences depending on which path is chosen.

As can also be seen from FIG. 5, in addition to the alternating sequences of objects and fields, the object-field tree 200 also has alternating sequences of field slots and object slots. For example, there is the sequence given by the following sequence of slot numbers (with respect to FIG. 5 rather than the slot sequence): 216, 221, 211, 223, 233, 237. The field slots and object slots thus form an alternating sequence of respective left and right justified slots in the object-field tree 200.

Figure 6:
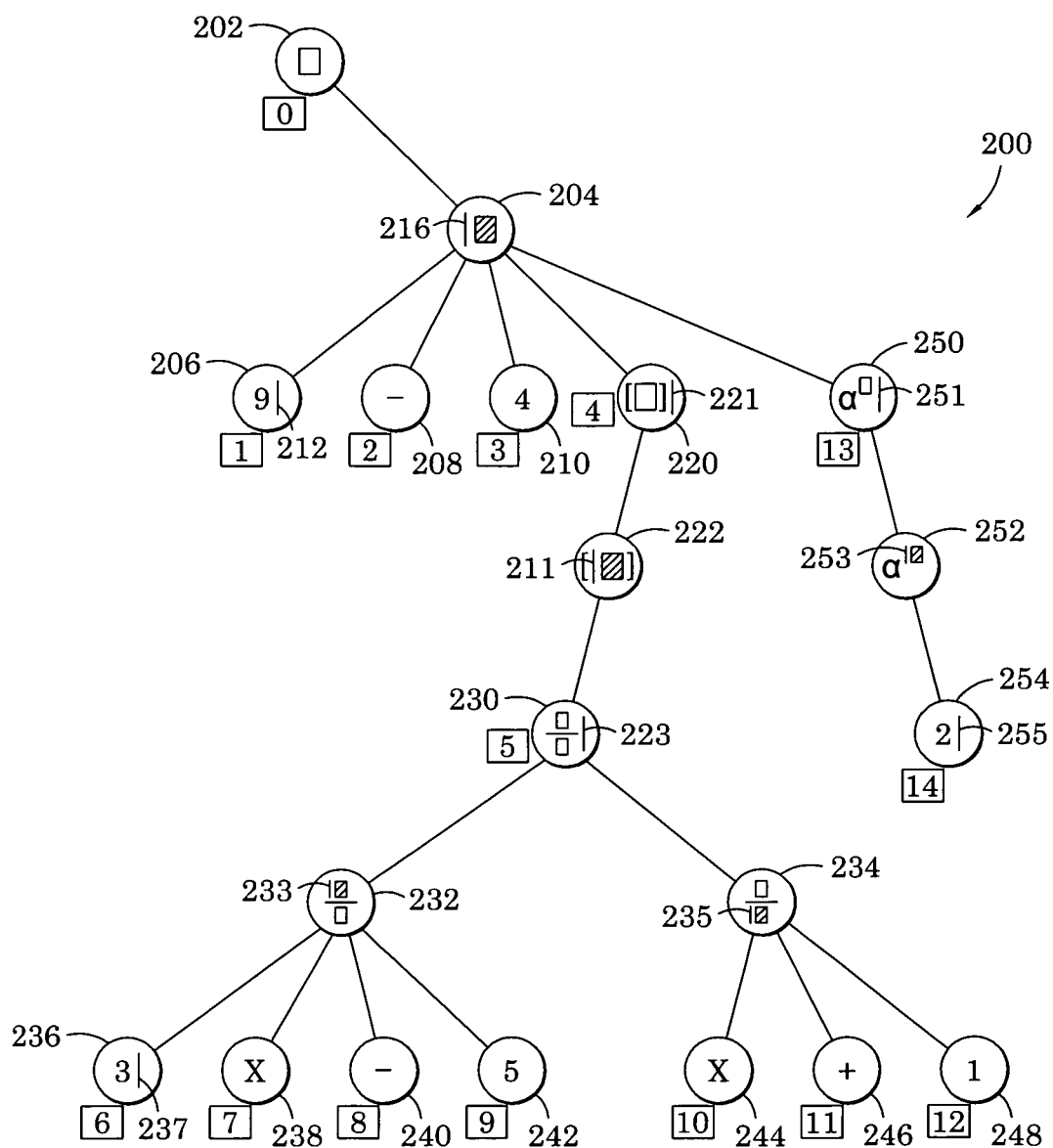
FIG. 6 is a modified version of the object-field tree of FIG. 5 showing the application of node numbers.

FIG. 6 is a copy of the object-field tree 200 of FIG. 5, but further including the assignment of object identifiers with each object in the object-field tree. More specifically, each object in the object-field tree 200 has an associated object identifier, and the object identifiers are depicted a box that is in contact with each object circle. Thus, for example, object 236 has associated object identifier (index) 6, and the root object 202 has associated object identifier 0 (zero). The assignment of object identifiers to the objects in the object-field tree 200 of FIG. 6 corresponds to the assignment of object identifiers to objects in the object-field diagram of FIG. 4. A distinction of the differences between the object-field diagram of FIG. 4 and the object-field tree of FIG. 5 is that in FIG. 4 the fields are represented as being rectangular boxes into which their respective guest objects are placed in order, whereas in FIG. 5 the fields are represented as being nodes. (For example, in FIG. 4 numerator field 132 is represented by a rectangular box containing there-within the objects 136, 138, 140 and 142, whereas in FIG. 5 the numerator field 232 is depicted as a node, having objects 236, 238, 240 and 242 depending therefrom.) As can be seen in the object-field tree 200 of FIG. 6, the field nodes (i.e., nodes 204, 222, 232, 234 and 252) are identified according to field type and are shown as child nodes of the nodes corresponding to the non-primitive objects to which their respective fields belong. Note that the object identifiers in FIGS. 4 and 5 are the same—i.e., in both diagrams they arise from the infix entry process in the same way.

Object-field-tree-based data structures can also be used for mathematical calculation; with modifications to object-field-tree-based data structures that are used for formatting mathematical expressions being analogous to the corresponding modifications for object-field-diagram-based data structures (described above), such as insertion of implicit multiplication operator objects, and such as tokenization.

Multi-Expression Data Structures:

The above data structures can be modified for multiple expressions (as in a mathematical document). The root objects of those expressions can be ordered by a modified infix entry process. For example, when the cursor is in the last slot of a first mathematical expression, an enter command can create a second expression whose root object follows the root object of the first expression, with the cursor going to the newly-created root field of the second expression. As is illustrated by Fig. X2, in the case of the object-field diagram, there can be a document object H13, with a single document field H15, whose guest objects are the ordered root objects of the mathematical expressions in the document (ME1 H17, ME2 H19, ME3 H21). Like the root objects, neither the document object nor document field need to have any slots belonging to them. The document object can have an associated slot sequence, obtained for example by concatenating the slot sequences of the mathematical expressions in the order of their respective root objects. Analogously, as is illustrated by Fig. X3, the object-field tree can have a document node H23 object at the top, with a document field node H25 depending from it. Ordered root object nodes (ME1 H27, ME2 H29, and ME3 H31) depend from the document field node H23. An associated slot sequence can be obtained in ways analogous to those used for the object-field diagram.

Graphical User Interface

Figure 7:
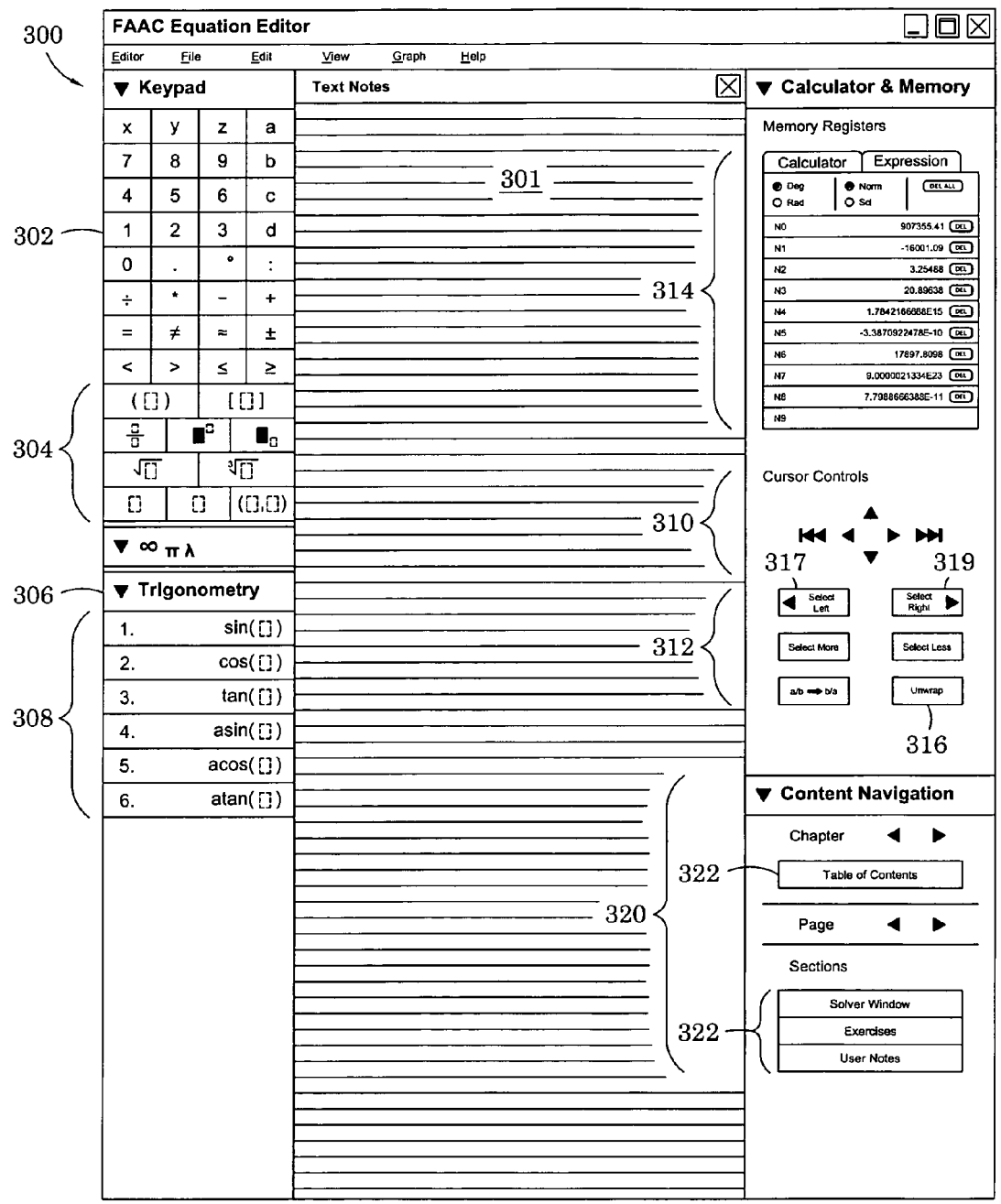
FIG. 7 is a depiction of a computer display of a graphical user interface that can be used with a mathematics system as provided for herein.

FIG. 7 is a screen shot of a graphical user interface (GUI) 300 that can be used with a mathematics system in accordance with the present disclosure. The GUI 300 includes an expression display area 301 where a user can enter, display and edit mathematical expressions. Controls within the user interface 300 can be operated, for example, by a computer mouse and/or keyboard shortcuts. The user interface 300 can also be implemented as a touch screen, and can also be configured to allow user inputs by a combination of touch commands, keyboard commands, and/or computer mouse commands. For purposes of discussion, it will be assumed that the GUI 300 is operated using a computer mouse. The GUI can include a keypad 302, and a menu 304 of commonly used non-primitive objects such as fraction, radical, brackets, etc. The GUI 300 can also include a drop-down menu selection 306 of special non-primitive objects which are displayed as a special menu 308 below the drop-down control 306. For example, the drop-down menu selection 306 can include trigonometry functions (as shown), calculus functions, statistical functions, etc. The GUI 300 can also include cursor controls 310, which can also include controls to move the cursor to the beginning or end of a field. In one variation a program which generates the graphical user interface can enable a user to access additional information relating to objects displayed on the menus. For example, the program can allow a user to place a pointing device on a menu icon and then access additional information (e.g., by a right-mouse click, or a keyboard command), which will cause a text window to open on the display (e.g., next to the object icon). The text window can include information describing the specific object, any associated constituent fields, and any limitations assigned to the object (e.g., for a mid-level educational version of the program, the text box can describe limitations for the radicand field for a radical object by indicating "the radicand field is limited to whole numbers and single-letter variables only").

The GUI 300 can also provide access to memory registers via a memory register menu 314, which can allow the user to store numeric values and mathematical expressions in the memory device. As depicted, the memory register menu 314 can include tabs for each of the types of memory registers (i.e., numeric and expression). More specifically, the numeric registers are under the "Calculator" tab, and thus any mathematical expression input into one of the numeric registers under that tab will be automatically calculated for its numeric value (if such calculation is possible), and the result then stored in that register. Further, the memory register access controls can enable editable pop-outs for numeric fields in order to display the entered expression if that expression did not contain memory variables (this can be implemented as a feature of some numeric fields, such as those related to graph objects described below, but can be implemented in general). For example, if the expression "$\sqrt{2}$" is stored in numeric register "A", then the value is calculated and stored as 1.41 . . . . However, by an action (such as the right-click of a computer mouse when the cursor is placed over the graphical access control for register "A") the expression "$\sqrt{2}$" can be displayed.

The user interface 300 can further include selection and edit controls 312. As depicted, the selection controls 312 can include controls to allow the user to select portions of a mathematical expression either to the left or to the right of a cursor position. The selection controls can also include controls to allow the user to increase or decrease a current selection using respective "Select More" and "Select Less" controls. The operation of the selection controls will be described more fully below. As indicated in FIG. 7, the edit controls 312 can also include a control to allow a user to take the reciprocal of a fraction object.

As depicted in FIG. 7, the edit controls 312 of the GUI 300 and can also include an "Unwrap" control 316 which can be used to operate an unwrap function. The unwrap function will be described below. In addition, there can be a setting control for the user level of the interface, so that the interface is configured for students at a particular level. For example, the controls and display format appropriate to a junior high-school student may be different to those for a calculus student, and so a lower level setting can be used for the middle school student, involving such changes as fewer and simpler controls that restrict user input accordingly. In one variation, documents can be created or edited in one setting and then the setting control can be used to view or edit the document in another setting. For example a document created in a junior-high-school-level setting can be viewed in calculus-level setting. Such a shift in level can be performed if the document does not contain particular types of content that are disallowed at the newly-desired level; otherwise the control to go to that level can be disabled for the document. For example, everything at the junior-high-school-level can be allowed to shift up to the calculus-level, but a document containing integrals can be disallowed from shifting down to the junior-high-school level.

The user interface 300 can also include content navigation controls 320, which can include a control 322 to allow a user to view the table of contents in a drop-down menu format. As indicated, the GUI 300 can also include a chapter control which can enable forward and reverse browsing through the table of contents. Examples of contents include: (i) contents similar to those of a mathematics textbook (e.g., for use of the program in a mid-level academic environment); (ii) contents sorted by fields of study such as "physics", "chemistry", "engineering", "mathematics" etc. for expanded use in an academic environment (or use in industry); and (iii) contents sorted by application (e.g., if the program version is intended for use by an engineering consulting business, the contents can include "engineering calculations", "statistics", and "finance"). The table of contents can be edited to add or delete contents as appropriate for any intended use of the program. As indicated, the content navigation controls 320 can include a control (not numbered) to allow a user to page upward and downward through any chapter of the contents. In one example the memory registers 314 can be particular to the selected "contents". For example, if a user has selected "chemistry" from among "physics", "chemistry", "engineering" content options, then the memory registers displayed at that time are particular to that content selection. Thus, there is a numeric memory register N1 for the physics section, another numeric memory register N1 for the chemistry section, and so on. In another variation the assignment of memory registers can be further refined to an even smaller scale, e.g., chapters under content headings, (in which case there can be, for example, several "N1" registers under any given content selection, and the registers will be further distinguishable from one another based on a chapter selection). In a further variation the memory registers 314 can be particular to any given document. So, for example, any given document can have an associated set of memory registers (e.g., numeric registers N1-N99 and expression registers E1-E99). In this way, when the user saves a particular document in computer-readable memory, the associated contents of the memory registers are saved along with the document. In yet another variation a user can assign a name to a group of memory registers based on the particular item or document the user is working on at the time, and can also allocate the requisite or desired number and type of memory registers for the document. In one variation, each document can have its memory of opened pages in the content material, so that when the document is accessed, those particular pages of the content are opened together with the related user-generated material.

Figure 13A:
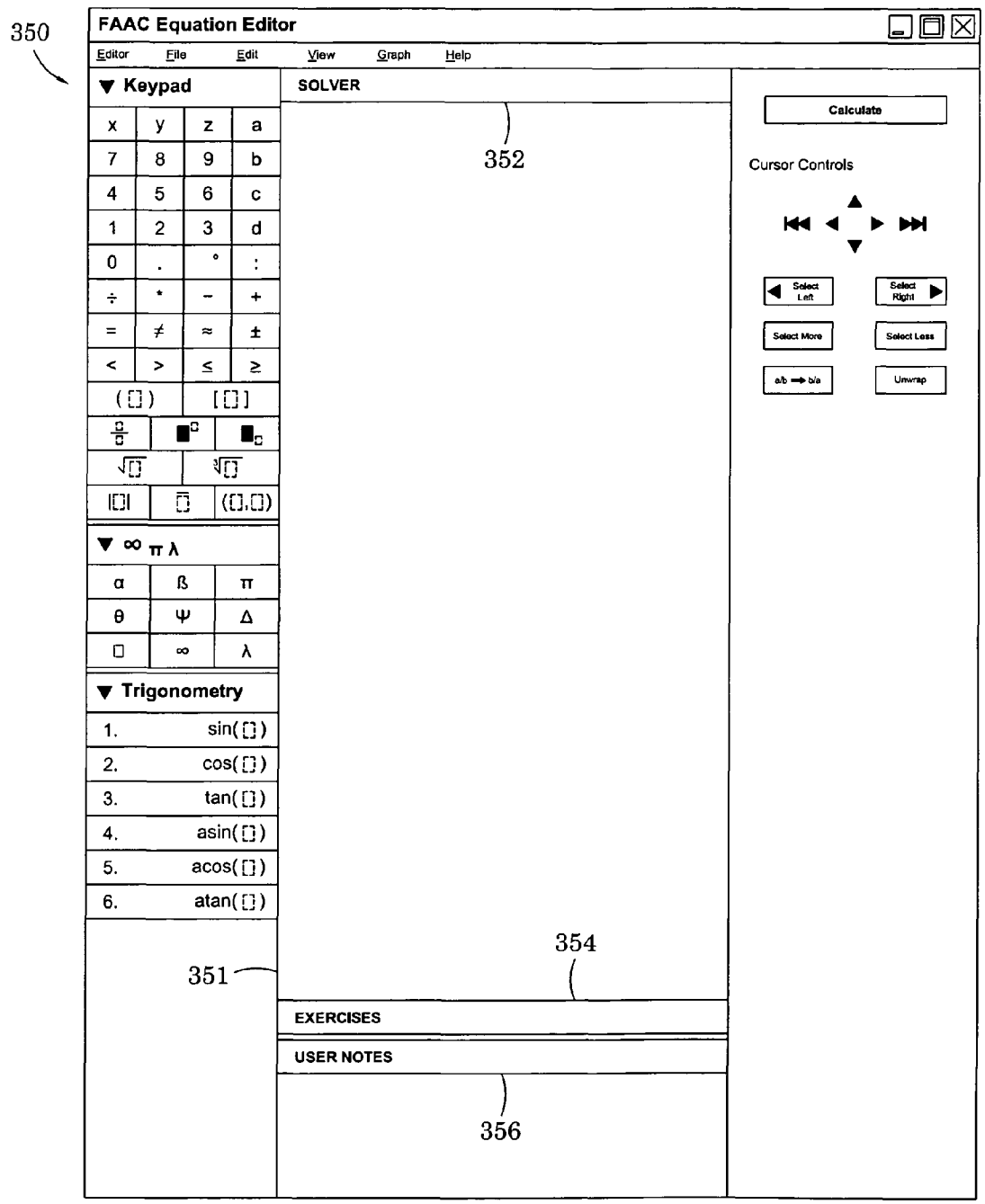
FIGS. 13A through 13C are depictions of a computer display of a graphical user interface that can be used with a mathematics system as provided for herein, showing how user-accessible windows can be overlapped on the display.
Figure 13B:
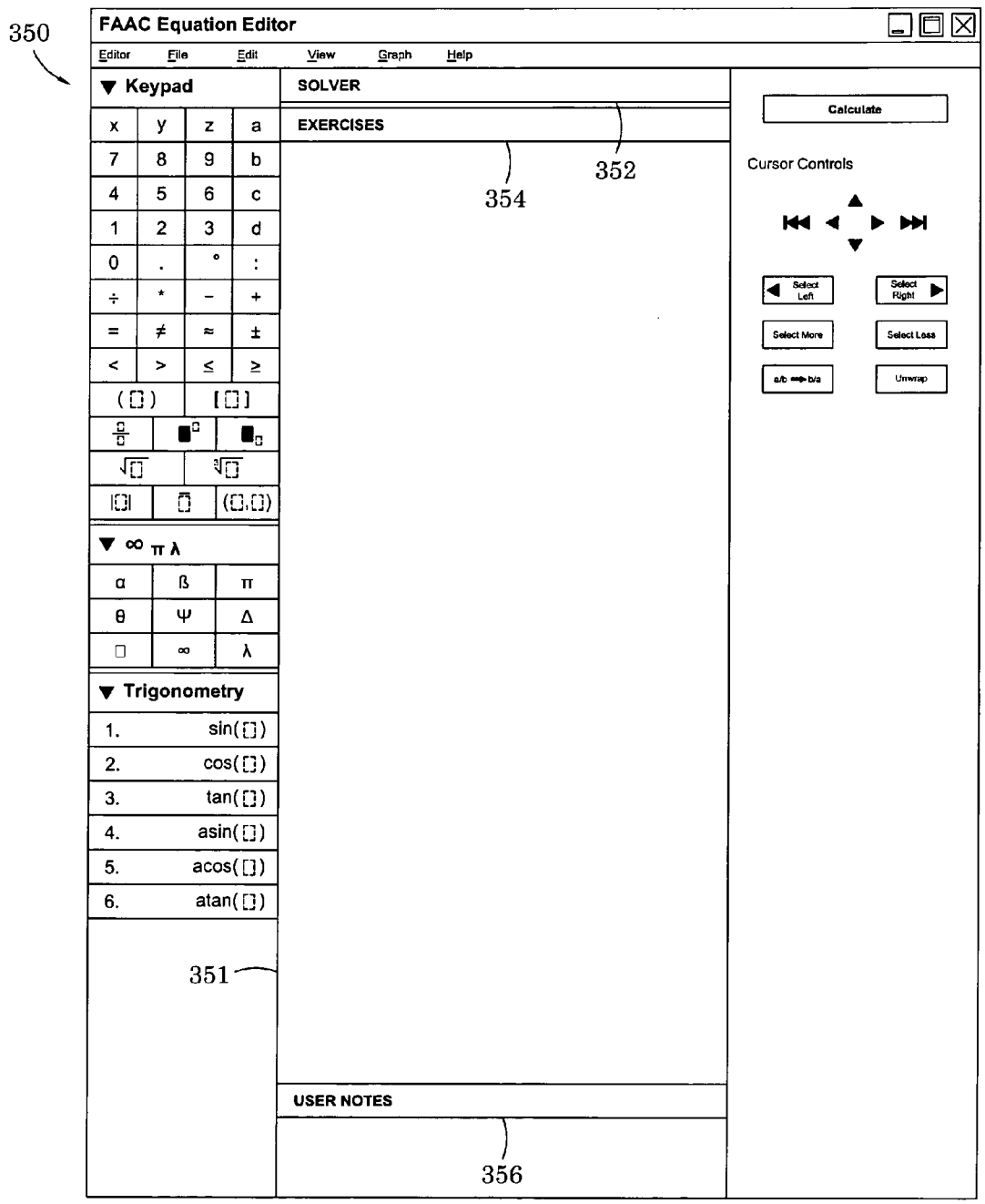
Figure 13C:
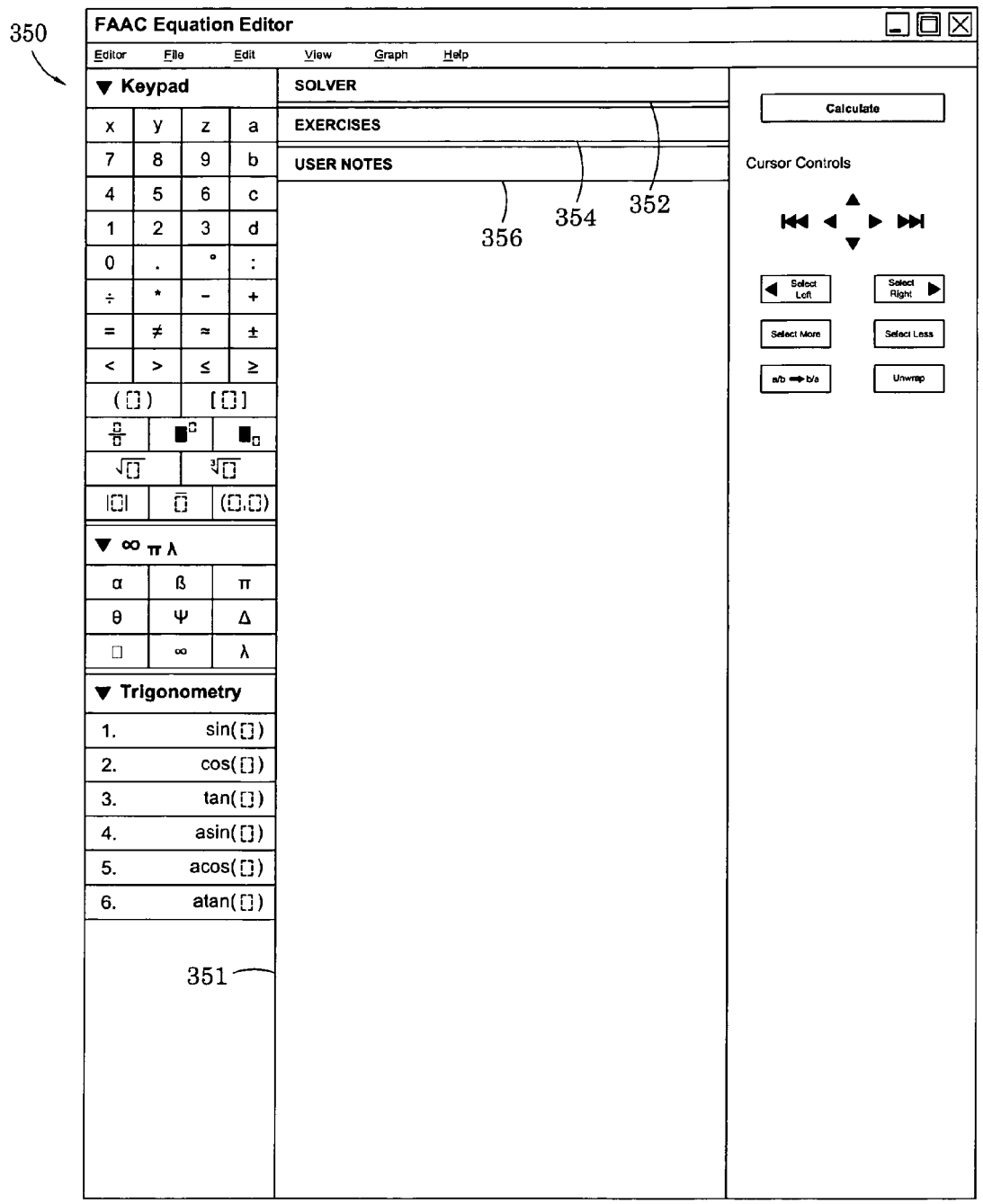

The content navigation controls 320 of FIG. 7 can also include a section control 322 to allow a user to access different sections for any given chapter of the contents. In the example shown, the sections available for access are "solver window", "exercises" and "user notes". The choice of sections provided in this example is particularly useful for students in an academic environment. For example, "solver window" can allow a user to enter problems to be solved automatically and displayed in the display area 301, "exercise" can be a display of one or more pages from an electronic book (or e-book) in the subject of mathematics in the display area 301, and "user notes" can enable a user to enter their personal notes in display area 301 (such user notes can include automatically generated solutions to problems entered via a solver window). In one variation, the section selection 322 can be presented to the user as a plurality of louvered or offset overlapping windows in the display area, as depicted in FIGS. 13A through 13C. In FIG. 13A the display area 351 is available for use for entering and editing mathematical expressions, as indicated by the "solver" tab at the top of the display area. The tabs 354 and 356 for the respective sections "exercises" and "user notes" are located towards the bottom of the display area 351. If a user accesses the "exercises" section tab 354 (for example, by placing a screen pointing device on the tab and performing a mouse click), the section heading moves to the position depicted in FIG. 13B under the "solver" section tab. At this point the user can read information in the viewing area 351 pertaining to exercises, can copy mathematical expressions from the "exercises" section to a clipboard for later pasting into a memory location or into the "solver" section, etc. Finally, in FIG. 13C if the user accesses the "user notes" section tab the section heading moves under the "exercises" section heading as depicted, and the user can then enter notes into the display area using a text editing program or the like.

Special Data Entry Windows within a Graphical User Interface

The graphical user interface 300 can further include conversion features (not specifically depicted in FIG. 7) to allow a user to convert symbolic expressions or numeric field values to other symbolic expressions or numeric field values. The two types of data, symbolic and numeric, thus define four basic conversion types: symbolic to symbolic; symbolic to numeric; numeric to symbolic; and numeric to numeric. In general, for a conversion to take place the following elements are provided: (i) an input mathematical expression; (ii) and implicit or explicit specification of a conversion type; and (iii) an output location. An example of symbolic to symbolic conversion is that some expressions (which can contain numeric memory variables) can be converted to fractions. An example of symbolic to numeric conversion is given by the numeric memory registers themselves, which can perform numeric calculation of some selected symbolic expressions. An example of numeric to symbolic conversion is that some numeric field values can be converted to fractions. (The conversion algorithm for converting numeric fields to fractions can be based on detected repetition of digit strings. Since this algorithm is based on finitely many decimal places stored in memory, it is essentially an approximation, but generally yields acceptable results.) An example of numeric to numeric calculation is conversion of a numeric field value for an angle measure in degrees to a numeric field value representing that angle measure in radians. Different methods are available to implement such conversion features. For example, with a symbolic to symbolic conversion, a symbolic expression can be selected, after which a conversion menu can be opened for that selection, from which the user can select a conversion type to yield a new symbolic expression to replace the selected expression, or to place the converted expression elsewhere (for example at a new cursor position). Symbolic to numeric conversion can be implemented, for example, by the "numeric field calculator" feature (described below) or by the numeric memory registers. Numeric to symbolic conversion can be implemented for example by the user selecting the input numeric field, then opening a menu and choosing a conversion type, after which output is automatically inserted at the cursor, position. Numeric to numeric conversion can be implemented, for example, by the user selecting an input numeric field, selecting the conversion type, and selecting an output numeric field. An alternative method to implement conversion of numeric field values to fractions can be to have the same procedure as for saving a selected symbolic expression to a symbolic memory register, except that instead of a selected symbolic expression as input, a selected numeric field is used as input. If the conversion is possible, the resulting fraction then appears in the output symbolic memory register. A general conversion feature can be implemented by means of the types of menu-driven controls as described below (such as controls that combine horizontal and vertical menus), which allow combination of disparate types of control input, such as symbolic fields, numeric fields, ordinary buttons, radio control buttons, check-boxes, etc.

Editable Numeric Fields

The user interface 300 can further include a "numeric field calculator" window (or equivalent thereof, not shown) in order to allow a user to enter a symbolic mathematical expression for calculation of a numeric field. For example, if the approximate numeric value of the symbolic expression "$2\pi$" is desired in a numeric field (such as one of the settings for a graph window), then the "numeric field calculator" window (or its equivalent) allows the user to enter the symbolic expression "$2\pi$". Then the decimal approximation (approximately 6.28) is automatically calculated, appearing in the numeric field. If an expression containing any memory variables such as N1, N2 etc. has been entered using a "numeric field calculator" window, the window can be configured to no longer show that expression, and that expression will not be retained in symbolic memory. This feature ensures that changes in values of memory variables do not change any previously calculated numeric field values. If an expression entered into a "numeric field calculator" window does not contain memory variables, the window can be used to view or edit the expression that was calculated. In the previous example the user can use the "numeric field calculator" window to view the expression "$2\pi$" that was calculated to give the numeric field value of approximately 6.28. Typically (although not in the previous example) this conserves memory space, since normally numeric fields are displayed rather than the expressions used to calculate them. For a numeric field whose input symbolic expression contained memory variables, the "numeric field calculator" window can be empty when reopened, so that the user can enter a new expression to calculate a replacement value for that numeric field. This feature can be used for the numeric memory register as well, so that it can store a symbolic expression used to calculate it if that symbolic expression did not contain any numeric memory variables. A "numeric field calculator" window can be opened for a numeric memory register to edit such a symbolic expression and recalculate the value in that numeric memory register. Copying the contents of one numeric field to another numeric field can also automatically include copying the symbolic memory for the associated "numeric field calculator" windows.

Rounding Functions

The user interface 300 can further include a rounding function in order to allow a user to round a value in a numeric field. The rounding function can include a sub-selection to allow the user to select the number of decimal places to be used in the rounding operation. The rounding operation can follow the general rules of rounding—i.e., rounding the last decimal place to be displayed down for values less than 5, and rounding the last decimal place up for values of 5 or greater. The rounding operation can also include a sub-selection to enable the user to select between merely displaying the rounded value (while the full value is retained in numeric memory), or also storing the rounded value in the numeric memory. Settings for numeric fields such as numeric memory registers can include such controls that allow control of the rounding of numeric values, both for display and for memory used for further calculation. Another type of rounding function can replace a memory variable in a symbolic expression with a finite decimal object that approximates the numeric value from the respective numeric memory register. In one variation the user can select one occurrence of a memory variable in a symbolic expression and access a rounding function to specify the form of rounded finite decimal approximation that replaces that occurrence of the memory variable in the expression. In another variation the user can replace every occurrence of a particular memory variable in a symbolic expression with a specified rounded finite decimal. This second variation can also be accessed by first selecting a single occurrence of the memory variable in question. The next step for the user can then be, for example, opening a menu. Both variations can be presented to the user as options, for example, in such a menu. Yet another type of rounding function can be used to insert a rounded finite decimal approximation of a numeric memory register value at the cursor position, with the user specifying the form of rounding. Rounding functions can be included as part of a general conversion feature as described above.

Editing of Mathematical Expressions

Various embodiments of the mathematics system provided for herein further provide for enhanced editing capabilities over prior art mathematical systems, as described more fully below.

Selecting of Portions of the Mathematical Expression

The present disclosure provides for portions of a mathematical expression displayed on a display device to be selected by a user and, once selected, the user can thereafter perform an edit operation (such as copy, cut, delete, paste, etc.) on the selected portion. Moreover, the selected portion of a mathematical expression can be represented on the display device using a visual cue such as different color background shading, different color font, etc. Various select operations will now be described in detail.

Select-More Operation

In one embodiment a mathematics system in accordance with the present disclosure includes a selection function which allows a user to select increasingly larger portions of a mathematical expression in a local nesting hierarchy of objects and fields. For convenience, we will call this function a select-more function (or a select-more operation). As indicated in FIG. 7, this select-more function can be implemented as one of the selection/edit controls 312 in the user interface 300.

FIGS. 8A through 8E depict an example of how the select-more function can operate. Specifically, FIG. 8A depicts EQN. 1 of FIG. 2, with a cursor at slot 147 which is located between objects 146 and 148 (i.e. the object slot of object 146) of FIG. 2. (Note that EQN. 1 is contained in the root field 104.) At this point, no selection has yet been made. If a user accesses the select-more function a first time, the denominator field 134 of the fraction object 130 (FIG. 2) is selected, as indicated by the cross-hatching in FIG. 8B. If the user subsequently accesses the select-more function again, then the entire fraction object 130 is selected, as indicated by the cross-hatching in FIG. 8C. Accessing select-more a third time will cause the square-bracket object 120 (along with the previous selection from FIG. 8C) to be selected, as indicated by the cross-hatching in FIG. 8D. Finally, accessing the select-more function one more time will cause the root field 104 (containing the entire mathematical expression of EQN. 1) to be selected, as indicated by the cross-hatching in FIG. 8E. The select-more function thus causes the selection to be increased up through the local hierarchy of objects and fields, as can be appreciated by viewing FIG. 2 in conjunction with FIGS. 8A-8E. Once a portion of the mathematical expression is selected (e.g., the field 134 as depicted in FIG. 8B, or the entire expression as in FIG. 8E), the user can then perform editing functions on the selected portion, such as to copy or delete the selection.

The sequence of selections depicted in FIGS. 8A-8E can be defined by a selection sequence which can apply to any mathematical expression which can be displayed on the user interface. Specifically, for every field there is a defined object-field sequence, the object-field sequence having the following terms: a first term which is an empty selection; a second term consisting of the field itself; if the field is not the root field, a third term comprising the non-primitive object to which the field belongs; and the object-field sequence continues with additional terms, alternating between fields and non-primitive objects to which the fields belong (as constituent fields) until the object-field sequence terminates with the root field (however, to allow for the case of multiple expressions, the object-field sequence can have added on to its end the union of all root fields belonging to root objects (mathematical expressions) in the document—the last term of this new sequence is neither an object nor a field, although the sequence can still be referred to as the object-field sequence). Using this object-field sequence, the select-more function selects the smallest term of a subsequence of the object-field sequence that contains the current selection, but is not equal to it. (In the illustrated example of FIG. 8A through 8E the subsequence is the object-field sequence itself.) Applying this description of the object-field sequence to the series of select-more steps in FIGS. 8A-8E, in FIG. 8A there is no current selection, and thus this is the empty selection which is the first term in the object-field sequence. At FIG. 8B the select-more operation has moved to the second term, which is the field itself (i.e., the denominator field 134 of the fraction object 130). At FIG. 8C the select-more operation has moved to the third term, which is the non-primitive object (i.e., the fraction object 130) to which the field (denominator field 134) belongs. At FIG. 8D the select-more operation has moved to the fourth term in the sequence, which is (according to the select-more function) "the smallest term of a subsequence of the object-field sequence" (in this case, the next field or non-primitive object that contains the field) "that contains the current selection" (the "current selection" in this example being the selection of the fraction object 130 in FIG. 8C) "but is not equal to it". That is, in FIG. 8D the selection is the square-bracket object 120 rather than the single field 122 of the square-bracket object (per FIG. 2), since selection of the square-bracket field 122 would be equal to the selection of the fraction object 130 FIG. 8D. Finally, at FIG. 8E the select-more operation has moved to the fifth term in the sequence, which is the selection of the root field 104 (being the next alternating field following the selection of the square-bracket object in FIG. 8D). And, being the root field, the selection sequence thus terminates (however in the case of there being more than one mathematical expression in the document, engaging the select more feature another time can in some embodiments select the root field of each expression in the document).

As can be appreciated, in one variation the actual selection sequence itself in any given instance can be based on the cursor position within the mathematical expression upon the initiation of the selection process. That is, the position of the cursor defines the first field which will be selected in the select-more operation (for example, by the cursor being in the field slot of that field or in the object slot of one of that field's guest objects) if the field is non-empty. (If the field is empty and not the field and not the root field, the non-primitive object in one of whose constituent fields the cursor is placed can be the first selection. For an empty field, the subsequence can contain the empty field or not.) Thus, if the cursor is placed in the root field, performing the select-more function will cause the root field to be selected, and the select-more operation terminates following this selection. Further, if the cursor is placed in an empty field in a non-primitive object that is not the root object, then the first selection in the select-more process can be to select the non-primitive object to which the field belongs, since the empty field is already deemed to be selected (i.e., the selection of the empty field is deemed to be equal empty selection).

In the embodiment described above the selection sequence is based on using the cursor position as the starting point for the sequence unless a selection has already been made, in which case the next term in the selection sequence is based on the prior selection. Further, in this embodiment the cursor stays stationary during the select-more operation.

Figure 15:
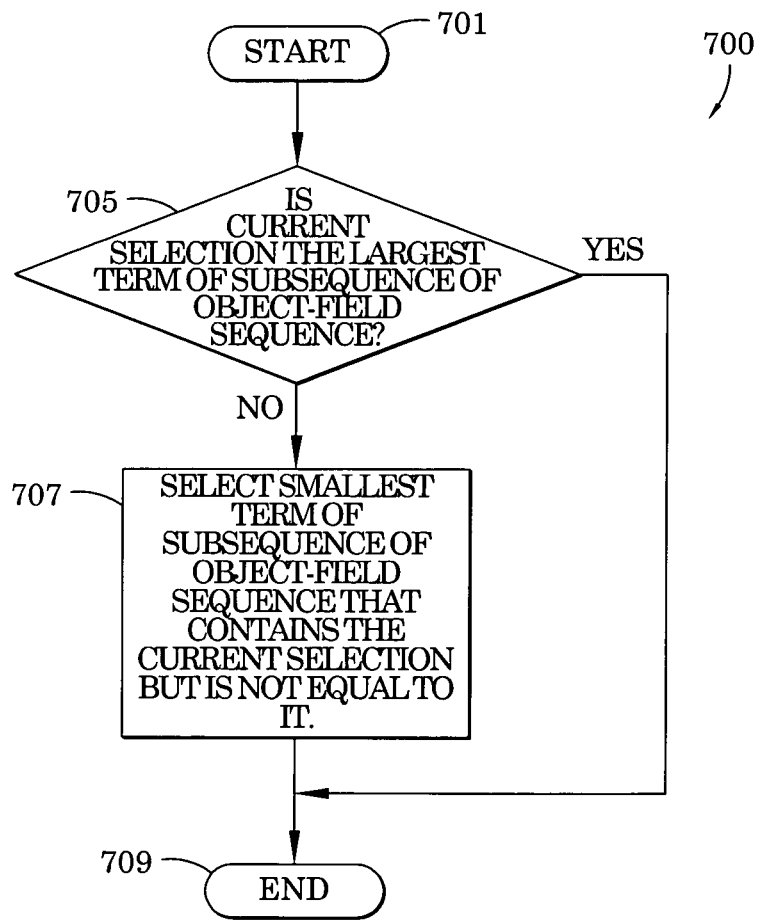
FIG. 15 is a flowchart depicting one method for implementing a select-more editing operation that can be used with a mathematics system as provided for herein.

A method for implementing the select-more operation can thus follow the representative steps indicated in the flowchart 700 of FIG. 15. The process depicted in FIG. 15 is implemented each time the select-more function is performed. The process begins at step 701, and at step 705 a determination is made whether the current selection is the largest term of the current subsequence for the entire object-field sequence. If the answer to the query at step 705 is "yes", then the process ends at step 709. However, if at step 705 it is determined that the current selection is not the largest term of the current subsequence for the entire object-field sequence, then at step 707 a selection is made (i.e., a portion of the mathematical expression is selected) which is the smallest term of the subsequence of the object-field sequence (as described above) that contains the current selection but is not equal to it. The process then ends at step 709. In some embodiments, to allow for the selection of multiple expressions in a document, the flowchart 700 can be modified by replacing the phrase "largest term of the current subsequence for the entire object-field sequence" with the word "document", where the "object-field sequence" is the sequence described above having as its largest member the union of all the root fields of the root objects (mathematical expressions) in the document.

Select-Less Operation

A mathematics system in accordance with the present disclosure can also include a selection function which allows a user to select increasingly smaller portions of a mathematical expression in the local nesting hierarchy of objects and fields. For convenience, we will call this function a select-less function (or a select-less operation). As indicated in FIG. 7, this select-less function can be implemented as one of the selection/edit controls 312 in the user interface 300.

The object-field sequence established for the select-more function can also be used for the select-less function, with the understanding that the select-less process moves though its stages of selection in the reverse sense compared to the select-more process and terminates with the empty selection (which will be at the cursor position). The select-less function can be used to reverse the selection of portions of the mathematical expression which were selected using the select-more function. The select-less function selects the largest term in a subsequence of the object-field sequence that is contained by a current selection but is not equal to it.

An example of the operation of the select-less function can be appreciated by viewing FIGS. 8A through 8E in reverse order. (In the illustrated example of FIG. 8E through 8A the subsequence is the object-field sequence itself.) That is, if the entire mathematical expression (i.e., the root field 104) is selected, with the cursor at slot 147, as depicted in FIG. 8E, then operation of the select-less function will cause the selection to be reduced to the selection of the square-bracket object 120 as depicted in FIG. 8D. (Note: if the cursor position in FIG. 8E were instead in the root field 104, then the select-less function would move immediately from the selection of FIG. 8E to the selection depicted in FIG. 8A—i.e., the empty selection.) From the selection depicted in FIG. 8D the next selection in the select-less operation is the selection of FIG. 8C—i.e., the fraction object 130. Note that the selection does not move from the square-bracket object 120 to the field 122 (FIG. 2) of the square-bracket object, since the selection of field 122 would be equal to the selection of the fraction object 130 itself.

Figure 16:
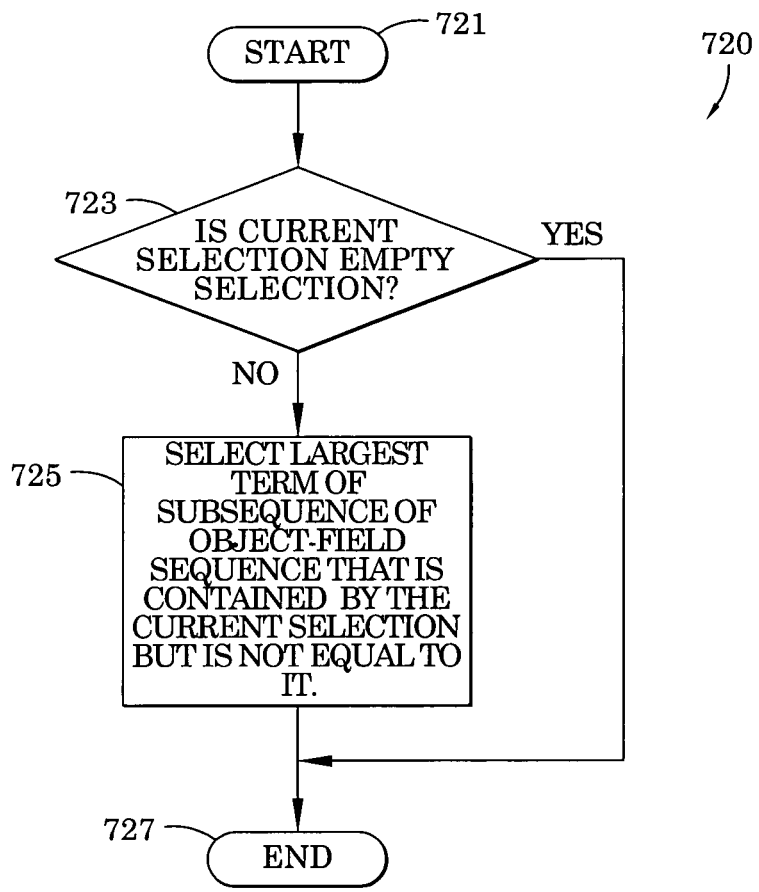
FIG. 16 is a flowchart depicting one method for implementing a select-less editing operation that can be used with a mathematics system as provided for herein.

A process for implementing the select-less operation can thus follow the representative steps indicated in the flowchart 720 of FIG. 16. The process depicted in FIG. 16 is implemented each time the select-less function is performed. The process begins at step 721, and at step 723 a determination is made whether the current selection is the empty selection (i.e., whether there is currently no selection). If the current selection is the empty selection, then no smaller selection is possible, and the process ends at step 727. However, if the current selection is not the empty selection, then at step 725 a selection is made (i.e., a portion of the mathematical expression is selected) which is the largest term of the subsequence of the object-field sequence (as described above) that is contained by the current selection, but is not equal to it. The process then ends at step 727.

The select-more and select-less operations can be configured respectively to select increasingly larger or increasingly smaller portions of the mathematical expression based on the local hierarchy of fields and objects. For example, the selection sequence can be formatted to make the selection based on a hierarchy of fields, or based on a hierarchy of objects. (The hierarchy of fields and the hierarchy of objects are merely different subsequences of the object-field sequence.) The select-more and select-less operations can be implemented as a series of computer-executable instructions and stored in a computer-readable memory, and can be executed by a processor.

Select-Left Operation

Figure 14:
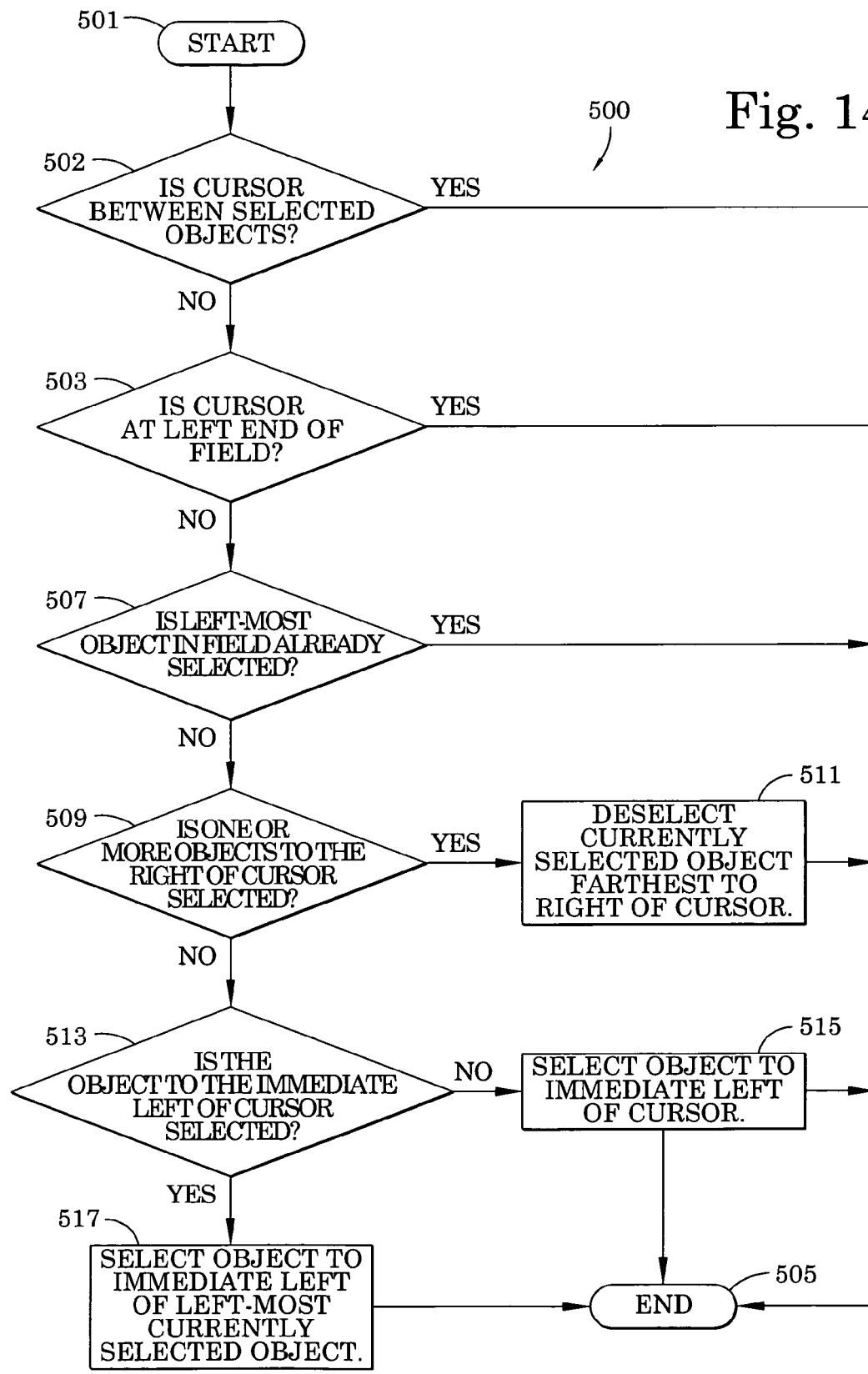
FIG. 14 is a flowchart depicting one method for implementing a select-left editing operation that can be used with a mathematics system as provided for herein.

In an additional embodiment a mathematics system in accordance with the present disclosure can include a select-left operation. The select-left operation allows a user to select guest objects of a field that are located to the left of a current cursor position, and particularly to increase the selection of objects by one object each time the select-left operation is performed. In general, the select-left operation will cause objects to be selected in a right-to-left order from the cursor (assuming there is no current selection to the right of the cursor), with the cursor remaining stationary during the operation. (The select-left operation is optionally disabled if the cursor is not at one end of a field segment that constitutes a non-empty selection. The operation can also be disabled where objects on the immediate left and right of the cursor are selected.) Once the left-most object within the field has been selected, the select-left operation is disabled. Further, the select-left operation can be used to deselect objects that are currently-selected and are to the right of the cursor in a right-to-left order. The select-left operation can be accessed, for example, by a dedicated select-left control (e.g., control 317 in the user interface 300 of FIG. 7), or by a keyboard command (e.g., shift-left-arrow). The mathematics system can also include a fast-select-left operation which selects all objects to the left of the cursor within a field. The fast-select-left operation can be accessed, for example, by a command such as control-shift-left-arrow. FIG. 14 depicts a flowchart 500 of a process that can be used to implement the select-left operation.

The flowchart 500 of FIG. 14 can be implemented as a series of computer executable instructions which can be stored in a computer readable memory and executed using a processor. The process depicted in flowchart 500 can be performed each time the select-left operation is invoked. The process begins at step 501, and at step 502 a determination is made whether the cursor is currently located between two or more selected objects. If the answer to the query at step 502 is "yes", then the process ends at step 505. However, if at step 502 the determination is "no" (i.e., the cursor is not between two selected objects), then at step 503 a determination is whether the cursor is currently at the left end of the field. If so, there are no objects to the left of the cursor (within that field) which can be selected, and so the process ends at step 505. If the cursor is not at the left end of the field (as determined in step 503), then at step 507 a determination is made if the left-most object in the field is already selected. If so, there are no remaining objects to the left of the cursor (within that field) which can be selected, and so the process ends at step 505. However, if the left-most object within the field containing the cursor is not already selected (corresponding to a "no" determination at step 507), then at step 509 a determination is made whether one or more objects to the right of the cursor are already selected. If so, then at step 511 the currently-selected object farthest to the right of the cursor is deselected, and the process ends. However, if at step 509 it is determined that no objects to the right of the cursor are currently selected, then at step 513 a determination is made if the object to the immediate left of the cursor is currently selected. If not, then at step 515 the object to the immediate left of the cursor is selected, and the process ends. If at step 513 it is determined that the object to the immediate left of the cursor is currently selected, then at step 517 the object to the immediate left of the left-most currently selected object is also selected (i.e., is added to the current selection), and the process ends.

Figure 11:
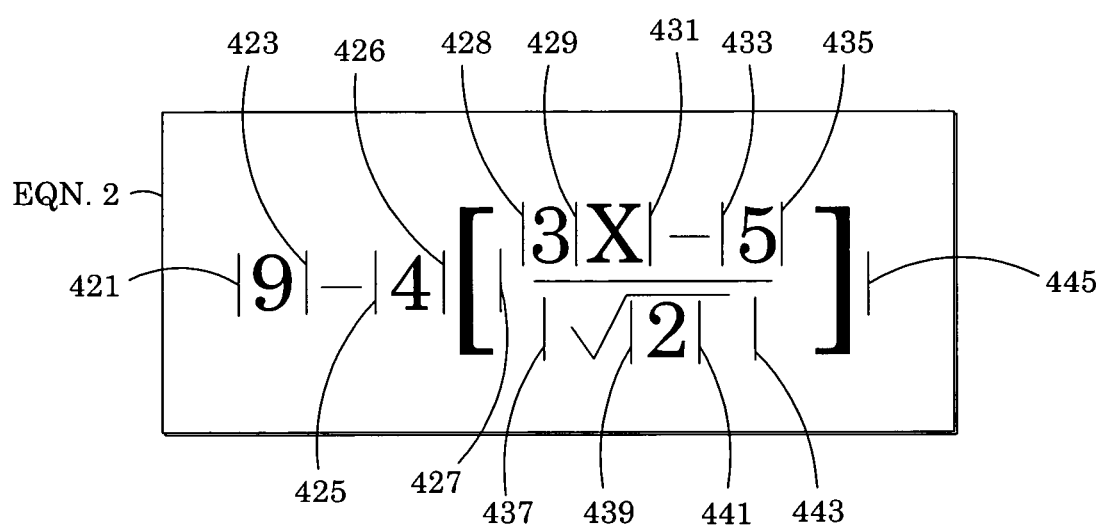
FIG. 11 is a diagram depicting the locations of field slots and object slots in a mathematical expression editor as provided for herein.

Examples of the select-left operation will now be provided with reference to Eqn. 2 of FIG. 11. In a first example, if the cursor is at field slot 427 (for the bracket object), or field slot 428 (for the numerator field), then the select-left operation has no effect, since there are no objects to the left of the cursor within the numerator field, or the square-bracket field, to be selected. (This corresponds to a "yes" determination at step 503 in the flowchart 500 of FIG. 14.) Preferably, the select-left operation is disabled in this instance (as, for example, by providing a different shade of coloring on the select-left control 317 of FIG. 7). In a second example, if the cursor is at object slot 431 and the objects "X" and "3" to the left of the cursor are already selected, then again the select-left operation has no effect, since there are no objects to the left of the cursor within the numerator field (or the square-bracket field) that remain to be selected. (This second example corresponds to a "yes" determination at step 507 in the flowchart 500.) Preferably, the select-left operation is also disabled in this instance. In a third example let us assume that the cursor is at object slot 431 and that the objects "−" and "5" to the right of the cursor are currently selected. In this instance activation of the select-left operation will cause the object "5" to be deselected. This example corresponds to step 511 in the flowchart 500. In a fourth example assume that the cursor is at the object slot 443 and no selection is made. In this case the select-left operation will select the radical object in the denominator field of the fraction object. (In a different scenario, if the cursor is at object slot 441 within the radical object field and no selection is currently made, the select-left operation will select the object "2" in the radical field.) Both of these situations correspond to step 515 of the flowchart 500. In a fifth example, if the cursor is at object slot 426 and the objects "4" and "−" to the left of the cursor are currently selected, then the select-left operation will select the object "9". This last example corresponds to step 517 of the flowchart 500.

Select-Right Operation

A mathematics system in accordance with the present disclosure can also include a select-right operation, which essentially operates in the opposite manner as the select-left operation described above. That is, the select-right operation allows a user to select objects within a field that are located to the right of a current cursor position, and particularly to increase the selection of objects by one object each time the select-right operation is performed. In general, the select-right operation will cause objects to be selected in a left-to-right order from the cursor (assuming there is no current selection to the left of the cursor), with the cursor remaining stationary during the operation. (The select-right operation is optionally disabled if the cursor is not at one end of a field segment that constitutes a non-empty selection. The operation can also be disabled where objects on the immediate left and right of the cursor are selected.) Once the right-most object within the field has been selected, the select-right operation is disabled. Further, the select-right operation can be used to deselect objects that are currently-selected and are to the left of the cursor in a left-to-right order. The select-right operation can be accessed, for example, by a dedicated select-right control (e.g., control 319 in the user interface 300 of FIG. 7), or by a keyboard command (e.g., shift-right-arrow). The mathematics system can also include a fast-select-right operation which selects all objects to the right of the cursor within a field. The fast-select-right operation can be accessed, for example, by a command such as control-shift-right-arrow. The flowchart 500 of FIG. 14 can be modified to depict a process for implementing the select-right operation by systematically replacing therein the word "left" with the word "right", and replacing the word "right" with the word "left". (Thus, for example, in a flowchart for the select-right operation step 517 of flowchart 500 would read "select object to immediate right of right-most currently selected object", and step 511 would read "deselect currently selected object farthest to left of cursor".)

Drag-Select Operation

A mathematics system in accordance with the present disclosure can include a drag-select operation. The drag-select operation can be used to select a portion of the mathematical expression (i.e., a field segment, including an entire field) by moving a pointing device across a portion of the mathematical expression on a screen, (or other similar means such as moving a finger over a touch-screen) to make the desired selection. In this operation, the cursor anchors a first end (either the left end or the right end) of the selection, while the pointing device sweeps out the other end of the selection. During this kind of selection process only the pointing device moves—the cursor stays stationary.

Selection of Several Expressions

In some embodiments, several expressions in a document can be selected together, in a manner analogous to selecting blocks of text in a text editor.

Backspace Operation

A mathematics system in accordance with the present disclosure can also include a backspace function or operation which allows a user to progressively remove objects from a mathematical expression in a generally right-to-left direction. The backspace operation (also called "backspacing") can be enabled through the user interface by use of a backspace key on a keyboard, by a backspace control on a graphical user interface, or by other known means (e.g., voice control). In one variation the backspace operation reverses the infix entry sequence for guest objects of a host object in one of whose fields the cursor is located, sequentially removing primitive objects which precede the cursor. Once the cursor reaches a first slot with respect to the slot sequence of the slots contained in the fields of the non-primitive object in which the cursor is currently located, backspacing is disabled if the non-primitive object still contains any guest objects. For example, if backspacing is being performed in a numerator field of a fraction object, backspacing is disabled even if the numerator field becomes empty but there are still objects in the denominator field. We will call this variation object-limited backspacing.

In another variation the backspace operation reverses the infix entry sequence for guest objects of a host object in one of whose fields the cursor is located, sequentially removing primitive objects which precede the cursor. Once the cursor reaches a first slot with respect to the slot sequence of the slots contained in the field in which the cursor is currently located, backspacing is disabled if the field still contains any subsequent guest objects. We will call this variation field-limited backspacing.

A third variation of a backspacing operation can include both the object-limited backspacing and the field-limited backspacing operations described above.

As is indicated above, when the cursor is in the first slot with respect to the slot sequence of the slots contained in the fields of the non-primitive object in which the cursor is currently located, different embodiments of the of backspace operation can have different behaviors. In one embodiment, which is both object-limited and field-limited, engaging the backspace operation with the cursor in that position, and the non-primitive object having no guest objects, removes the non-primitive object and sends the cursor leftward to the slot that immediately preceded the now-removed non-primitive object.

For example, and referring to FIG. 2, if the cursor is placed after object 142 (the number "5") in the numerator field 132 of the fraction object 130, performing the backspace operation four times in a row will move the cursor leftward four times, sequentially deleting the four objects 142, 140, 138 and 136. At this point the cursor will be in an empty numerator field. However, since there are other characters still in the host object (i.e., the fraction object 130) that are subsequent to the cursor (specifically, the objects in the denominator field 134), then the backspace function is disabled (i.e., continuing to operate the backspace control has no effect on deleting additional objects from the expression). However, if the cursor is initially placed at the right end of the denominator field 134 and the backspace operation performed three times (to thus delete the entire contents of the denominator field), upon the fourth operation the cursor will move to the right end of the numerator field 132, and subsequent operations of the backspace function will delete the contents of the numerator field 132. Once both of the fields (132, 134) of the fraction object 130 are empty, the cursor is now in field slot 133 of the numerator field 132, and the next operation of the backspace function will remove the non-primitive fraction object 130 and send the cursor leftward to the slot (field slot 124) that immediately preceded the now-removed fraction object 130.

In an additional example of the backspace operation, the operation can be field-limited. That is, if there are no objects within a field to the right of the cursor, the backspace function is disabled. For example, referring to FIG. 2, if a cursor is positioned in the field slot 135 of the denominator field 134, the backspace operation can be disabled, even though there are objects in the numerator field 132, since there remain objects in the denominator field 134.

Figure 10:
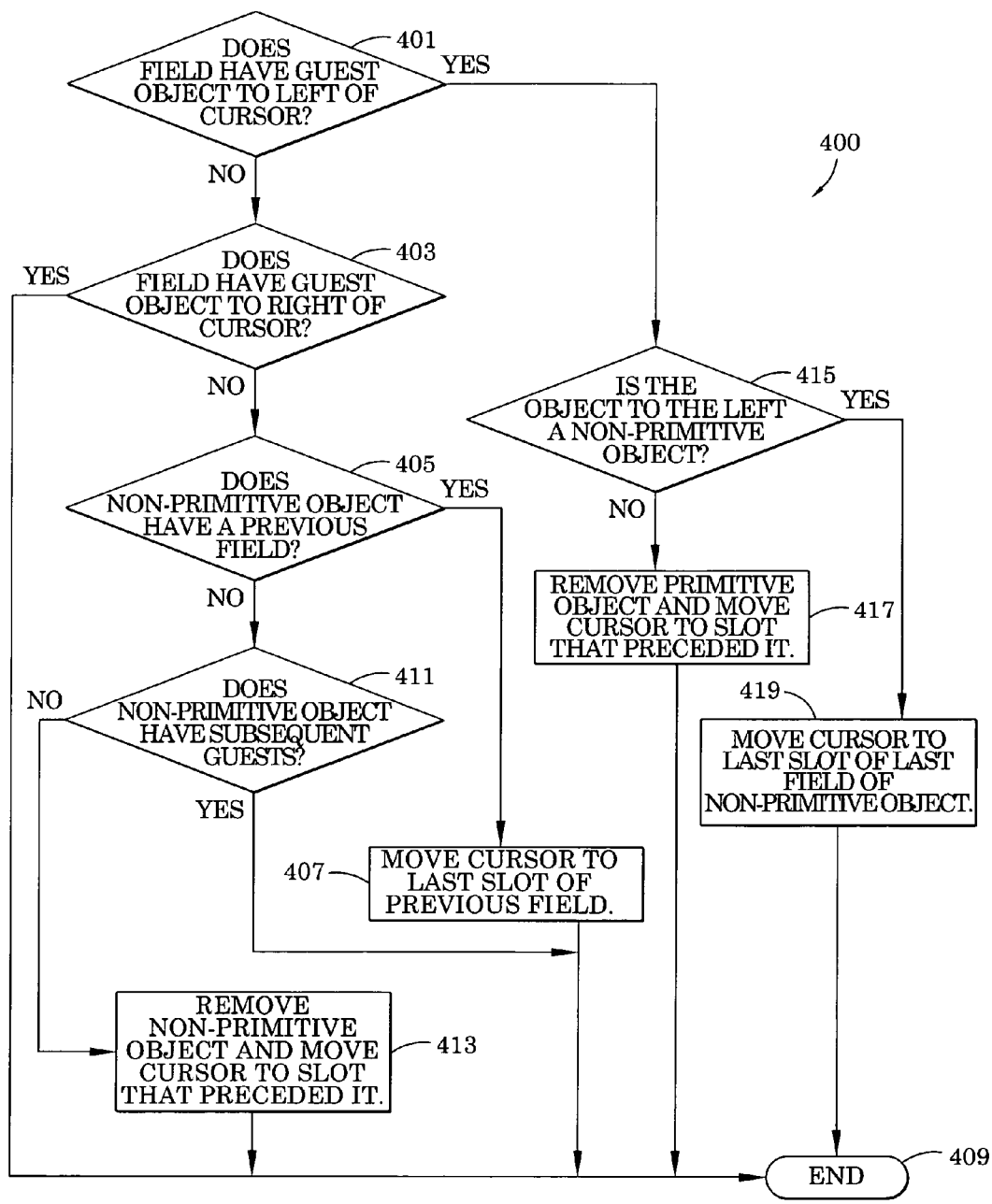
FIG. 10 is a flowchart depicting one method for implementing a backspace editing operation that can be used with a mathematics system as provided for herein.

The backspace operation is depicted graphically in the flowchart 400 of FIG. 10. The steps of the flowchart 400 can be implemented as a series of computer-executable instructions and stored in a computer-readable memory, and can be executed by a processor. Flowchart 400 will be described along with the example depicted in FIG. 11, which is the mathematical expression $$9 - 4\left[\frac{3x-5}{\sqrt{2}}\right]$$

(and will be referred to herein as EQN. 2). In FIG. 11 EQN. 2 is depicted with the field and object slots (indicated by vertical lines) as follows: field slot 421 for the root field; object slots 423, 425 and 426 for respective primitive objects "9", "−" and "4"; field slot 427 for the field of the square-bracket object; field slot 428 for the numerator field of the fraction object; object slots 429, 431, 433 and 435 for respective primitive objects "3", "X", "−" and "5" in the numerator field; field slot 437 for the denominator field of the fraction object; field slot 439 for the radicand field of the radical object; object slot 441 for the object "2" in the radical object field; object slot 443 for the radical object; and object slot 445 for the square-bracket object.

The flowchart 400 of FIG. 10 depicts an analysis that can be performed each time that the backspace function is operated when the cursor is not in an empty root field. That is, for each backspace operation, such as a single backspace keystroke, the process depicted in the flowchart 400 is performed. Thus, for multiple back-to-back operations of the backspace function, the process depicted in flowchart 400 is performed each time. In general, the backspace operation reverses the infix entry sequence for guest objects of the field in which the cursor is located. We will first describe the process of flowchart 400 generically, and will afterwards describe specific examples.

The backspace operation depicted in the flowchart 400 of FIG. 10 begins at step 401 where a determination is made if there is an object to the left of the cursor. If the answer to this query is "no", the process moves to step 403. At step at step 403 the determination is made whether there is an object to the right of the cursor. If the answer to this query is "yes", the process ends at step 409 (this is field-limited backspacing). If the answer to the query at step 403 is "no", the process moves to step 405. At step 405 the determination is made whether the non-primitive object (i.e., having a constituent field in which the cursor lies) has a previous constituent field. If the answer to this query is "yes", the process moves to step 407. At step 407 the cursor is then moved to the last slot of the previous field, and the process ends at step 409. However, if at step 405 the answer to the query is "no", then the process moves to step 411 to make a determination of whether the non-primitive object has subsequent guests. If the answer to this query is "yes" then the process ends at step 409 (this is object-limited backspacing). However, if an answer to the query at step 411 is "no" the process moves to step 413 and the non-primitive object is removed, the cursor is moved to the preceding slot, and the process terminates at step 409. Returning to step 401, if the answer to the query "is there is an object to the left of the cursor?" is "yes, the process moves to step 415 to make a determination if the object to the left of the cursor is a non-primitive object. If the answer is "yes", then at step 419 the cursor is moved to the last slot of the last field of the object, and the process ends at step 409. However, if at step 415 the answer to the query is "no", then at step 417 the primitive object is removed and the cursor is moved to the slot preceding the just-deleted object. The process then terminates at step 409.

It will be appreciated by a review of steps 407 and 419 that no objects are removed in these instances as a result of the backspace operation, and the operation acts more like a cursor-left instruction. This arrangement provides a measure of security in order to prevent unintended removal of objects by a backspace operation.

As depicted in the flowchart of FIG. 10, there are essentially six different possible outcomes if the cursor is not in an empty root field. We will now provide an example of each. In the first example, let us assume that the cursor is at field slot 428 in FIG. 11 (the numerator field of the fraction object), and further that the fields of the fraction object are both empty. In this example (i) there is no object to the left of the cursor (as determined at step 401), (ii) the non-primitive object (the fraction object) does not have a previous field (as determined at step 405), and (iii) the non-primitive object does not have subsequent guests (recall that we have assumed that the fields of the fraction object are both empty) as determined at step 411. The result of the backspace operation in this instance (per step 413 of the flowchart) is to remove the non-primitive object (i.e., the fraction object) and move the cursor to the field slot 427 of the square-bracket field. In a second example assume there are no objects to the left of the cursor, but there is at least one object to the right of the cursor (corresponding to a "no" at step 401, and a "yes" at step 403)—i.e., for example, the cursor is at 437. In this example, the backspace operation is disabled (field-limited), and no cursor movement occurs. In the third example, let us again assume that the cursor is at field slot 428 (the numerator field of the fraction object), but this time also assume that there is at least one object remaining in either field of the fraction object (corresponding to a "yes" determination at step 411). In this instance the backspace operation is disabled (object-limited), and no cursor movement occurs. In a fourth example assume that the cursor is at field slot 437 (the denominator field of the fraction object). In this instance (i) there is no object to the right of the cursor (the determination at step 403), and (ii) the non-primitive object (i.e., the fraction object) has a previous field (i.e., the numerator field, as determined at step 405). In this instance the backspace operation moves the cursor to the last slot of the previous field, i.e., to slot 435 of the numerator field, as per step 407. In a fifth example assume that the cursor is at slot 435. In this example (i) there is an object to the left of the cursor (the determination at step 403), and (ii) the object (here, the primitive object "5") is not a non-primitive object (as determined at step 415). In this instance the backspace operation removes the object "5" and the cursor is moved to slot 433, as per step 417. In the sixth and final example assume that the cursor is located at slot 443. In this example (i) there is an object to the left of the cursor (i.e., the radical object, as determined at step 403), and (ii) the object to the left of the cursor is a non-primitive object (as determined at step 415). In this instance the backspace operation moves the cursor to object slot 441 as per step 419.

In one embodiment, for the case of the cursor being in an empty root field (to which the flowchart 400 does not necessarily apply), if the root object corresponding to that root field is the only root object in a document field, the backspace operation is disabled; otherwise that root object is removed together with its root field, and the cursor goes to the last slot of the mathematical expression corresponding to the root object that immediately preceded the now-removed root object in the document field, or if no root object preceded the now-deleted root object, the cursor goes to the first slot of the mathematical expression corresponding to the root object that immediately followed the now-deleted root object in the document field.

Delete Operation

A mathematics system in accordance with the present disclosure can also include a delete function or operation which allows a user to progressively delete objects from a mathematical expression in a generally left-to-right direction. The delete operation (also called "deleting") can be enabled through the user interface by use of a delete key on a keyboard, by a delete control on a graphical user interface, or by other known means (e.g., voice control). In one variation the delete operation generally follows the infix entry sequence for guest objects of a non-primitive object in one of whose fields the cursor is located, sequentially deleting primitive objects which follow the cursor. Note that unlike the backspace operation, when a primitive object is deleted the cursor stays in the same slot. Once the cursor is in the last slot with respect to the slot sequence of the slots contained in the fields of the non-primitive object in which the cursor is currently located, deleting is disabled if the non-primitive object still contains any guest objects. For example, if deleting is being performed in a denominator field of a fraction object, deleting is disabled even if the denominator field becomes empty but there are still guest objects of the numerator field. We will call this variation object-limited deleting.

In another variation the delete operation generally follows the infix entry sequence for guest objects of a host object in one of whose fields the cursor is located, sequentially removing primitive objects which follow the cursor. Once the cursor is in the last slot with respect to the slot sequence of the slots contained in the field in which the cursor is currently located, deleting is disabled if the field still contains any previous guest objects. We will call this variation field-limited deleting.

A third variation of the delete operation can include both the object-limited delete and the field-limited delete operations described above.

As is indicated above, when the cursor is in the last slot with respect to the slot sequence of the slots contained in the fields of the non-primitive object (which is not the root object) in which the cursor is currently located, different embodiments of the of delete operation can have different behaviors. For the case where the cursor is not in an empty root field, and with the preferred embodiment, which is both object-limited and field-limited, engaging the delete operation with the cursor in that position, and the non-primitive object having no guest objects, removes the non-primitive object and sends the cursor leftward to the slot that immediately preceded the now-removed non-primitive object.

Figure 12:
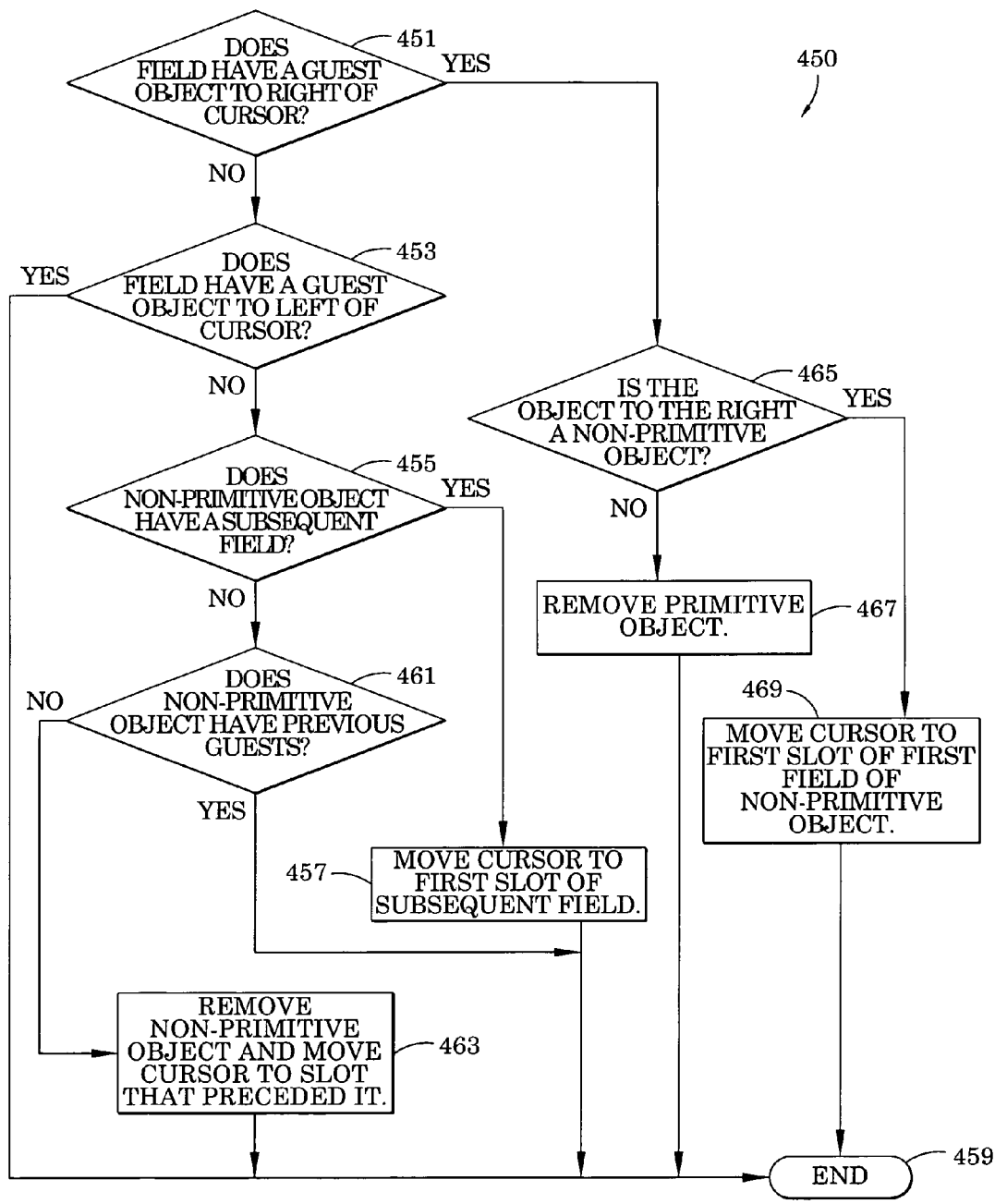
FIG. 12 is a flowchart depicting one method for implementing a delete editing operation that can be used with a mathematics system as provided for herein.

In general, the delete operation works analogously to the backspace operation described above, but in the opposite direction (i.e., moving the cursor generally from left to right). For the case of the cursor not in an empty root field, an exemplary flowchart 450 for the delete operation is depicted in FIG. 12. The flowchart 450 depicts an analysis that can be performed each time that the delete function is operated. That is, for each delete operation, such as a single delete keystroke, the process depicted in the flowchart 450 is performed. Thus, for multiple back-to-back operations of the delete function, the process depicted in flowchart 450 is performed each time.

The delete operation depicted in the flowchart 450 of FIG. 12 begins at step 451 where the determination is made whether there is an object to the right of the cursor. If the answer to this query is "no", the process moves to step 453. At step 453 a determination is made whether there is a guest object to the left of the cursor. If the answer to this query is "yes", the process ends at step 459 (this is field-limited deleting). If the answer to the query at step 453 is "no", then the process moves to step 455. At step 455 the determination is made whether the non-primitive object (i.e., having a constituent field in which the cursor lies) has a subsequent field. If the answer to this query is "yes", the process moves to step 457. At step 457 the cursor is then moved to the first slot of the following field, and the process ends at step 459. However, if at step 455 the answer to the query is "no", then the process moves to step 461 to make a determination of whether the non-primitive object has previous guests. If the answer to this query is "yes" then the process ends at step 459 (this is object-limited deleting). However, if an answer to the query at step 461 is "no" the process moves to step 463 and the non-primitive object is removed, the cursor is moved to the slot that preceded it, and the process terminates at step 459. Returning to step 451, if the answer to the query "is there is an object to the right of the cursor?" is "yes, the process moves to step 465 to make a determination if the object to the right of the cursor is a non-primitive object. If the answer is "yes", then at step 469 the cursor is moved to the first slot of the first field of the non-primitive object, and the process ends at step 459. However, if at step 465 the answer to the query is "no", then at step 467 the primitive object is removed and the cursor remains in the same slot. The process then terminates at step 459.

It will be appreciated by a review of steps 457 and 469 that no objects are removed in these instances as a result of the delete operation, and the operation acts more like a cursor-right instruction. This arrangement provides a measure of security in order to prevent unintended removal of objects by a delete operation.

In one embodiment, for the case of the cursor being in an empty root field (to which the flowchart 450 does not necessarily apply), if the root object corresponding to that root field is the only root object in a document field, the delete operation is disabled; otherwise that root object is removed together with its root field, and the cursor goes to the first slot in the slot sequence of the mathematical expression whose corresponding root object immediately followed the now-removed root object in the document field or, if no root object followed the now-deleted root object, the cursor goes to the last slot of the mathematical expression corresponding to the root object that immediately preceded the now-deleted root object in the document field.

The backspace and delete operations, and the flowcharts 400 of FIG. 10 and 450 of FIG. 12, can be implemented as a series of computer-executable instructions and stored in a computer-readable memory, and can be executed by a processor.

Wrap and Unwrap Operations

A mathematics system in accordance with the present disclosure can also include a wrap function and/or an unwrap function. The wrap and unwrap functions can be enabled through a GUI (e.g., see unwrap control 316 in FIG. 7), via a shortcut or hot-key command on a keyboard, by voice control, or by other known means for providing user input to a program via a user interface.

The unwrap function or operation replaces a non-primitive object (that is not a root object) by the contents of one of its fields. As an example, for the expression (½), the unwrap function will remove the fraction object from the bracket object—i.e., will delete the bracket object, leaving only the fraction object. The object to which the unwrap function is to be applied can be determined by selecting either the host object from which a constituent field is to be removed (e.g., selecting or highlighting the bracket object in the above example), or, less preferably, by selecting the constituent field to be removed (e.g., in the above example, by selecting the constituent field of the bracket object). (The selection can be made by using the cursor and/or a pointing device, a keyboard command, or by other means.) Generally (although not exclusively), the first version of unwrap function is available for non-primitive objects having a single field. However, rules can be applied to each non-primitive object in the object library to determine whether or not the unwrap function can be applied for that object, and certain specific details for the unwrap function for any given non-primitive object. For example, in general the unwrap function for the expression nY does not make sense, since it would be unclear how the value "n" is to be handled in this instance. However, rules can be applied to this non-primitive object such that following the unwrap operation only the contents of the field "Y" remain. Likewise, an unwrap operation performed on a non-primitive integration or summation object can be configured to leave only the integrand or summand following the operation, and the upper and lower limits, and other field contents for these non-primitive objects, will be deleted. Regarding the latter version of the unwrap function described above, if an entire field other than the root field is selected, the non-primitive object to which it belongs is removed and replaced by the contents of the selected field.

The wrap function or operation replaces a selected field segment with a non-primitive object having one of its constituent fields populated by that field segment, with all of its other constituent fields empty. As an example, if the user selects the fraction object ½, and then selects "wrap" and the round-bracket object, the result will be (½). Generally (although not exclusively) the wrap function is available for non-primitive objects having a single field. However, rules can be applied to each non-primitive object in the object library to determine whether or not the wrap function can be applied for that object, and certain specific details for the wrap function for any given non-primitive object. For example, in general the wrap function for the expression nY does not make sense, since it would be unclear into which field ("n" or "Y") a selection was to be placed. However, rules can be applied to this non-primitive object such that the following the wrap operation selection of objects is placed in the field "Y", leaving field "n" empty for the user to populate. Likewise, a wrap operation performed on a non-primitive integration or summation object can be configured to place the selection into the integrand or summand field following the operation, thus leaving the upper and lower limit fields, and other fields, empty so that they can be populated by the user. Preferably, for each non-primitive object type, the constituent field type initially populated by the wrap operation is the same as that whose contents remain after the unwrap operation is applied to that object type (as opposed to that constituent field type).

The wrap and unwrap operations can be implemented as a series of computer-executable instructions and stored in a computer-readable memory, and can be executed by a processor.

Change-Object Operation

A mathematics system in accordance with the present disclosure can also include a change-object function or operation. This operation can be enabled from, for example, the user-interface 300 of FIG. 7, or by a keyboard operation such as a preprogrammed function key or a programmed key combination. The operation is preferably performed by first selecting a first non-primitive object. (The selection can be made, for example, by using the cursor and/or a pointing device, a keyboard command, or by other means.) The user can then invoke the change-object function, and select a second primitive object which is to replace the first non-primitive object in such a way that the contents of at least one constituent field of the first non-primitive object become the contents of a constituent field of the second non-primitive object. The change-object function typically is available for non-primitive objects having a single constituent field. Examples of non-primitive objects for which the change-object function can be available include bracket objects (square brackets, round brackets, etc.), absolute value objects, square root objects, trigonometric function objects (e.g., sine, cosine, tangent), etc. In another example, if a summation object is selected, and the change-object function is invoked to replace it with a definite integral object, then the summand from the summation object can be placed into the integrand field of the integral object leaving all other fields of the newly-created definite integral object empty. The change-object operation or function can be implemented as a series of computer-executable instructions and stored in a computer-readable memory, and can be executed by a processor.

Object Menus and Field Menus

For a non-primitive object, an object menu specific to that object type can be accessed, for example by first selecting the object, then using a right-click of a mouse or a hot-key. Items on the menu can include commands such as unwrap or change object. Less preferably, analogous field menus can be implemented for each field type; they can be accessed for example, by selecting a field and then using a right-click of a mouse or a hotkey.

Figure 27:
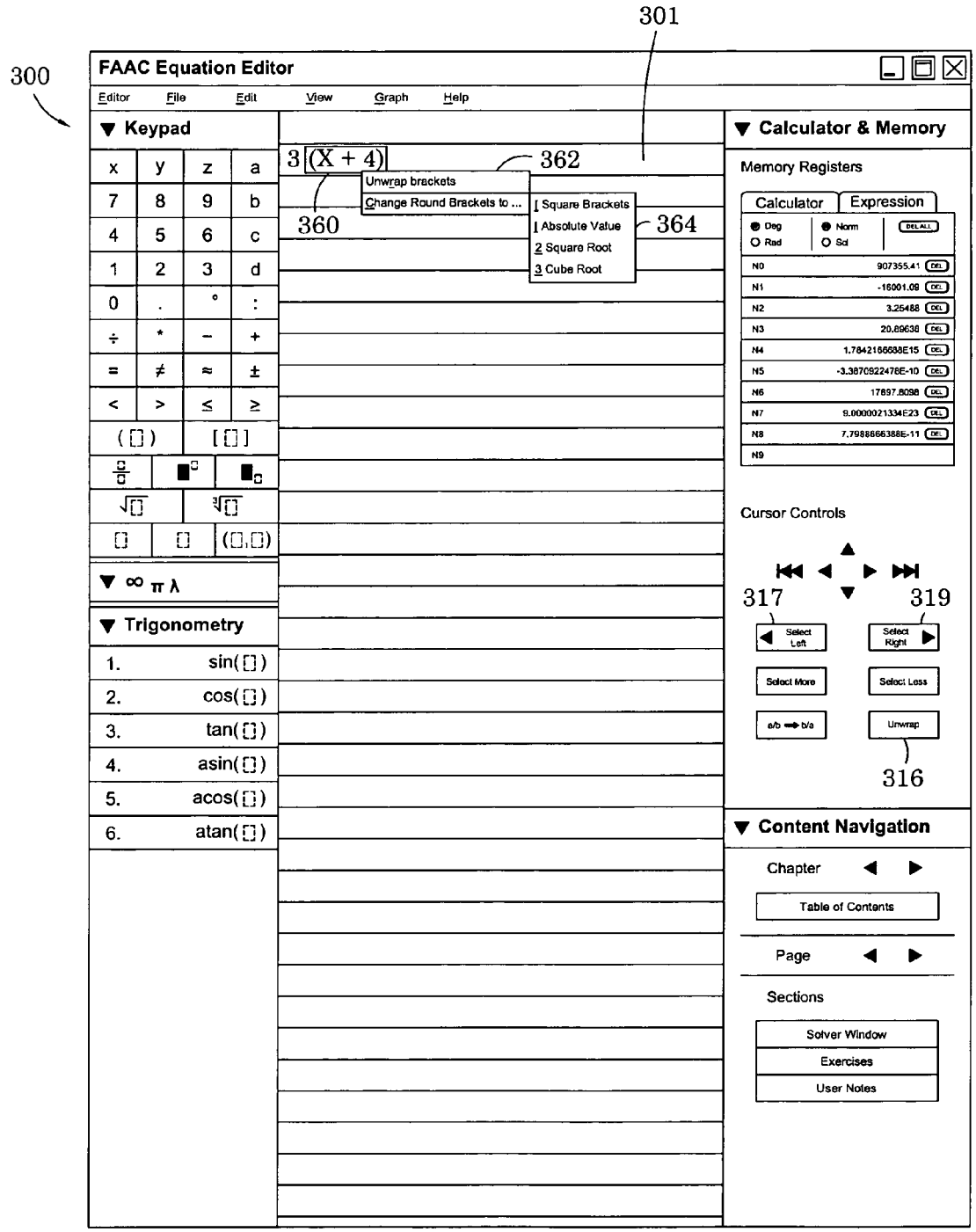
FIG. 27 is a diagram simulating a screen shot of a user display showing a round-bracket object and an exemplary associated object menu for that object.

An example of an object menu is depicted in FIG. 27, which is a simulation of a screen-shot from a display device using the user interface 300 of FIG. 7. In FIG. 27 the exemplary mathematical expression "3(x+4)" has been entered in the display area 301, and the round bracket object (containing the expression "(x+4)") has been selected. Following the selection, the user can open an object menu for the round bracket object, as for example by performing a right-mouse-button click. In this example, the object menu 362 is opened, showing available options that can be applied to this particular object (i.e., the round-bracket object). Here, the available options are "Unwrap brackets", and "Change Round Brackets to . . . ▶". Selection of the second menu item (i.e., "Change Round Brackets to . . . ▶") opens the object sub-menu 364, with exemplary options of "Square Brackets", "Absolute Value", "Square Root" and "Cube Root".

Text Editing Functions

A number of the features described above for editing mathematical expressions can also be incorporated into software which provides for text editing (such as a word processing program, or any program which includes a text editor). Specifically, text selection can be based on stationary-cursor-based selection methods and program steps analogous to those described above for mathematical expressions and documents. Generally, for a given cursor position, the text selection feature is based on a text sequence that is a hierarchical progression analogous to an object-field sequence. The text sequence can be according to size in the following top-down hierarchy: (i) the entire document; (ii) paragraphs within the document; (iii) individual lines within a paragraph; (iv) individual words (or character strings) within a line; (v) a character (or space, or punctuation) immediately adjacent to the stationary cursor; and (vi) the empty selection. In one variation the paragraph level of selection can be replaced with page selection. In another variation the line level of selection can be replaced with sentence selection. Thus, a text document has, for each cursor position, a text sequence which is analogous to the object-field sequences described above—that is, a hierarchy with the top level (the largest term in the text sequence) consisting of the entire document, and the bottom level (the smallest term in the text sequence) consisting of the empty selection. Using this text sequence, the select-more function for text selects the smallest term of a first subsequence of the text sequence that contains the current selection, but is not equal to it. Also using this text sequence, the select-less function for text selects the largest term of a second subsequence of the text sequence that is contained by the current selection but is not equal to it. It will thus be appreciated that all of the select-more, select-less, select-left and select-right functions described above for mathematical expressions have close analogues for text documents. Further, it will be understood that each of these selection functions as used in a text document uses a stationary cursor during the selection (i.e., following the selection process, the cursor is located in the same position as it was at the beginning of the selection process).

Error Detection and Notification

In one variation a mathematics system in accordance with the present disclosure can be provided with a set of computer executable instructions in order to detect erroneous syntax within a mathematical expression which is presented to a user on the display device, and to generate a visual cue on the display device to alert the user to the existence of, and location of, the erroneous syntax. Example of erroneous syntax can include incorrect juxtaposition of objects based on their respective assigned mathematical significance, and an invalid object located at the beginning or end of a field. An example of incorrect juxtaposition of objects based on their respective assigned mathematical significance is a plus sign adjacent to a minus sign or a division sign. An example of an invalid object located at the beginning or end of a field is a field starting or ending with a mathematical operator such as a division symbol. When an erroneous syntax consisting of incorrect juxtaposed objects is detected by the program, the visual cue can be generated at the slot between the incorrectly juxtaposed objects. Likewise, when an erroneous syntax consisting of an invalid object at the beginning or end of a field is detected by the program, the visual cue can be generated at the slot at the respective beginning or end of the field where the invalid object is located. The visual cue can be, for example, a colored shading of the slot (e.g., a red colored slot) in order to make the location of the syntax error easily visible to the user. In the case where there is not an appropriate object juxtaposed on the left of an exponent object, the exponent object can be given a default vertical formatting whereby the relative positions of the exponent field and the visual cue (or cursor in that slot) evoke the image of an exponent and its base. This suggests to the user that there is an exponent object that has not been juxtaposed with an appropriate base. The visual cue can also be accompanied by an explanation of the syntax error, for example explanatory text can appear adjacent to the visual cue when the user places the pointing device on or adjacent to the visual cue. Further, the computer-executable instructions can include a series of steps to remove the visual cue once the user places a cursor in the slot at the location of the erroneous syntax.

Another type of error indicator can indicate erroneous decimal/digit strings by means of a visual cue. Examples can include strings with more than one decimal point, or whose first two objects are both the "0" number object. A visual cue can consist of, for example, coloring the string red. Further, the computer-executable instructions can include a series of steps to remove the visual cue once the user places a cursor in one of the slots of the field segment constituting the erroneous string, or in the slot immediately preceding the first object of the string.

Yet another type of error indicator can show (by means of a visual cue) where the pointer or cursor cannot be used to paste an object. For example, in the case of a drag-and-drop operation, the program selects a slot proximal to the pointer position. Such proximal slots are where insertion of a field segment occurs at the end of a drag-and-drop operation. During an attempted drag-and-drop operation, if the rules of the program disallow the insertion at a proximal slot, a visual cue can be used to indicate that the current proximal slot is not an acceptable target for the insertion. The user can then move the pointer to a slot where the visual cue disappears; otherwise the insertion will be disallowed. Similarly, if the user tries to engage a paste operation by means of the cursor, and the slot in which the cursor is located is disallowed by the program, a visual cue can indicate that fact to the user. Nesting counts can be used by the program to disallow such insertions at various slots in a mathematical expression.

Figure 28:
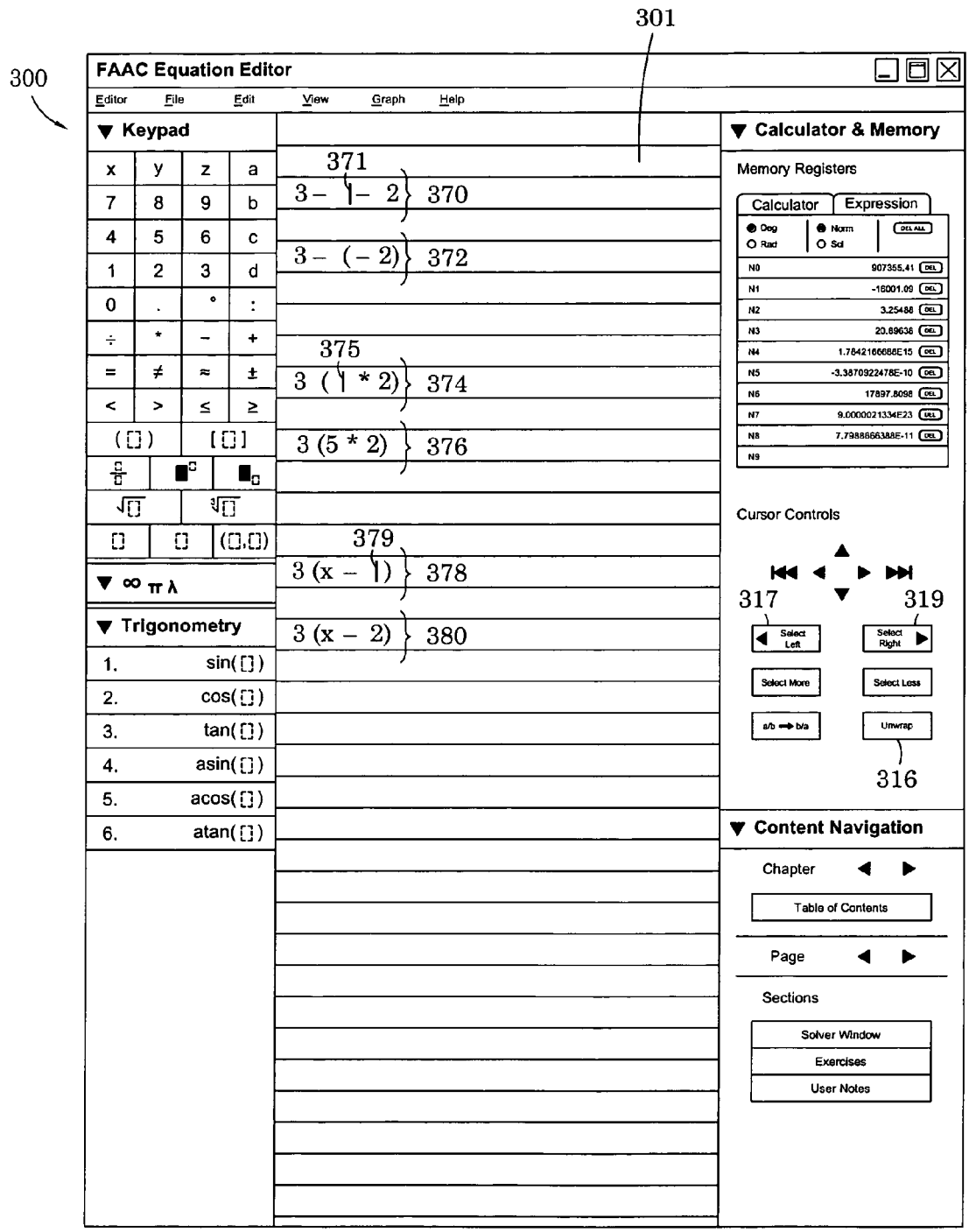
FIG. 28 is a diagram simulating a screen shot of a user display showing how automatically detected errors in syntax can be indicated on the user display.
Figure 29:
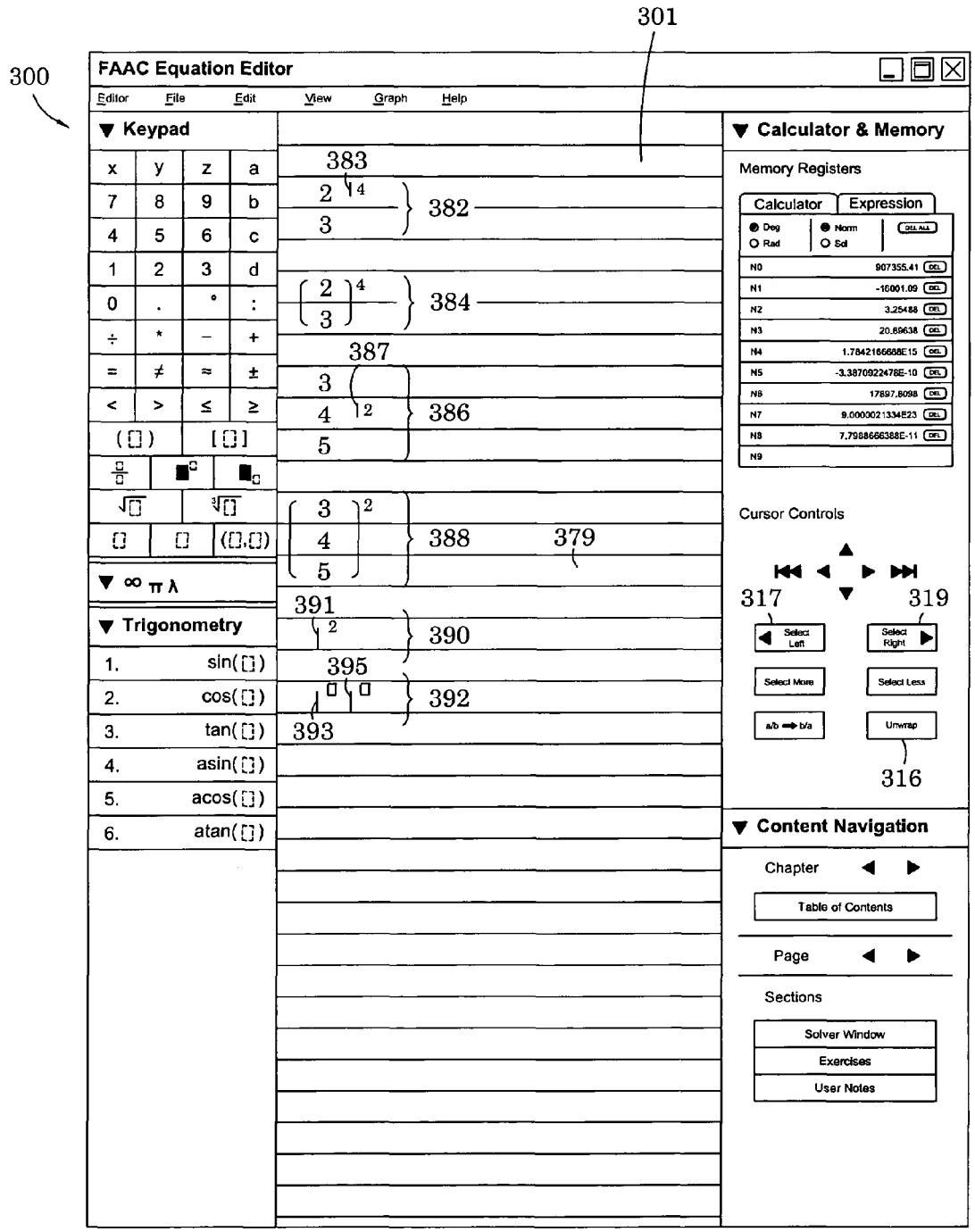
FIG. 29 is another diagram simulating a screen shot of a user display showing how automatically detected entry errors can be indicated on the user display.
Figure 30:
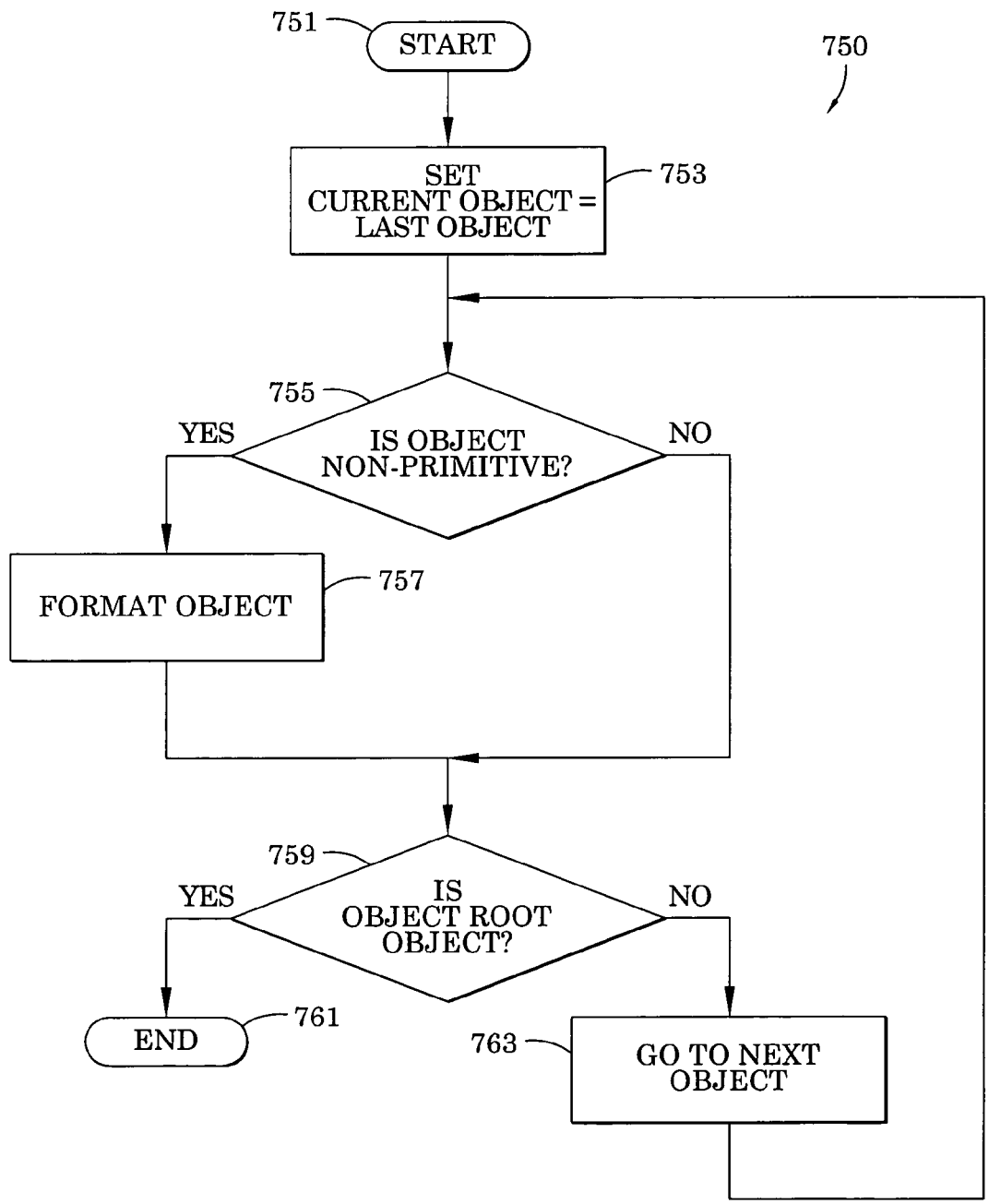
FIG. 30 a flowchart depicting one method for formatting a mathematical expression in the preferred reverse order with respect to the infix entry process.
Figure 31:
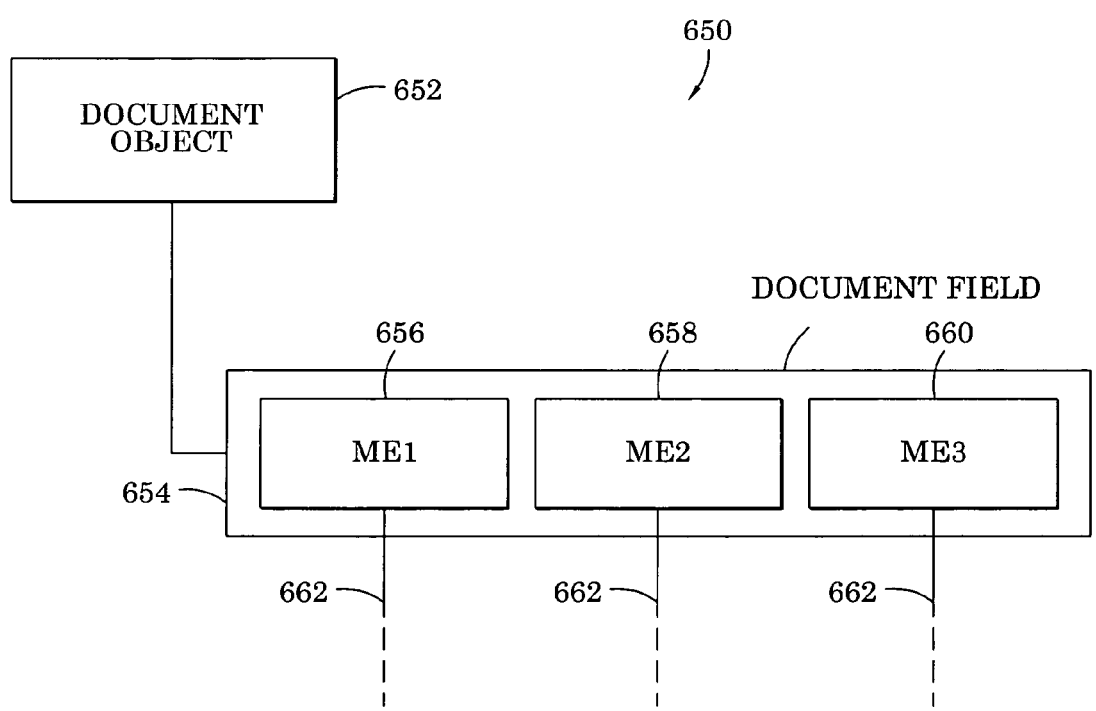
FIG. 31 is a diagram depicting how a document object can have as guests a plurality of mathematical expression root objects.
Figure 32:
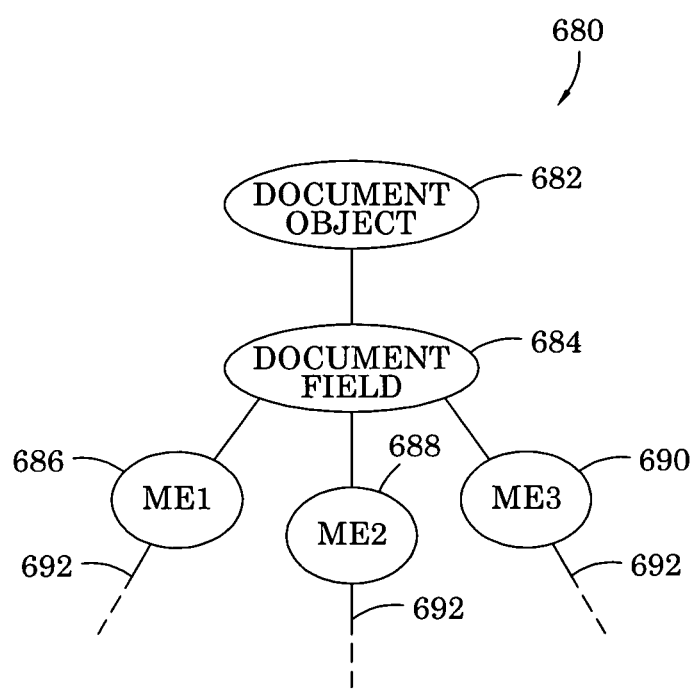
FIG. 32 is a diagram depicting an object-field tree for a document object.

FIGS. 28 and 29 depict some examples of a shaded slot can be used to identify automatic error detection. FIGS. 28 and 29 are simulations of screen-shots of a user display using the user interface 300 of FIG. 7. In FIG. 28 a first mathematical expression 370 consisting of "3−−2" has been entered. The program for the mathematics system has detected that this is an improper form of mathematical expression, and has shaded (or colored) the slot 371 to identify the location of the detected syntax error. Mathematical expression 372 depicts one example of how the erroneous expression 370 can be corrected, by placing (or "wrapping") a round bracket object around the sub-expression "−2". (This can be done using a "wrap" feature, as described elsewhere herein). As can be seen, once the expression 370 is corrected to present an acceptable syntax (as in expression 372), the shaded slot 371 is automatically removed. Likewise, for the partial mathematical expression 374 consisting of "3(·2)", the mathematics system has automatically detected that this is an improper form of mathematical expression, and has shaded (or colored) the slot 375 to identify the location of the detected syntax error. Mathematical expression 376 depicts one example of how the erroneous expression 374 can be corrected, by inserting the primitive object "5" in front of the multiplication operator "·", thus causing the error detection identifier 375 to be removed. A third example depicts how the erroneous syntax of expression 378 (consisting of "3(x–)" can be automatically indicated with shaded slot 379, and then the slot shading is removed once an acceptable syntax (as indicated by expression 380) has been entered.

In FIG. 29 the mathematical expression 382 is automatically determined (by the mathematics program software) to be of incorrect syntax, since when raising a fraction to an exponent it is customary to place the fraction in brackets. Accordingly, a shaded slot 383 is generated and displayed in front of the exponent to indicate the problem, and to also indicate the presence of an exponent object by the relative positions of the shaded slot and the exponent field. As indicated in expression 386, by wrapping the fraction object ("⅔") in brackets (i.e., placing the fraction object in the field of a round bracket object), the shaded slot is removed since the syntax is now correct. A similar example is expression 386, thus resulting in the automatically generated shaded slot 387 at the location of the incorrect syntax, with the exponent object being given a default vertical format. As with expression 382, by placing the entire complex fraction object inside the field of a round bracket object (as at expression 388), the ambiguity (and thus the shaded slot 387) are removed, and the exponent object is formatted vertically with respect to the syntactically acceptable preceding object (i.e. base). A slightly different example of error detection is depicted in the incomplete mathematical expression 390 which consists of a single exponent object with no object preceding it (i.e. no acceptable base) and the exponent field populated with the primitive object "2". In this instance, the shaded slot 391 is automatically generated in the field slot of the root field to indicate an incorrect first object in that field (namely the exponent object). A similar example is shown for expression 392, which consists of two exponent objects adjacent to one another, and wherein there is no syntactically correct preceding object (i.e. base) for either object. In this latter example two shaded slots 393, 395 are automatically generated.

Cursor Position Control Through Various Enter-Commands

When generating a new mathematical expression, typically operation of an "Enter" command from a keyboard (or other data entry device) will cause the cursor to move to the first slot of the next field of the associated non-primitive object or, if there is no next field, to the object slot of that object if it is not a root object, or if that object is a root object, to the last slot of the root field (or, if already there, outside of that root object and thus to the first slot of a next root field, if there is one). However, when editing an existing mathematical expression it can be desirable to move the cursor to alternative positions for editing through alternative "enter" commands, as will now be described.

Edit-Enter

When editing an existing mathematical expression it is generally desirable to be able to quickly move the cursor to the last slot of a field so that entry of objects into the field can be easily resumed. As can be appreciated, if the cursor is located in the first slot of a field to be edited (as will occur with the use of a standard "enter" operation), then the user will be required to perform additional keystrokes and/or mouse operations in order to move the cursor to the last slot of the field. Accordingly, in one embodiment an equation editor can include an edit-enter function. This edit-enter function can be enabled, for example, by a keyboard (or other data entry device) command such as "Control-e" (or "Ctrl-e"). In general, the edit-enter function moves the cursor to the last slot of the current field, or if the cursor is already there, to the last slot of the next field of the associated non-primitive object, or if there is no next field and the non-primitive object is not a root object, to the object slot of the non-primitive object. More specifically, the edit-enter function can be implemented as a set of computer executable-instructions (such as an edit-enter program) which can perform an analysis (and perform the desired operations) based on the current position of the cursor. One example will now be described. In a first step, the program for the edit-enter function will query whether the cursor is in the last slot of the current field. If not, then the edit-enter command causes the cursor to be moved to the last slot of the current field, and operation terminates. However, if the cursor is currently in the last slot of the current field, the program then queries if the cursor is in a root field. If the answer to this query is "yes" (i.e., the cursor is in the last slot of a root field) then operation terminates. However, if the answer to this query is "no" (i.e., the cursor is in the last slot of the current field, which is not a root field), then the program queries whether the associated non-primitive object of the current field has a next field. If the answer to this query is "yes", then the edit-enter command causes the program to move the cursor to the last slot of that next field. (For example, if the cursor is at the last slot of a numerator field, then the query determines that there is a next field to the associated fraction object, and thus moves the cursor to the end of the denominator field of the fraction object. At this point the user can resume entering objects into the denominator field.) However, if the query determines that there is no next field within the current non-primitive object, then the edit-enter command causes the program to move the cursor to the object slot of the associated non-primitive object. (For example, if the cursor is currently at the last slot of a denominator field, then the program will move the cursor to the object slot for the associated fraction object so that editing can easily resume to the immediate right of the fraction object.) In another variation, the edit-enter command takes the cursor from the last slot of a root field to the last slot of the next root field (if there is one) in the document.

Backward-Enter

As can be seen, the above-described edit-enter operation generally tends to move the cursor in a forward direction (with respect to the slot sequence) for editing (e.g., from a numerator field to a denominator field). However, it can also be desirable to enable a variation on the edit-enter operation which generally moves the cursor in a backward direction (e.g., from a denominator field to a numerator field). Accordingly, in one embodiment an equation editor can include a backward (or reverse) edit-enter function. This backward edit-enter function can be enabled, for example, by a keyboard (or other data entry device) command such as "Control-Alt-e" (or "Ctrl-Alt-e"), or merely "Alt-e". In general, the backward edit-enter function moves the cursor to the last slot of the previous field of the associated non-primitive object, or if there is no previous field and that object is not a root object, to the slot immediately preceding that object. More specifically, the backward edit-enter function can be implemented as a set of computer executable-instructions (such as a backward-edit-enter program) which can perform an analysis (and perform the desired operations) based on the current position of the cursor. One example will now be described. In a first step, the program for the backward-edit-enter function will query whether the cursor is in a root field. If the answer to query is "yes", then operation terminates (i.e., there is no prior field for editing, and thus the command has no meaning). However, if the cursor is not in a root field then the program queries whether the associated non-primitive object of the current field has a previous field. If the answer to this query is "yes", then the program will cause the cursor to be moved to the last slot of the previous field. (For example, if the cursor is currently in the denominator field of a fraction object, then the backward-edit-enter command will cause the cursor to be moved to the last slot of the numerator field of the fraction object.) However, if the answer to this query is "no" (i.e., the associated non-primitive object in which the cursor currently lies does not have a previous field), then the program will cause the cursor to be moved to the slot immediately preceding the associated non-primitive object. (For example, if the cursor is currently in the numerator field of a fraction object, then the program will move the cursor to the slot immediately preceding the fraction object.) In another variation, the backward-enter command can cause the cursor to be moved from the last slot of a root field to the last slot of the previous root field (if there is one) in the document. In yet another variation, the backward-edit-enter command can cause the cursor to be moved to the first slot (field slot) of the current field, or if the cursor is already there, to the first slot of the previous field of the associated non-primitive object, or if there is no previous field and that object is not a root object, to the slot immediately preceding that object. In a further variation, the backward-enter command can cause the cursor to be moved from the first slot of a root field to the first slot of the previous root field (if there is one) in the document.

Transformation of Object-Field-Based Data Structures into a Content-Tree-Based Data Structure As described above, in one embodiment a mathematical expression can be represented using an object-field diagram, as depicted in FIG. 2. The object-field diagram, and the accompanying data structure, facilitate input, editing and presentation (via a display device) of a mathematical expression, and also contain sufficient explicit information to allow the mathematical expression to be solved by an automated solver (such as a computer algebra system or a calculator) that is programmed to use such a data structure. However, the object-field diagram (and the accompanying data structure), can also be transformed into a content-tree format, which can then be used with a conventional automated solver that is programmed to use a conventional content-tree-based data structure. One benefit of this feature is that an expression editor programmed using an object-field-based data structure can be used as a front-end to an existing conventional solver back-end.

As a preliminary matter, each object in the object library will have one or more associated rules regarding the mathematical significance of the object. For example, the primitive object "2" has an associated mathematical significance that the object represents the number two.

In addition to these basic rules that can be established in the program for the mathematics system, the program can further include a set of computer-executable instructions to transform the data structure (which is based either on an object-field diagram (e.g., as depicted in FIG. 2), or a object-field tree (e.g., as depicted in FIG. 5)) into a content-tree-based data structure (which can itself be represented by a content tree). The content-tree-based data structure can then be used with an existing conventional automated solver. We will now describe methods for making these two transformations (i.e., (1) from an object-field-based data structure to a content-tree-based data structure, and (2) from an object-field-tree-based data structure to a content-tree-based data structure), and will then provide examples of each. It will also be appreciated from the following descriptions and examples that the transformations can work in reverse to transform a content-tree-based data structure of a mathematical expression into either the object-field-diagram-based data structure or the object-field-tree-based data structure. It will also be appreciated from the descriptions of the following examples that in either event, regardless of which form of the two data structures is used as the starting point, the resulting content-tree-based data structure is the same. Thus, the object-field-based data structure can be used with existing conventional automated solvers.

A content-tree diagram is composed of row members which are joined at nodes. The nodes comprise operands to be performed on the row members which are joined at the node. For example, the mathematical expression "2+5" is represented in a content-tree diagram by a node "+" which joins row members "2" and "5". Accordingly, a data structure which can be represented by a content-tree diagram includes all of the necessary information for automated coding of the mathematical expression in a form which can be used by automated solvers and calculators.

Transformation of Object-Field-Diagram-Based Data Structure into Content-Tree-Based Data Structure We will now describe one example of how an object-field-diagram-based data structure can be converted or transformed into a content-tree-based data structure. (The transformation of an object-field-diagram-based data structure into a content-tree-based data structure assumes that the object-field-diagram-based data structure (as represented by the object-field diagram) is free of error conditions such as syntax errors, incorrect juxtaposition of objects, empty fields, etc.) As a first step, the object-field-diagram-based data structure is modified into a form suitable for mathematical calculation as described above. Then, starting from the root field of the object-field diagram, the object-field diagram (or data structure) is transformed into a content-tree-based data structure by splitting field segments at operator objects, in a process reverse to the order of operations. When such a split occurs, the operator object at the location of the split becomes a node, with field segments as its children. The child field segments retain their relative order with respect to the infix entry process. Field segments are split until they consist of a single primitive object segment (such primitive object field segments are subsequently also converted to nodes of the content tree).

Figure 17:
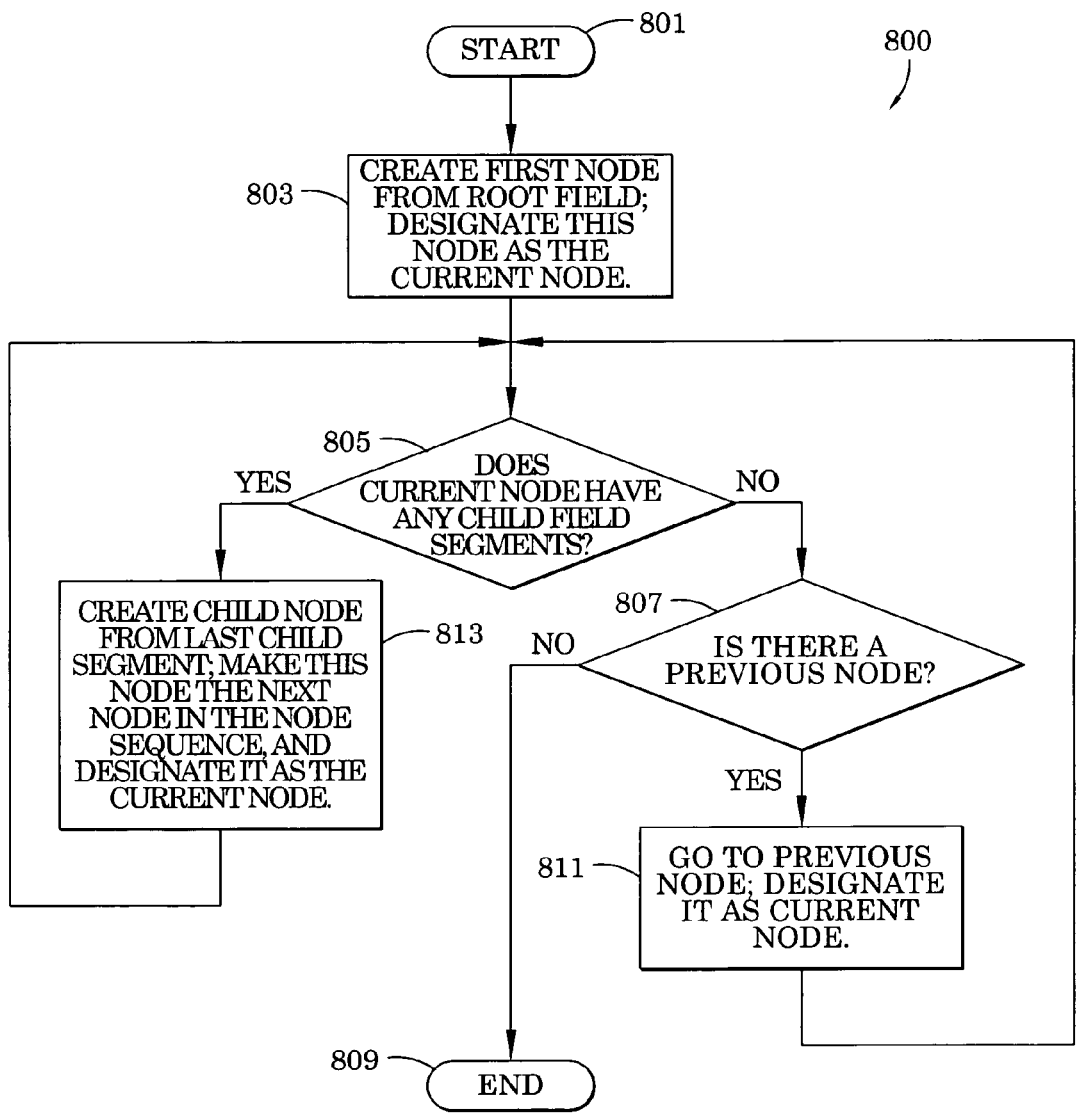
FIG. 17 is a flowchart depicting one method for transforming an object-field-diagram-based data structure for a mathematics system into a content-tree-diagram-based data structure which can be used with an existing conventional automated solver.

A flowchart 800 describing one method for generating the nodes for the content tree (and data structure) from an object-field diagram (and data structure) is depicted in FIG. 17. The process begins at step 801. At step 803 a first node is created from the root field, and this node is designated as the current node. That first node is created from the last (with respect to the order of operations) operator guest object of the root field. The process then moves to step 805 where a determination is made whether the current node has any child field segments. (A child field segment is a field segment which depends from a node. For example, in the expression "3+4Y", following insertion of an implicit multiplication object between "4" and "Y", the expression becomes "3+4*Y"; the first node created thus becomes the operator "+", and the children of the node are "3" and "4*Y". In this example, the child "4*Y" is a child field segment that can be broken down into a further node with children—specifically, an implicit multiplication operator node with children "4" and "Y".) If the current node has no child field segments (as determined at step 805), the process then moves to step 807 where a determination is made whether there is a previous node to the current node. If not, the process ends at step 809. However, if there is a previous node identified at step 807, then at step 811 the previous node (i.e., previous to the current node) is then designated as being the current node (i.e., the new current node), and the process returns to step 805. As an example of the process at step 811, in the expression "3+5", the first node created will be the addition operator node between child field segments "3" and. "5" The second node created will be the node "5", which has no child field segments (as determined in step 805). In this case, there will be a previous node (as determined at step 807), which is the addition operator node. At step 811, this addition node will then be designated as the current node, and the process will continue at step 805.

Figure 18:
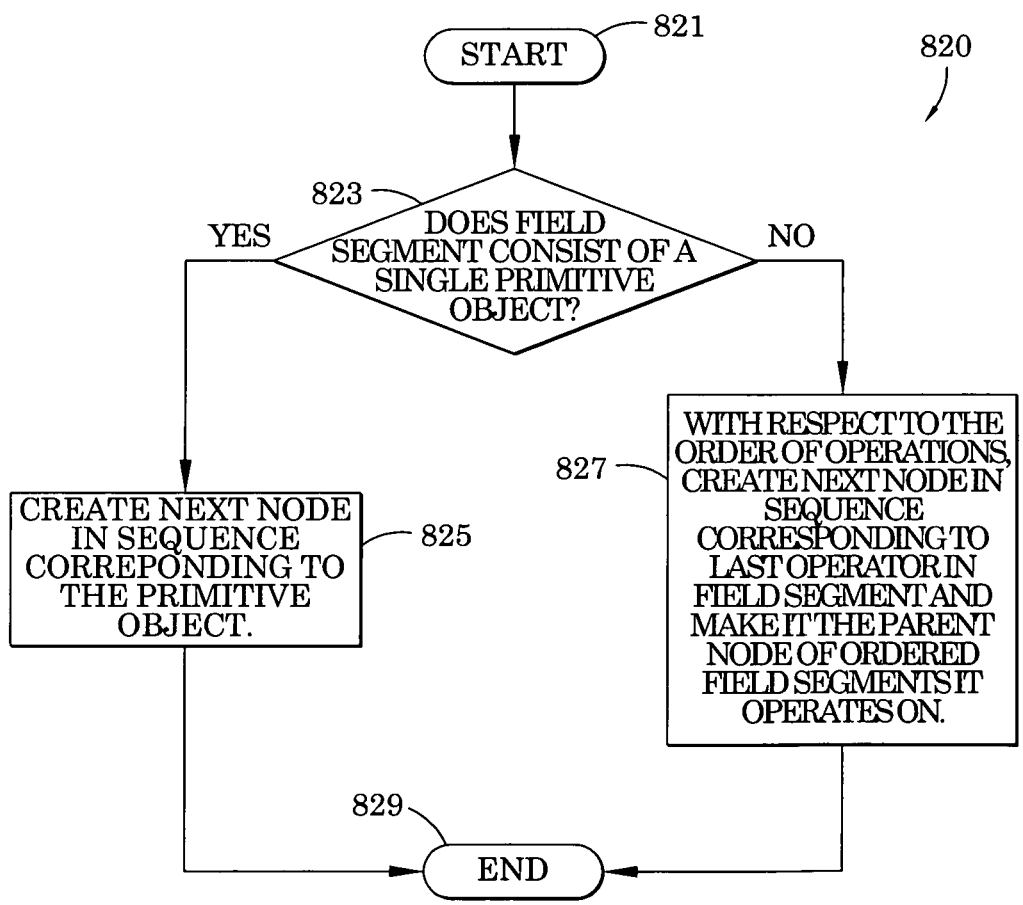
FIG. 18 is a flowchart depicting one method for generating a child node at step 813 of the flowchart of FIG. 17.

If at step 805 in the flowchart 800 it is determined that the current node has at least one child field segment, then at step 813 a child node is created from the last child segment in the current node sequence (i.e., last with respect to the infix entry process). This new node is then made the next node in the node sequence, and is designated as the current node (for purposes of step 805, to which the program returns following step 813). A process for creating the new node at step 813 is provided in the flowchart 820 of FIG. 18. That process beings at step 821, and at step 823 a determination is made whether the field segment (i.e., the field segment being processed at step 813 in flowchart 800) consists of a single primitive object. If the answer to this query is yes (i.e., the field segment is a single primitive object), then at step 825 the next node in the sequence is created, the node corresponding to the primitive object. The process then ends at step 829. However, if at step 823 it is determined that the field segment is not a single primitive object (i.e., there is at least one operator in the field segment), then at step 827 the next node in the sequence is created, corresponding to the last operator (with respect to the order of operations) in the field segment. This node is then made the parent node of ordered field segments it operates on. For example, if at step 827 the field segment is "2+5−7", the last operator with respect to the order of operations is the subtraction operator, which is then made the parent node of segments "2+5" and "7".

Figures 19B, 19C, 19D:
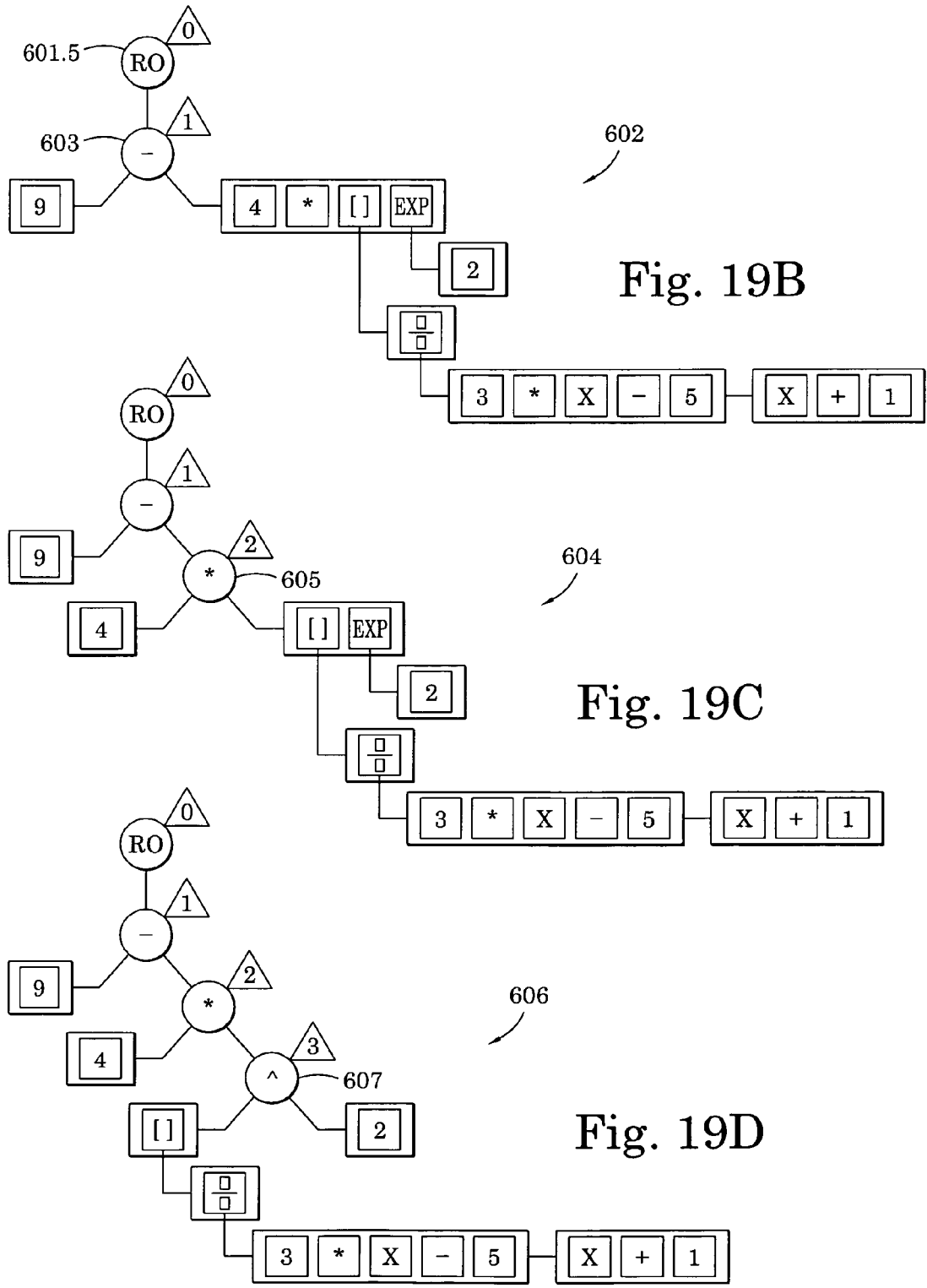
Figure 19E:
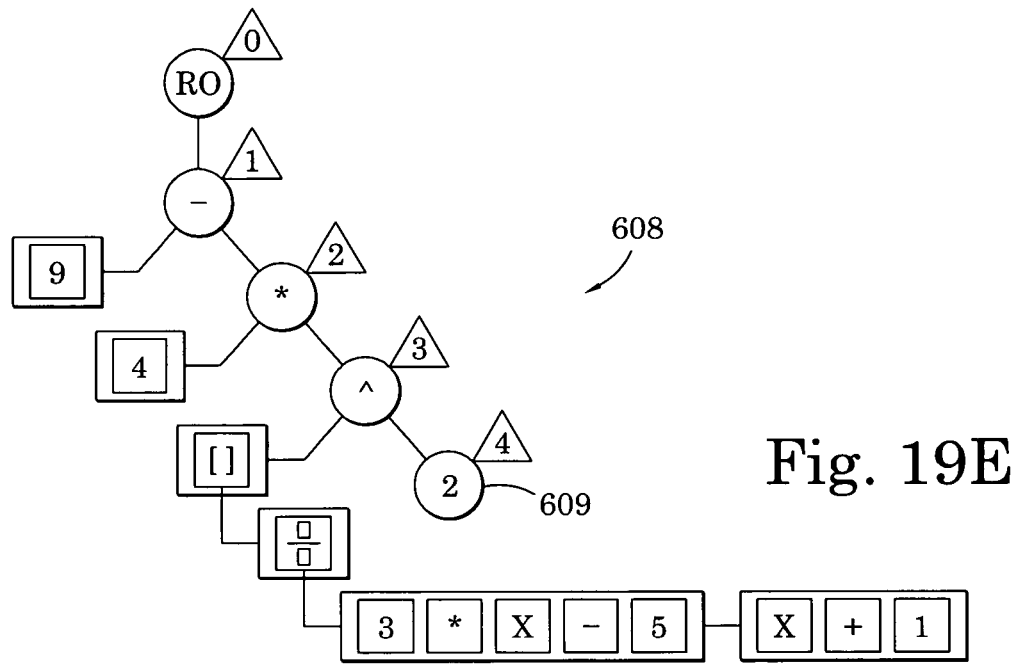
Figure 19F:
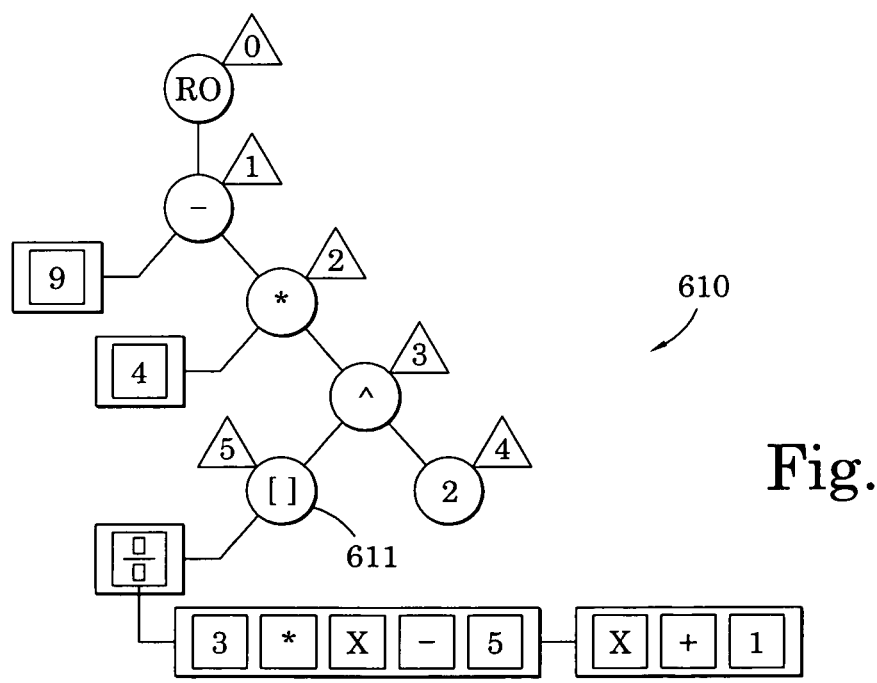
Figure 19G:
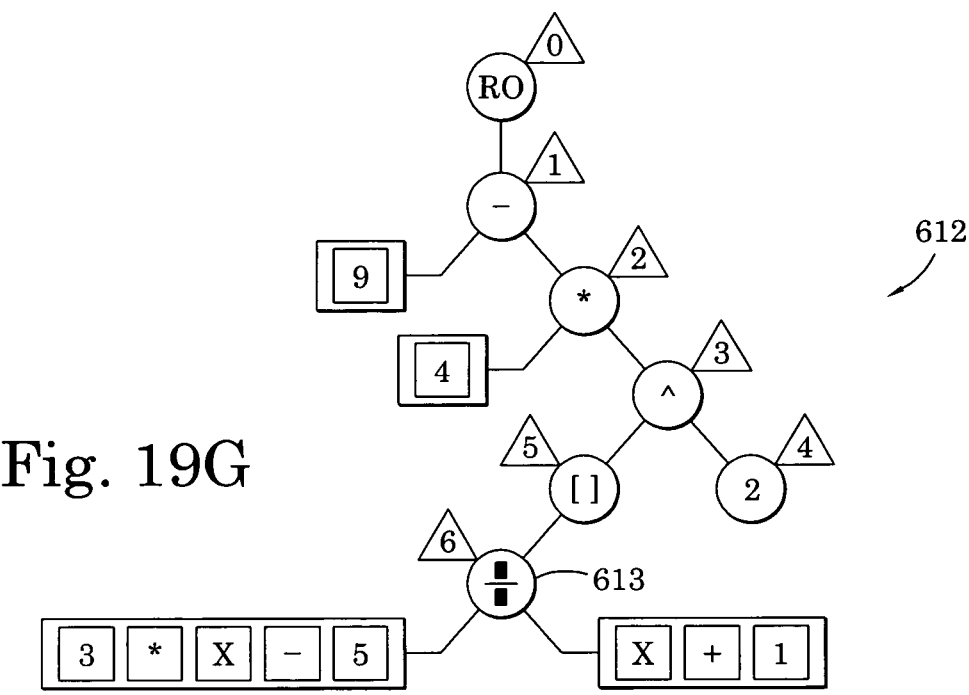
Figure 19H:
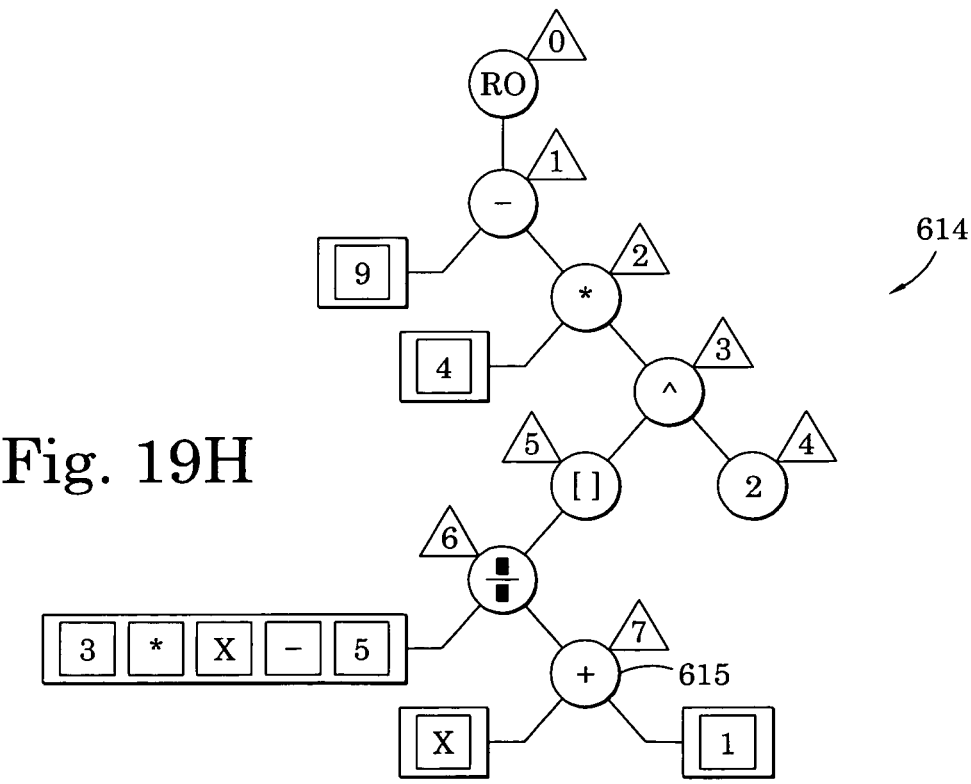
Figure 19I:
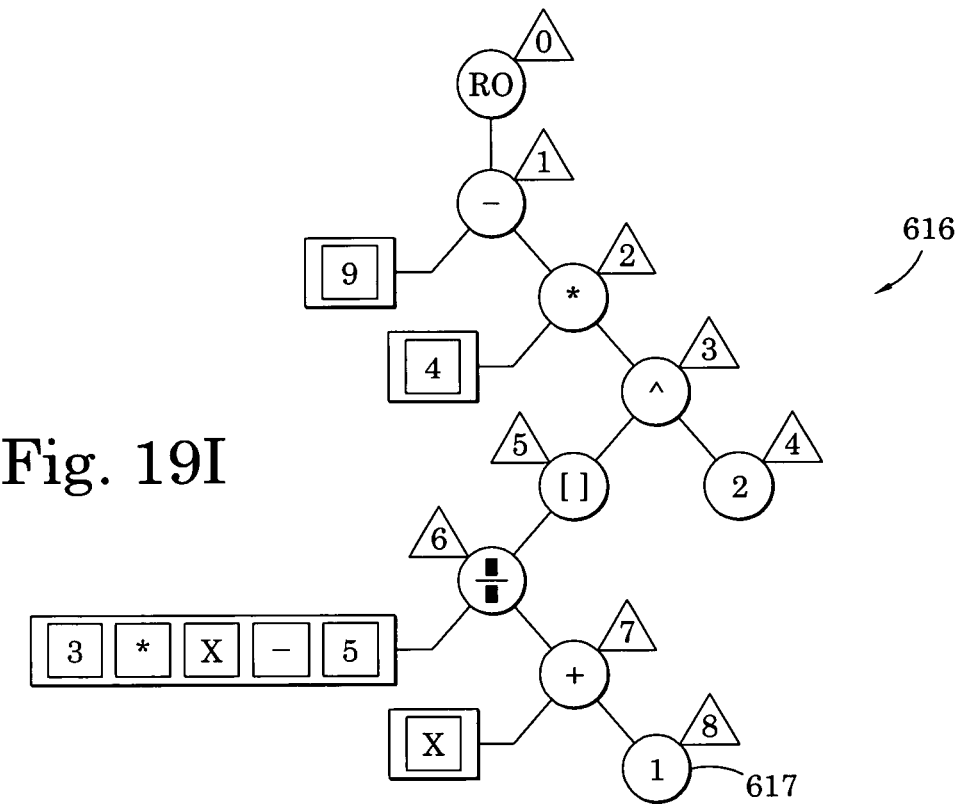
Figure 19J:
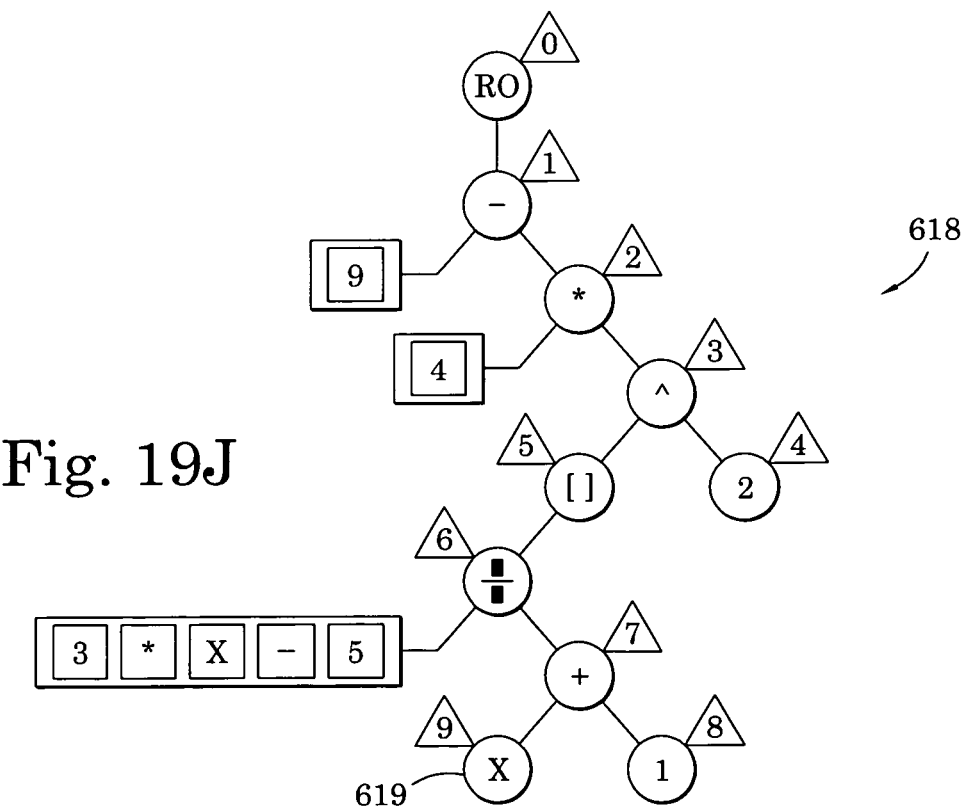
Figure 19K:
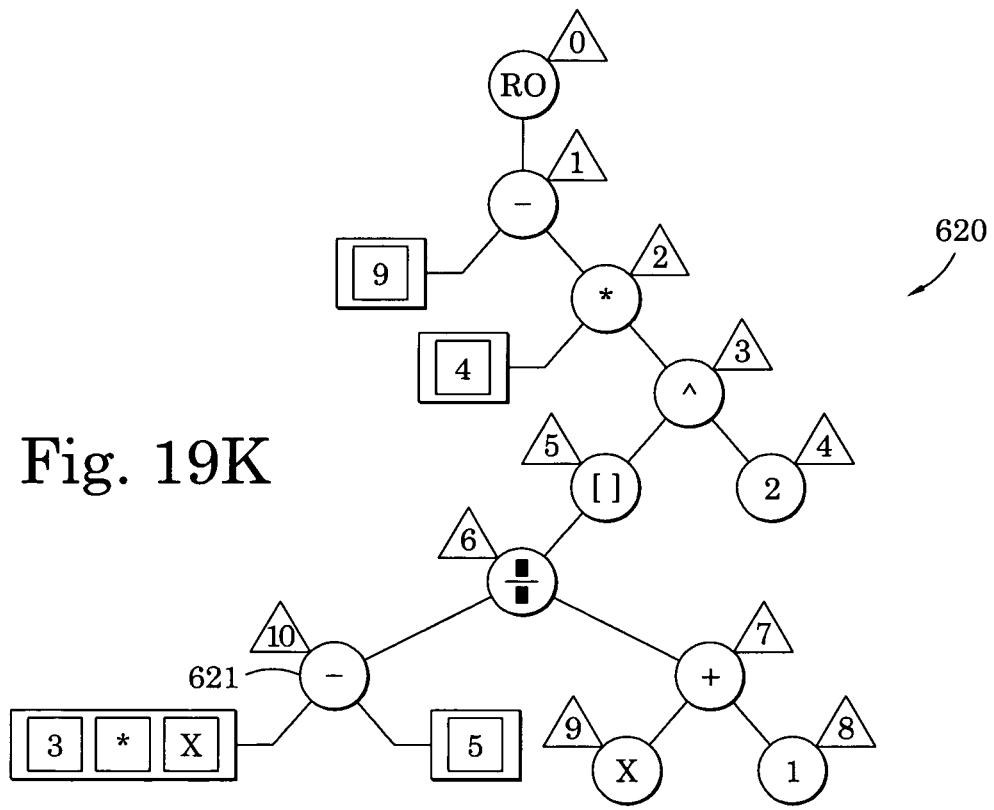
Figure 19L:
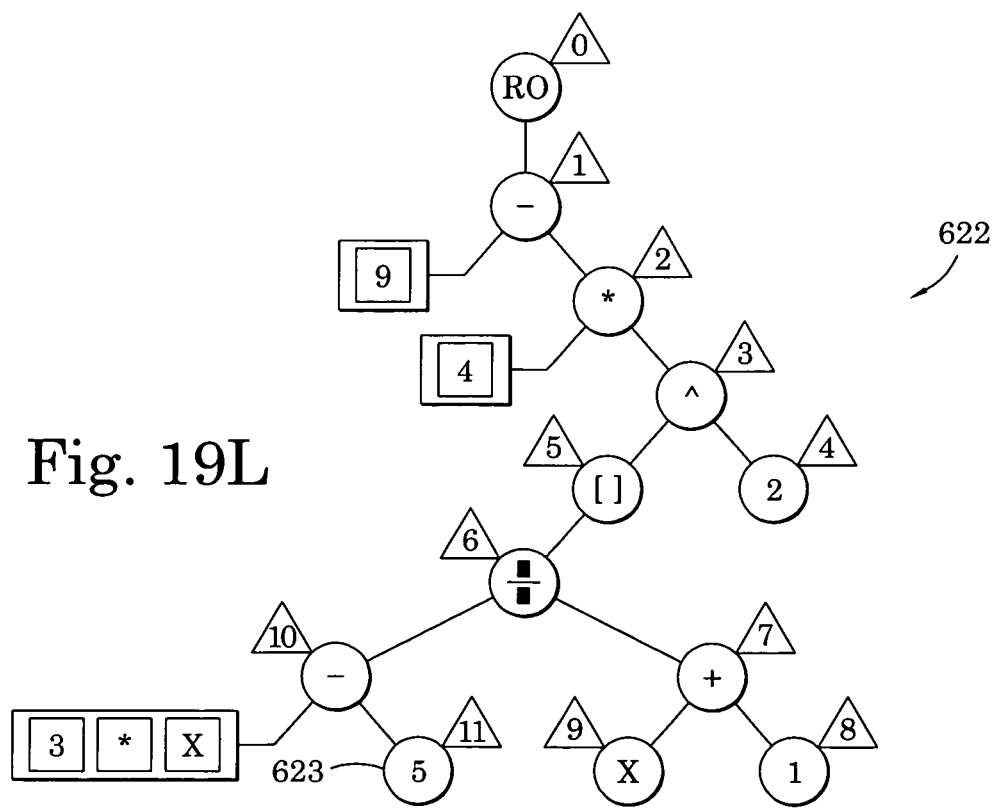
Figures 19M, 19N:
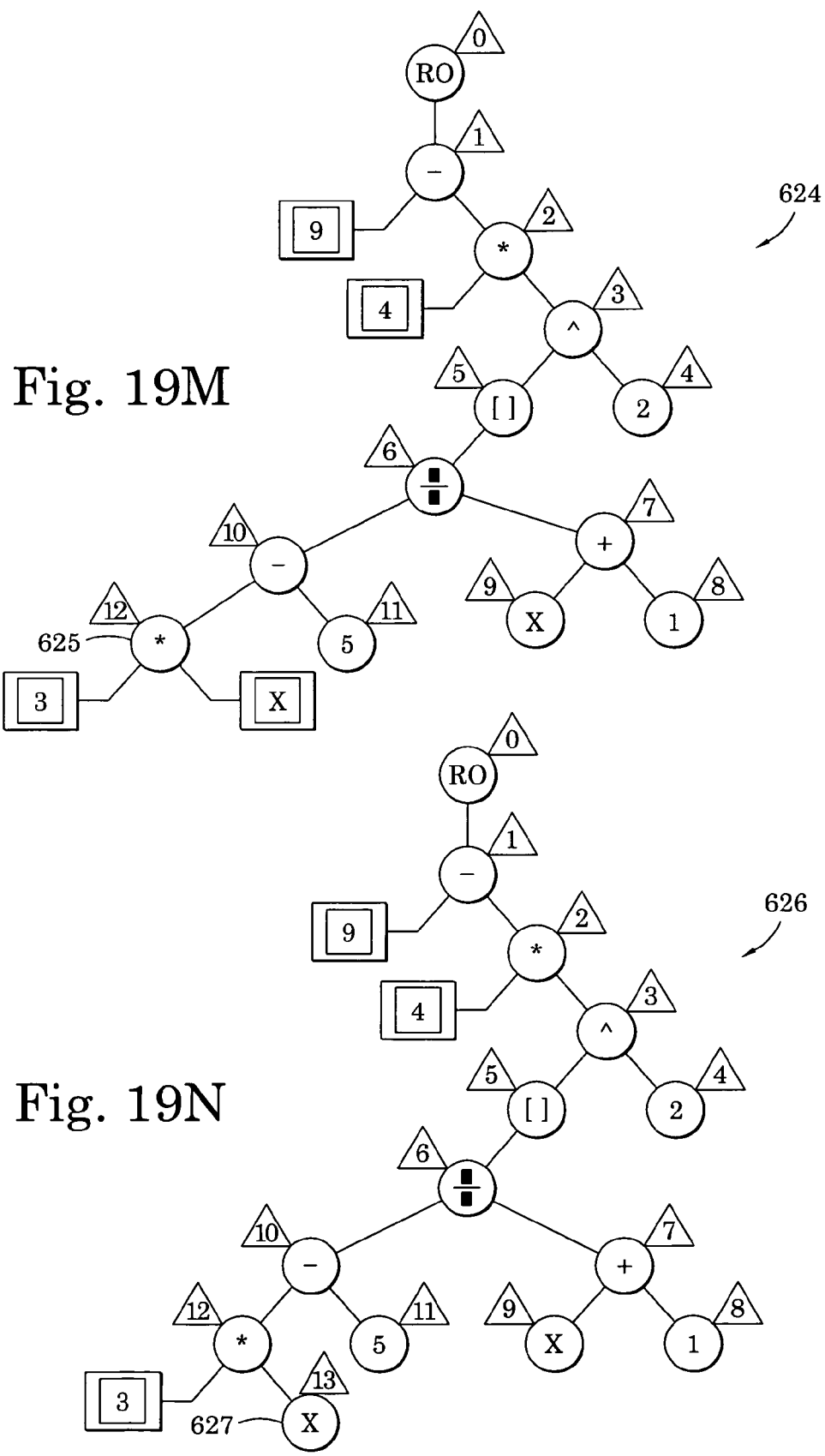
Figure 19P:
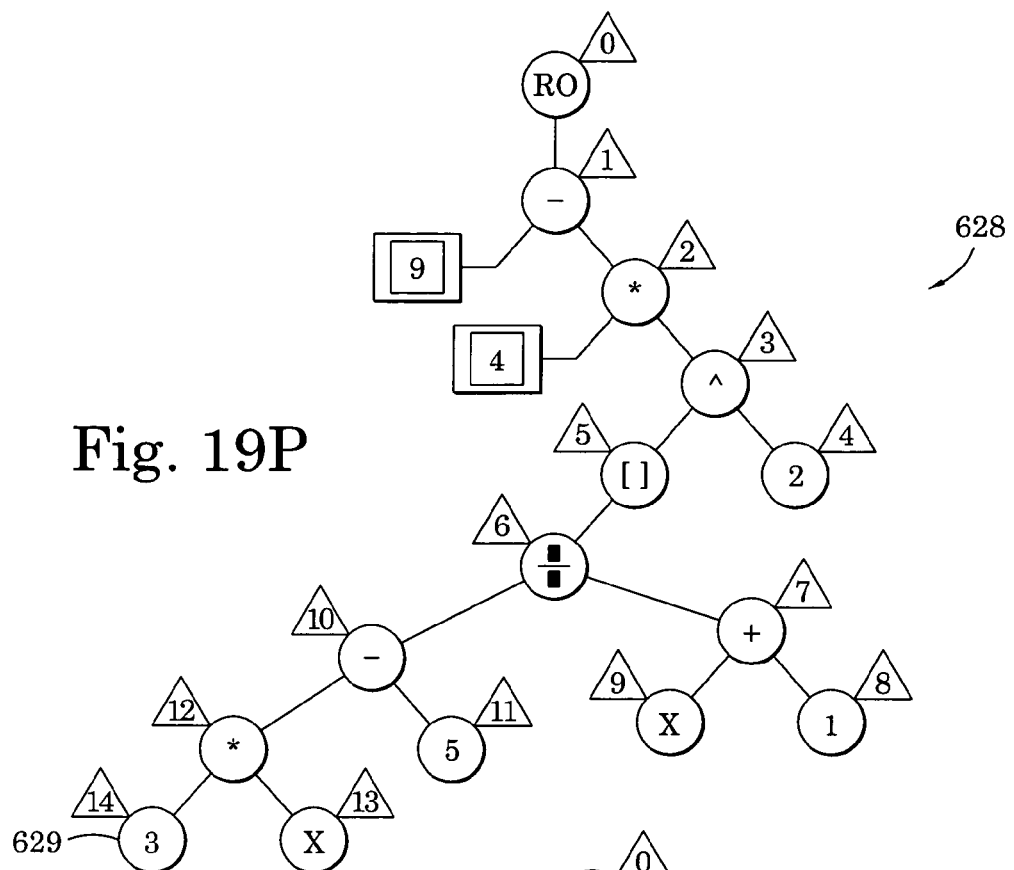
Figure 19Q:
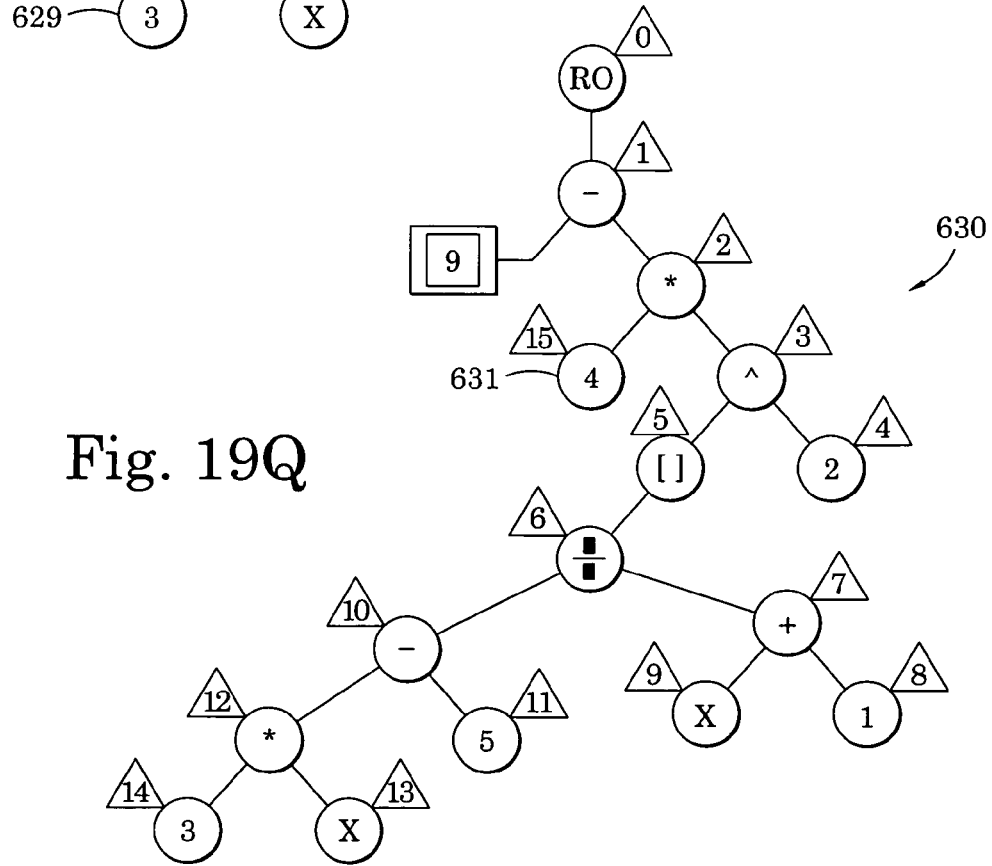
Figure 19R:
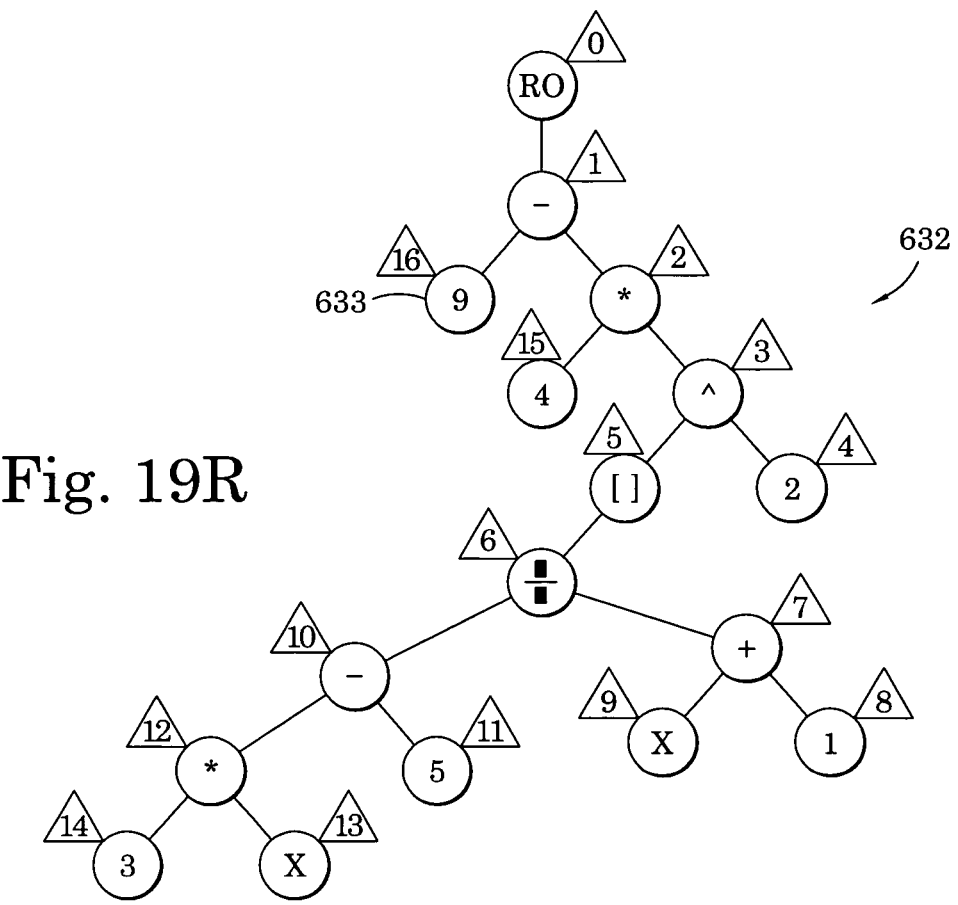

An example of the transformation of the object-field diagram of FIGS. 2 and 4 (representing EQN. 1) into a content tree will now be provided with respect to the schematics depicted in FIGS. 19A through 19R. (Note that there is no FIG. 19O (letter "O") in order to avoid confusion with the number "190".) At FIG. 19A the object-field diagram 100 of FIG. 2 has been modified to the diagram 600 by inserting the implicit multiplication operators 601. (Note that if any of the numbers in EQN. 1 were multi-object numbers, they would have been tokenized (bundled) into single objects by this stage.) At FIG. 19B a root object ("RO") node 601.5 is created, and is designated as node 0 (zero), as indicated by the number in the triangle at the upper right of the node. (In the remaining FIGS. 19C through 19R, the node numbers added at each step will be indicated by this convention.) Also depicted in the diagram 602 of FIG. 19B, the first node 603, numbered as node 1, is created. The creation of node 1 follows step 813 of the flowchart 800, and step 827 of the flowchart 820. In FIG. 19C the diagram 604 depicts the creation of node 2 (indicated by the implicit multiplication operator 605), and its two child fields are depended from the node. In FIG. 19D diagram 606 depicts the creation of node 3 (the exponent operator 607). In FIG. 19E the diagram 608 is modified to convert the object segment "2" in the exponent field into a node 609 (node 4) having a numerical value of 2. The creation of node 4 follows step 813 of the flowchart 800, and step 825 of the flowchart 820, since the object segment "2" consists of a single primitive object. In FIG. 19F the diagram 610 is modified to convert the square bracket object into a bracket operator node 611 (node 5). In FIG. 19G the diagram 612 is modified to convert the fraction object into a fraction operator node 613 (node 6), and to place the numerator and denominator child field segments in a row depending from the fraction node 613. The numerator field segment is on the left and the denominator field segment is on the right, corresponding to the infix entry process. In FIG. 19H the diagram 614 is modified to create the addition node 615 (node 7) from the denominator field segment, and to place the remaining field segments in a row depending from the addition node 615. In FIG. 19I the diagram 616 is modified to convert the object segment "1" into a node 617 (node 8) having a numerical value of 1. In FIG. 19J the diagram 618 is modified to convert the object segment "X" depending from the addition node 615 (node 7) into a node 619 (node 9) indicating a variable designated as X. In FIG. 19K the diagram 620 is modified to create the subtraction node 621 (node 10) from the numerator field segment, and to place the remaining field segments in a row depending from the subtraction node 621 (node 10). In FIG. 19L the diagram 622 is modified to convert the object segment "5" into a node 623 (node 11) having a numerical value of 5. In FIG. 19M the diagram 624 is modified to create the implicit multiplication node 625 (node 12) from the field segment depending from the subtraction node 621 (node 10) and to place the remaining field segments in a row depending from the implicit multiplication node 625 (node 12). In FIG. 19N the diagram 626 is modified to convert the object segment "X" depending from the implicit multiplication node 625 (node 12) into a node 627 (node 13) indicating a variable designated as X. In FIG. 19P the diagram 628 is modified to convert the object segment "3" into a node 629 (node 14) having a numerical value of 3. In FIG. 19Q the diagram 630 is modified to convert the object segment "4" into a node 631 (node 15) having a numerical value of 4. Finally, in FIG. 19R the diagram 632 is modified to convert the object segment "9" into a node 633 (node 16) having a numerical value of 9. At this point the transformation is complete, and the data structure representing the diagram 632 can be used with a conventional content-tree-based automated solver or calculator.

With respect to FIG. 19R, mathematical operations are carried out in reverse order of the node numbers of their respective nodes. That is, in FIG. 19R the nodes that are mathematical operators are nodes 1, 2, 3, 5, 6, 7, 10 and 12. Thus, when calculating the mathematical expression, the first operation to be performed will be the multiplication operation at node 12 (in the numerator field of the fraction), and the last operation to be performed will be the subtraction operation at node 1 (in the root field).

In addition to providing for transformation of an object-field-diagram-based data structure into a content-tree-based data structure, the program can also provide for the inverse transformation—i.e., to transform a content-tree-based data structure into an object-field-diagram-based data structure. This can be accomplished by essentially reversing the process described above for transformation of an object-field-diagram-based data structure into a content-tree-based data structure. That is, starting in the reverse order of operations, rows of nodes in the content tree are collapsed into field segments about their respective operator nodes.

Transformation of Object-Field-Tree-Based Data Structure into Content-Tree-Based Data Structure We will now describe one example of how an object-field-tree-based data structure can be converted or transformed into a content-tree-based data structure. (The transformation of an object-field-tree-based data structure into a content-tree-based data structure assumes that the object-field-tree-based data structure (as represented by the object-field tree) is free of error conditions such as syntax errors, incorrect juxtaposition of objects, empty fields, etc.) As a first step, the object-field-tree-based data structure is modified into a form suitable for mathematical calculation as described above. Then, the field nodes can be considered as row nodes, while still retaining their ordering with respect to the infix entry process. Next, starting from the root row (the row node obtained from the root field) of the modified object-field tree, the modified object-field tree (or data structure) is transformed into a content tree (or data structure) by splitting rows of object nodes at operator, object nodes, in a process reverse to the order of operations. When such a split occurs, the operator object at the location of the split becomes a node, with row nodes as its children. Row nodes are split until they have only one remaining (primitive) object node depending from them. After a row node has only one remaining (primitive) object node depending from it, the row node and its single dependent object node are replaced by a node corresponding to that primitive object in the content tree.

Figure 20:
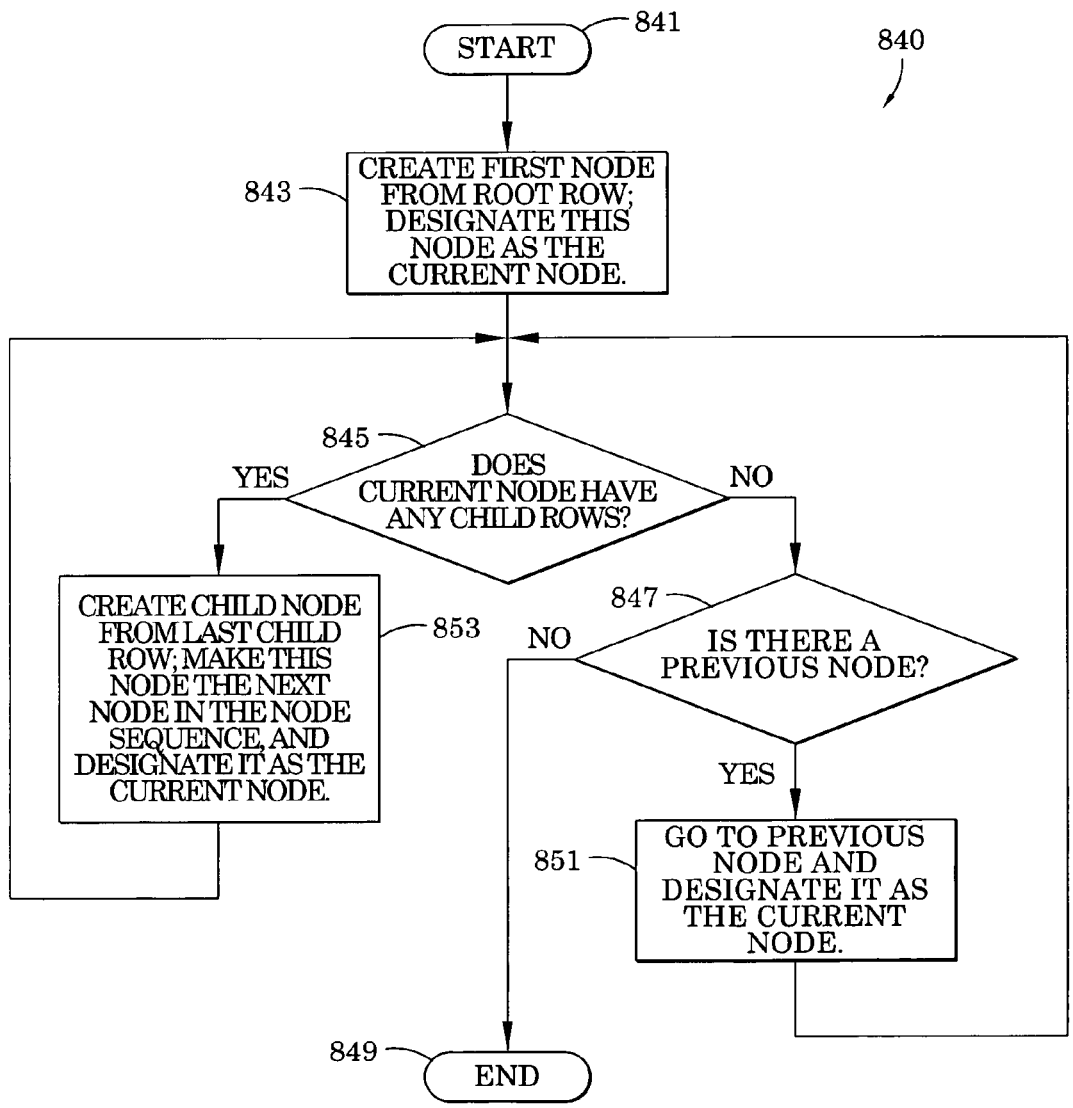
FIG. 20 is a flowchart depicting one method for transforming an object-field-tree-based data structure for a mathematics system into a content-tree-based data structure which can be used with an existing conventional automated solver.
Figure 21:
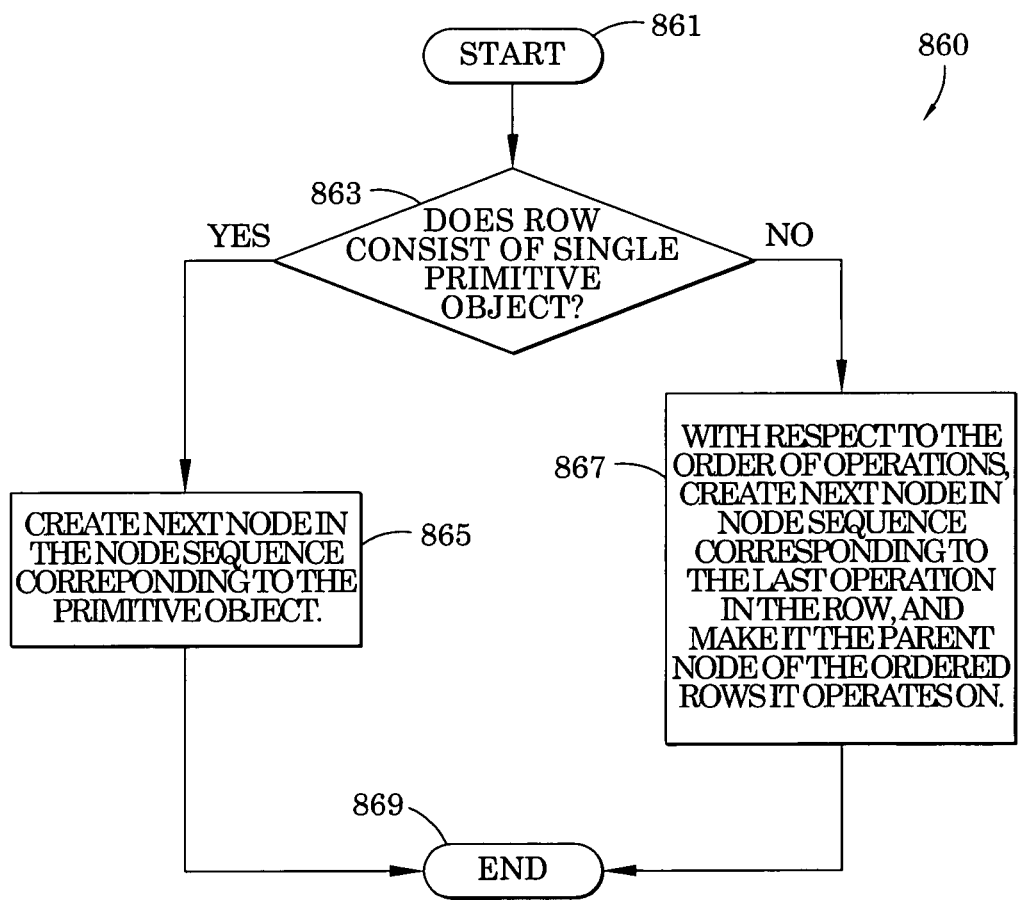
FIG. 21 is a flowchart depicting one method for generating a child node at step 853 of the flowchart of FIG. 20.

A flowchart 840 describing one method for generating the nodes for the content tree (and data structure) from the object-field tree (and data structure) is depicted in FIG. 20. The process begins at step 841. At step 843 a first node is created from the root row, and this node is designated as the current node. This first node corresponds to the last (with respect to the order of operations) operator in the root row. The process then moves to step 845 where a determination is made whether the current node has any child rows. If the current node has no child rows (as determined at step 845), the process then moves to step 847 where a determination is made whether there is a previous node to the current node. If not, the process ends at step 849. However, if there is a previous node identified at step 847, then at step 851 the previous node (i.e., previous to the current node) is designated as being the current node (i.e., the new current node), and the process returns to step 845. If at step 845 it is determined that the current node has at least one child row, then at step 853 a child node is created from the last child row in the current node sequence (i.e., last with respect to the infix entry process). This new node is then made the next node in the node sequence, and is designated as the current node (for purposes of step 845, to which the program returns following step 853). A process for creating the new node at step 853 is provided in the flowchart 860 of FIG. 21. That process beings at step 861, and at step 863 a determination is made whether the row (i.e., the row being processed at step 853 in flowchart 840) consists of a single primitive object. If the answer to this query is yes (i.e., the row node has a single dependent node which is a primitive object node), then at step 865 the row node and its single dependent object node are replaced by the next node in the node sequence, the node corresponding to the primitive object in the content tree. The process then ends at step 869. However, if at step 863 it is determined that the row is not a single primitive object (i.e., there is at least one operator in the row), then at step 867 the next node in the sequence is created, corresponding to the last (with respect to the order of operations) operator in the row. This node is then made the parent node of ordered rows it operates on.

Figure 22A:
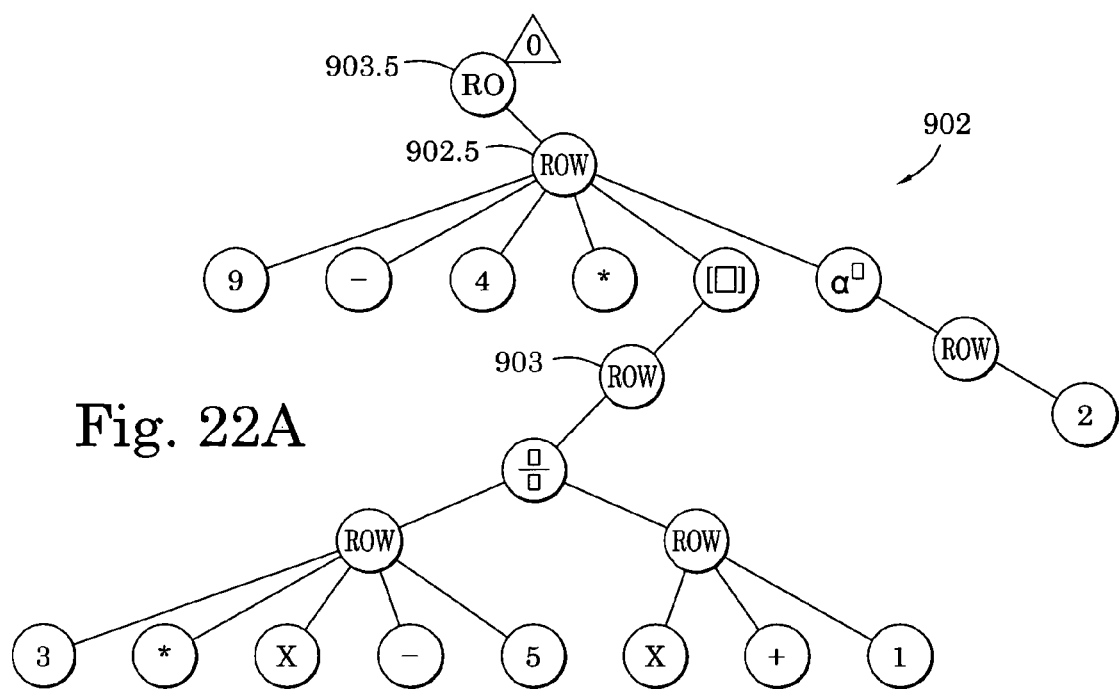
FIGS. 22A through 22S (excluding FIGS. 22O and 22Q) are diagrams depicting a sequential transformation of an object-field tree into a content tree.
Figure 22B:
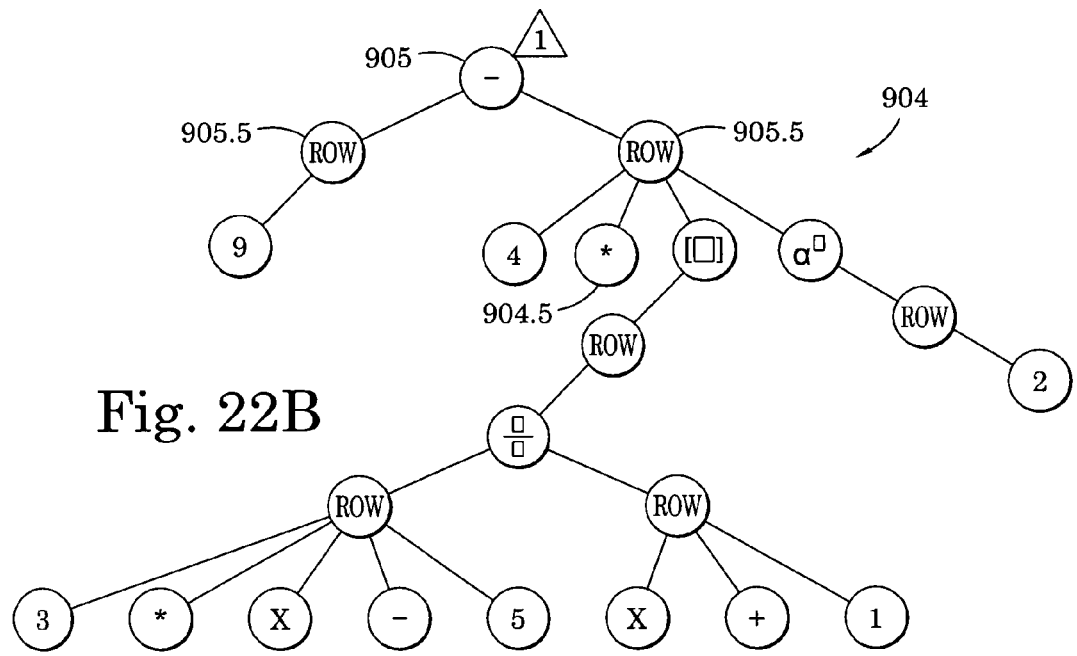
Figure 22C:
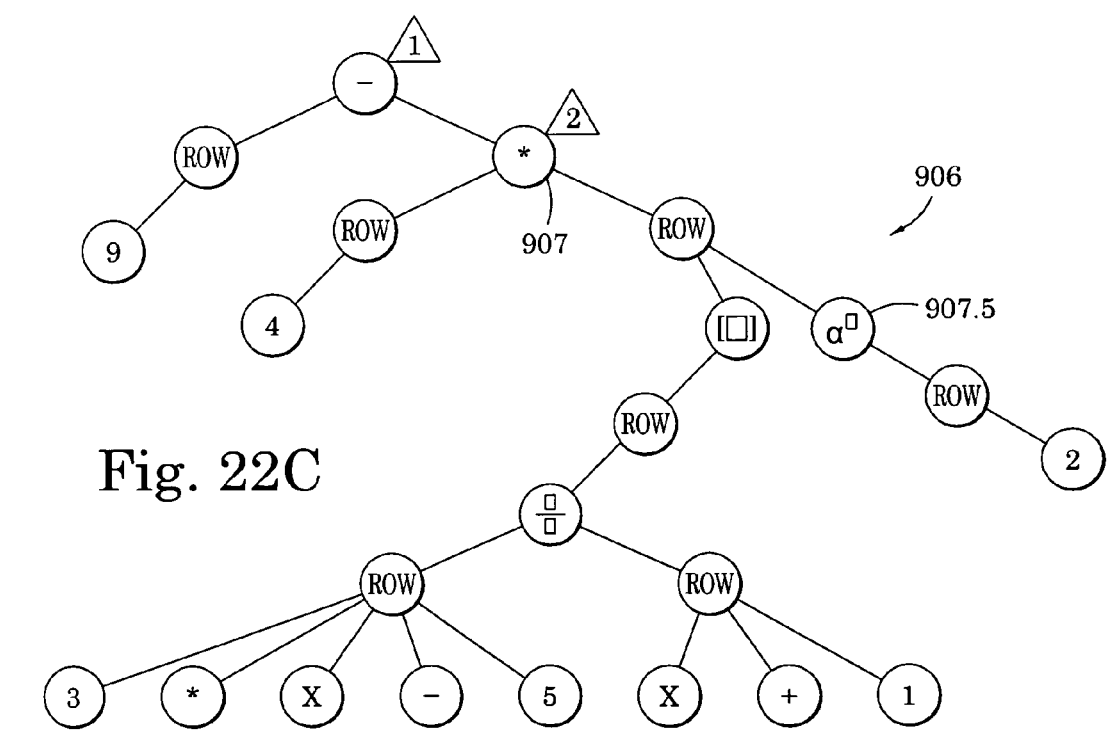
Figure 22D:
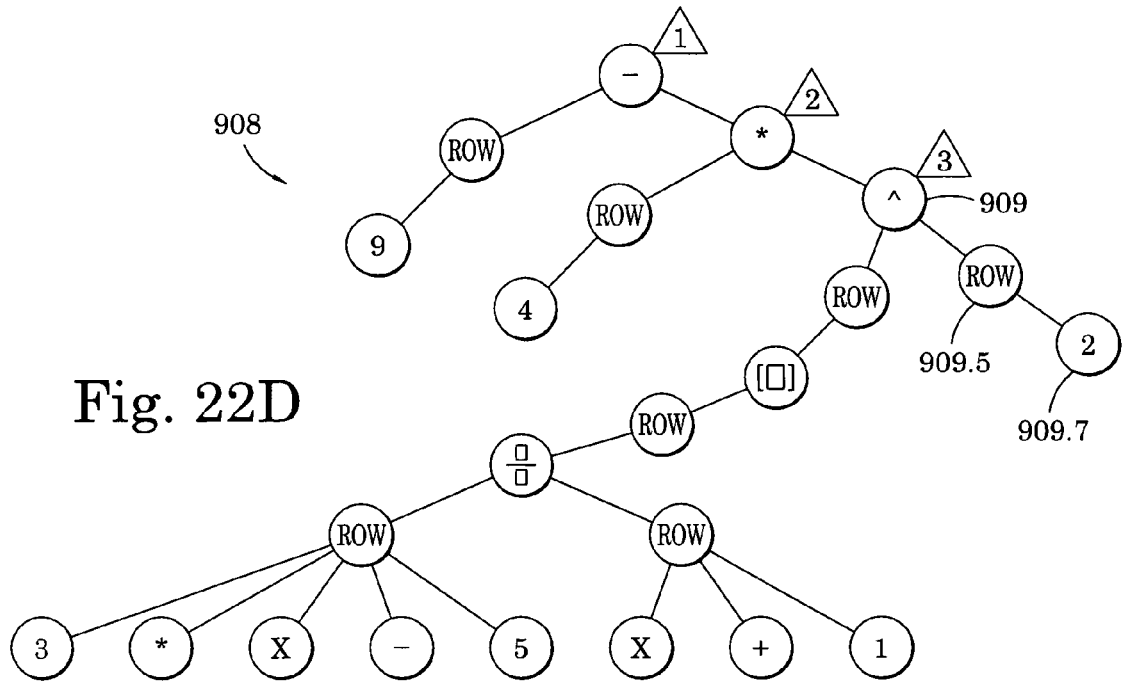
Figure 22E:
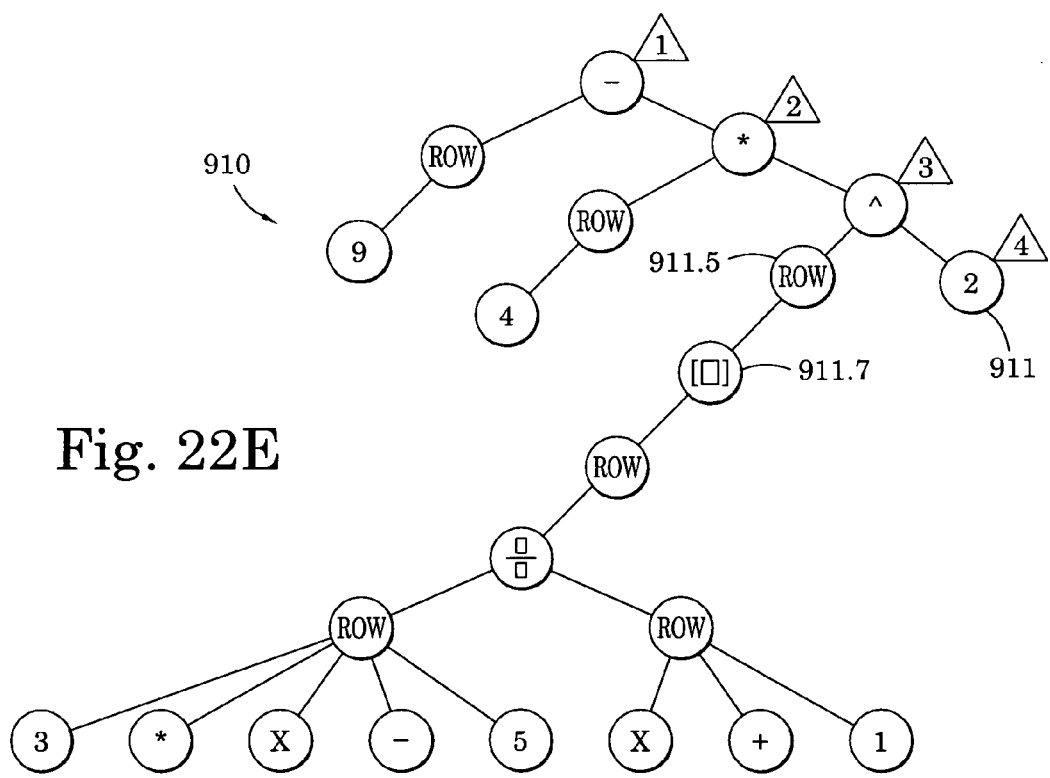
Figure 22F:
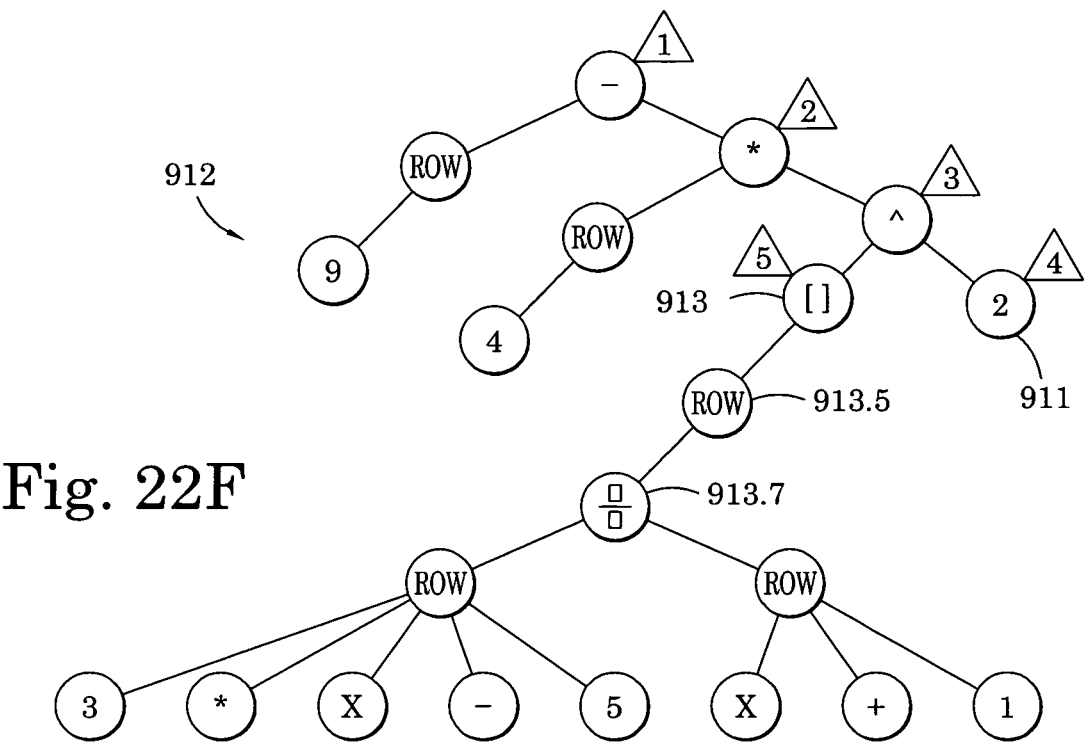
Figure 22G:
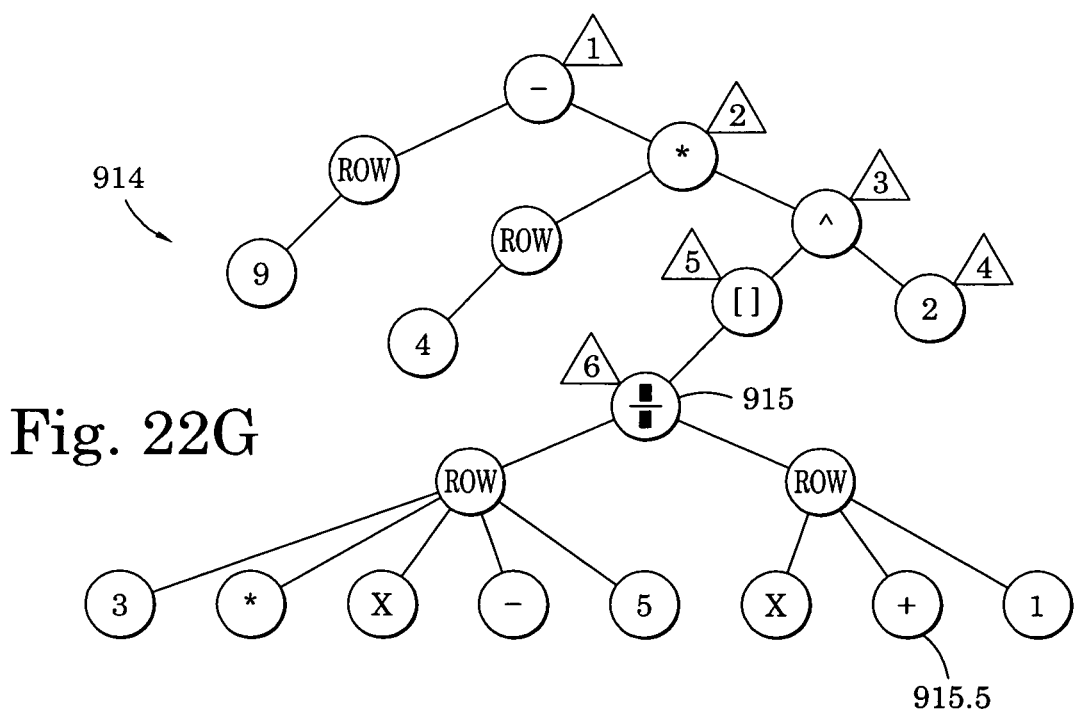
Figure 22H:
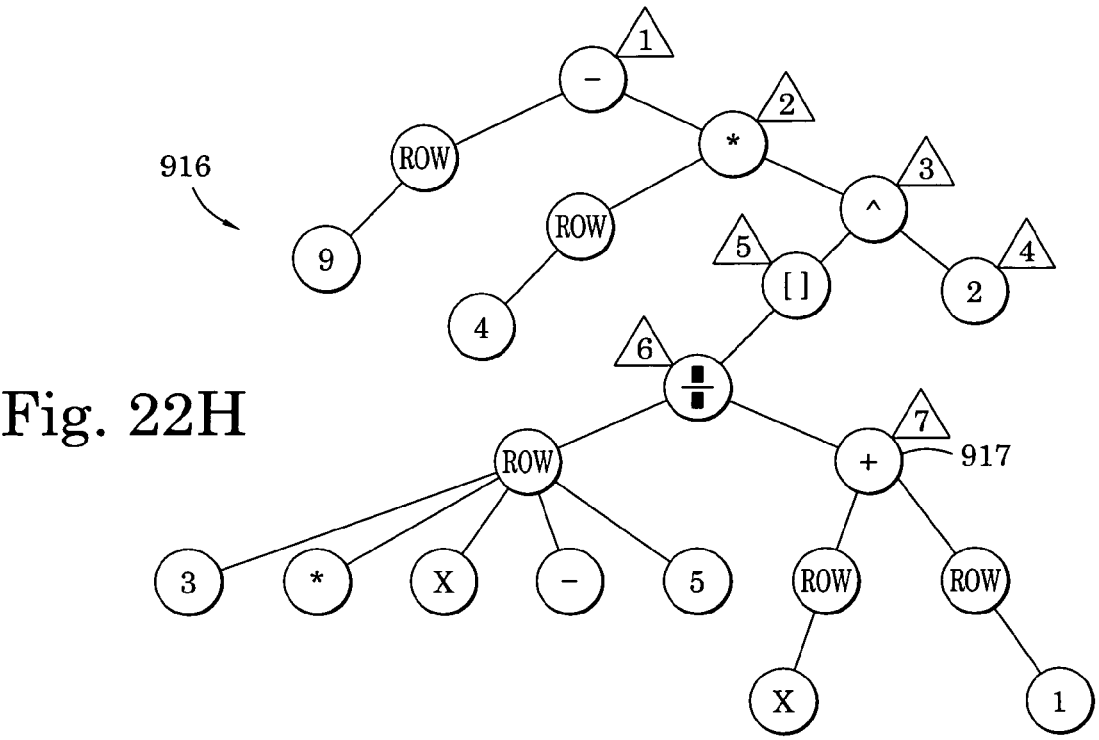
Figure 22I:
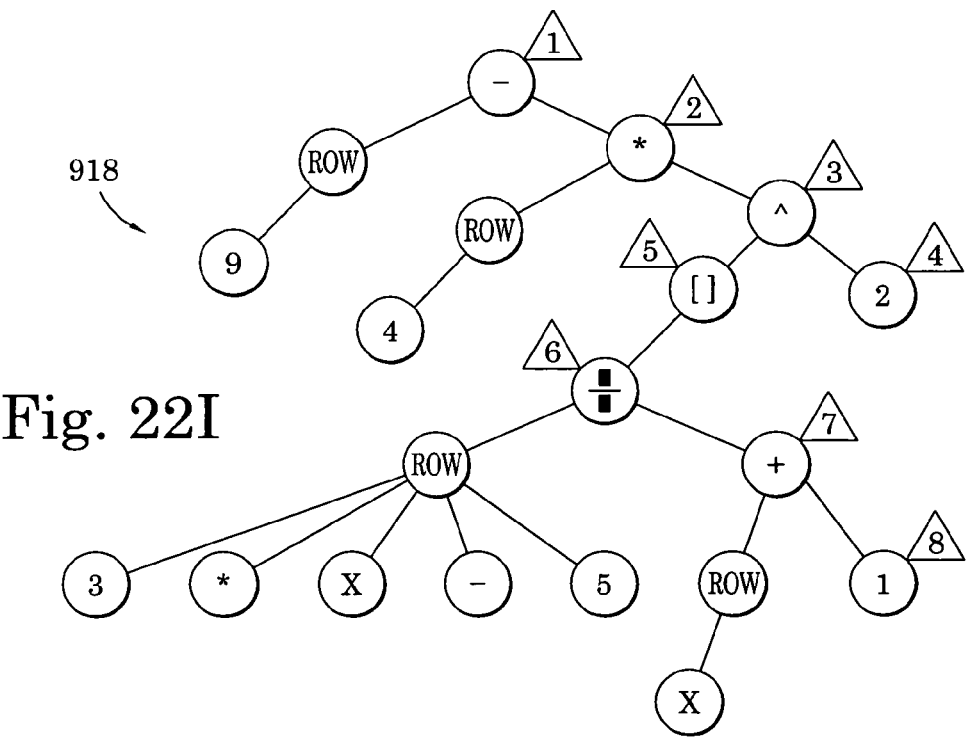
Figure 22J:
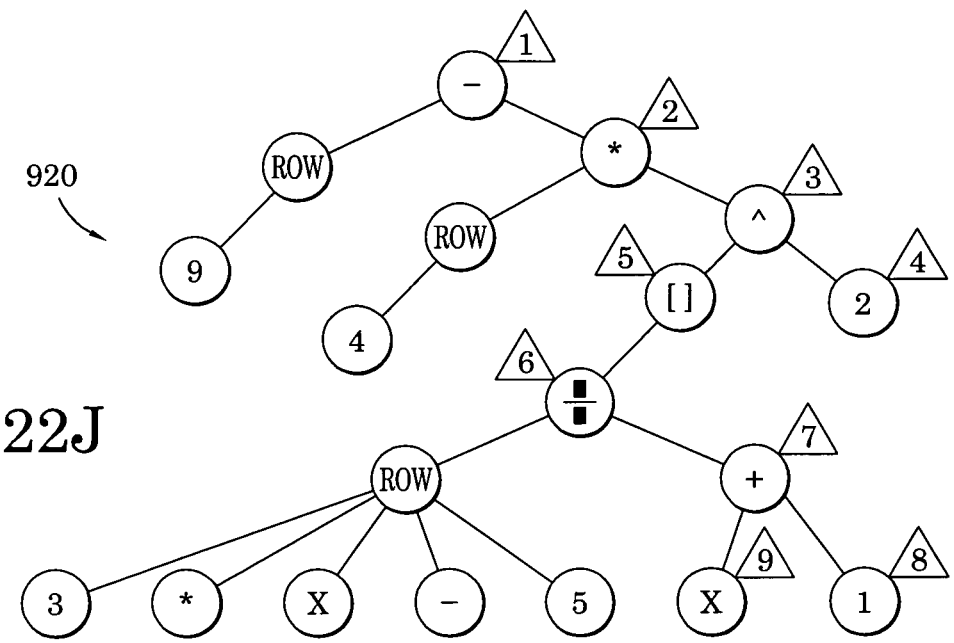
Figure 22K:
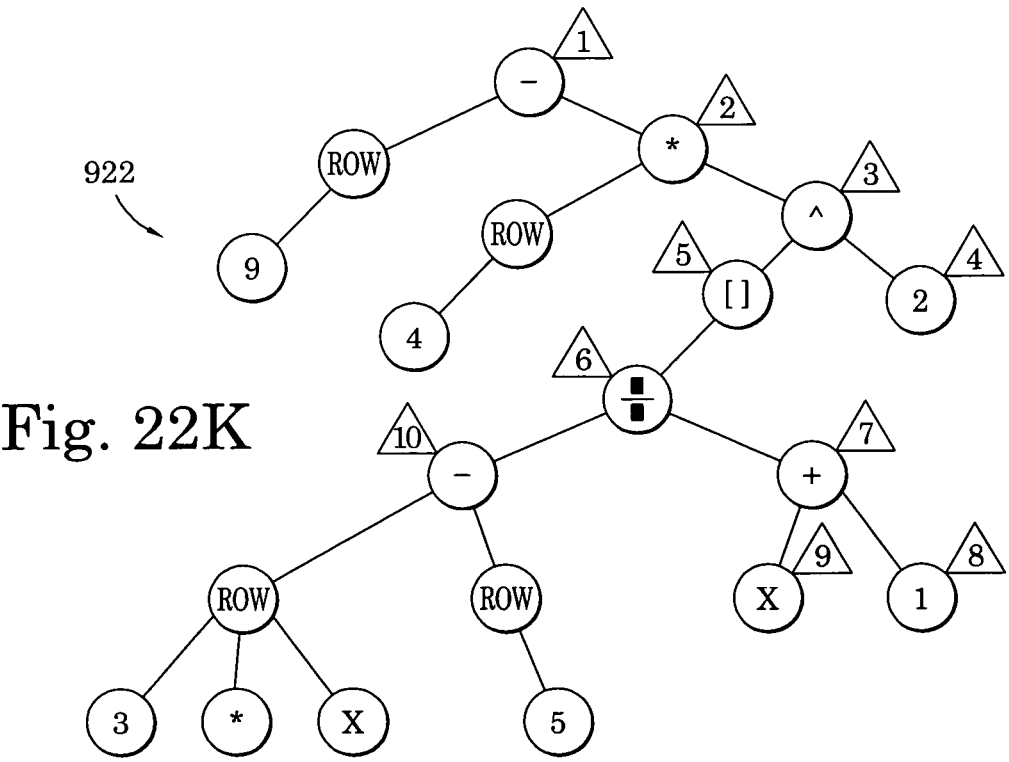
Figure 22L:
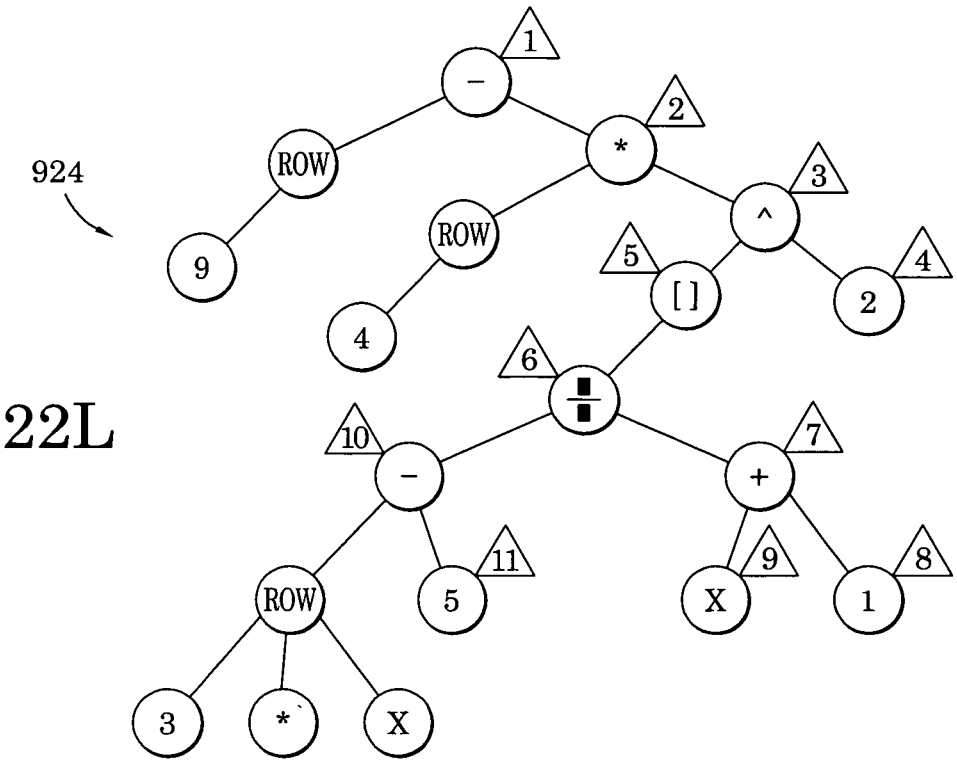
Figure 22M:
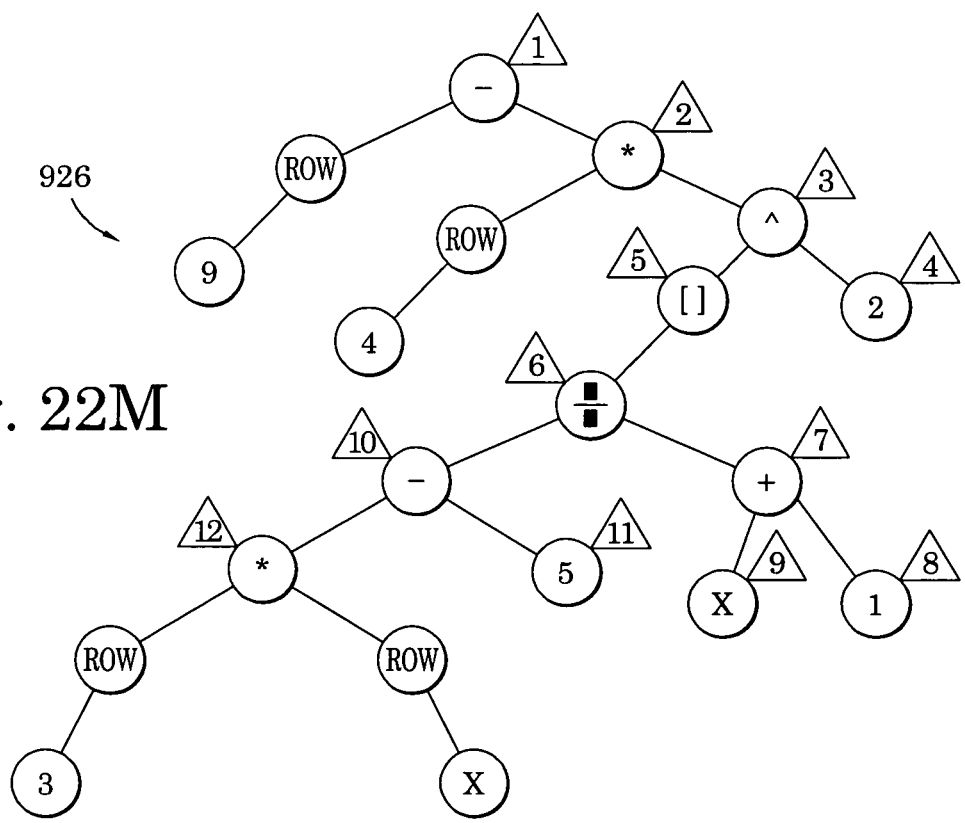
Figure 22N:
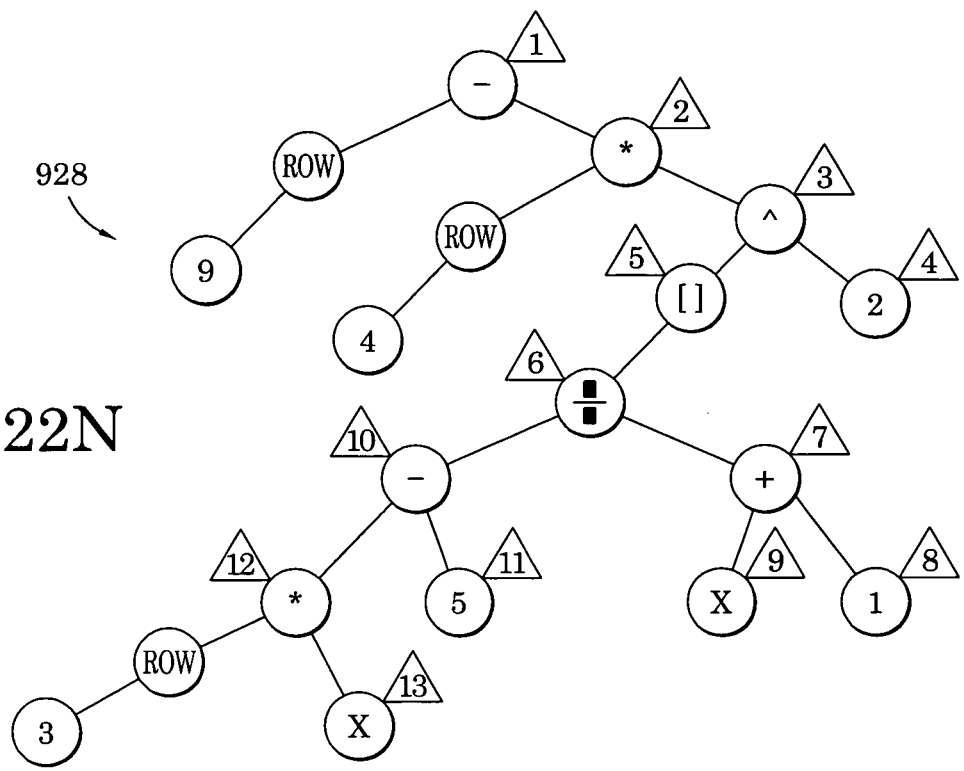
Figure 22P:
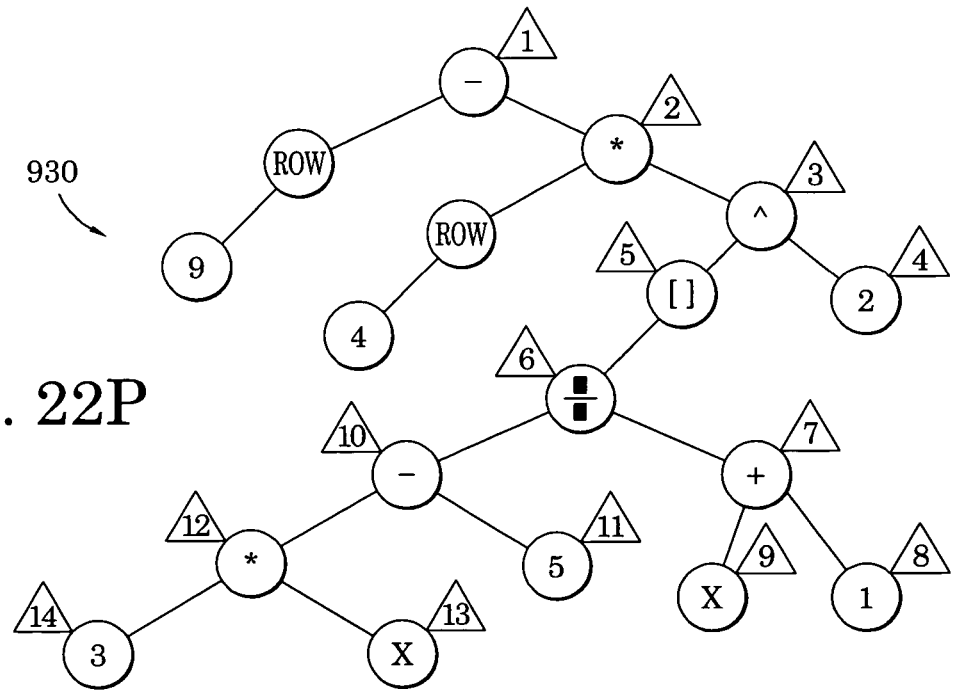

An example of the transformation of the object-field tree of FIGS. 5 and 6 (representing EQN. 1) into a content tree will now be provided with respect to the schematics depicted in FIGS. 22A through 22S. (Note that there is no FIG. 22O (letter "O") or FIG. 22Q in order to avoid confusion with the number "220".) At FIG. 22A the object-field tree 200 of FIG. 4 has been modified to the diagram 902 by replacing the field nodes in FIG. 6 with row nodes (e.g., bracket field node 222 is replaced with row node 903). The row nodes retain the ordering of the field nodes as given by the infix entry process. Also in FIG. 22A, the root object 903.5 is indicated as node 0 (zero), indicated by the number in the triangle to the upper right of the root object node. (For simplicity, the root object node 903.5 is not depicted in the remaining FIGS. 22B-22S, but it is understood that a root object node applies to these figures as well.) Also in FIG. 22A implicit multiplication operators have been added. In FIG. 22B the diagram 904 has been modified (from that of FIG. 22A) to add the subtraction operator node 905 and thus create two rows 905.5 by splitting the row 902.5 of FIG. 22A at the subtraction object that becomes the subtraction operator node 905. All the objects contained in the two new rows taken together retain the same horizontal ordering relative to each other as in the row 902.5 of FIG. 22A. The subtraction operator 905 is also numbered as node 1 of the content tree being created. In FIG. 22C the diagram 906 shows that the implicit multiplication operator 904.5 of FIG. 22B (added earlier as an implicit multiplication object) is made into an operator node 907, and is labeled as node number 2 of the content tree. In FIG. 22D the diagram 908 shows that the non-primitive exponent object 907.5 of FIG. 22C is converted into the exponent operator node 909, and is designed as node number 3. In FIG. 22E the diagram 910 shows that the row 909.5 of FIG. 22D and the exponent value object 909.7 of FIG. 22D have been removed and replaced with the exponent value node 911 which is designated as node number 4. In FIG. 22F the diagram 912 shows that row 911.5 of FIG. 22E has been removed, and the square-bracket object 911.7 of FIG. 22E converted into the square-bracket operator 913 (numbered as node 5) of FIG. 22F. In FIG. 22G the diagram 914 shows that row 913.5 of FIG. 22F has been removed, and the fraction object 913.7 of FIG. 22F converted into the fraction operator 915 (numbered as node 6) of FIG. 22G. In FIG. 22H the diagram 916 depicts how the addition object 915.5 in the denominator row (second row) of the fraction operator (FIG. 22H) has been converted into an addition operator 917, now numbered as node 7. In FIG. 22I the diagram 918 depicts how the number object "1" and the row node from which it depends are replaced by a numerical value node (with numerical value 1), which is designated as node 8. In FIG. 22J the diagram 920 depicts how the object "X" that was originally in the denominator row of the fraction operator (node 6) is replaced, together with the row node from which it depends, by a variable node that is designated as node 9. In FIG. 22K the diagram 922 depicts how the subtraction object formerly in the numerator row of the fraction operator (node 6) is converted into a subtraction operator node, designated as node 10. In FIG. 22L the diagram 924 depicts how the number object node "5" is converted into a numerical value node, and is designated as node 11. In FIG. 22M the diagram 926 depicts how the implicit multiplication object formerly in the numerator row of the fraction operator (node 6) is converted into an implicit multiplication operator node, designated as node 12. In FIG. 22N the diagram 928 depicts how the object "X"

formerly in the numerator row of the fraction operator (node 6) is converted into a variable, and is designated as node 13. In FIG. 22P the diagram 930 depicts how the number object "3" is converted into a numerical value node, and is designated as node 14. In FIG. 22R the diagram 932 depicts how the number object "4" is converted into a numerical value node, and is designated as node 15. Finally, in FIG. 22S the diagram 934 depicts how the number object "9" (in the first row of operations) is converted into a numerical value node, and is designated as node 16.

A comparison of FIG. 19R (the transformation result from an object-field diagram of EQN. 1) and FIG. 22S (the transformation result from an object-field tree of EQN. 1) show that the resulting content trees (632 and 934, respectively) are essentially equivalent in all relevant details. In particular, it can be seen that the order of operations (performed in reverse order of the operation node numbers) is the same for both diagrams 632 and 934.

In addition to providing for transformation of an object-field-tree-based data structure into a content-tree-based data structure, the program can also provide for the inverse transformation—i.e., to transform a content-tree-based data structure into an object-field-tree-based data structure. This can be accomplished by essentially reversing the process described above for transformation of an object-field-tree-based data structure into a content-tree-based data structure. That is, starting in the reverse order of operations, rows of objects in the content tree are collapsed into rows of objects which include their respective operator nodes.

Formatting of Mathematical Expressions

Each object has sizing coordinates: a vertical sizing coordinate that gives the extent of the object above a horizontal base line in its host field, another vertical sizing coordinate that gives the extent of the object below that horizontal base line, and a horizontal sizing coordinate that gives the width (horizontal extent) of the object. Fields have analogous sizing coordinates. All guest objects in a field are vertically aligned with respect to the base line of that field. There are different ways of calculating sizing coordinates using the data structure of this disclosure. Preferably, sizing coordinates of objects are calculated in reverse order to the infix entry process, with relative coordinates of objects with respect to their host fields and relative coordinates of non-root fields with respect to their host objects being calculated as part of the same process. For an exponent object that is a guest object of that field, its vertical sizing coordinate is first given a default value, and then recalculated taking into account on whether a previous object is correctly juxtaposed with it, and if so, the vertical sizing coordinate describing the vertical extent of the previous object above the horizontal base line of its host field. Once all the sizing coordinates and relative coordinates of the objects and fields are calculated, their absolute coordinates can be calculated in the same order as the infix entry process, which allows formatting of the mathematical expression.

Animation of Entry of Mathematical Expressions

In one embodiment a mathematics system in accordance with the current disclosure can include a set of computer-executable instructions to allow animation of entry of a mathematical expression on a display device (such as display 34 of FIG. 1). This feature can be enabled, for example, by a control on a graphical user interface (such as GUI 300 of FIG. 7), or by a keyboard command (such as "Control-Alt-A"). A mathematical expression stored in computer-readable memory (e.g., memory 24, FIG. 1) can be recalled by the user and displayed on the display device. The user can then invoke the command to animate entry of the mathematical expression to thereby allow the user to see (via the display) how the mathematical expression can be entered by the user. When the expression-entry animation command is invoked, the expression is created on the display device in order of the infix entry sequence. As each object is sequentially presented on the display, and the constituent fields of any non-primitive objects are populated with further objects, the program is configured to pause between the displaying of each new object to allow the user to comprehend the infix entry sequence. The animation feature can be provided with a pause command, a reverse command, and a speed-of-display control (including a single-step command) to give the user certain control over the display of the animation. During the animation the original mathematical expression can be optionally displayed on another portion of the display so that the user can see the overall expression and compare it to the expression as it is generated by the animation. Further, during the animation the program can be configured to highlight any controls on a graphical user interface which are used, or can be used, for entering objects as they are displayed on the display. The animation can additionally display a graphical keyboard on the display and can highlight the keys which can be used to enter objects as they are sequentially displayed during the animation. Special combination-key commands (e.g., "Control-F" to generate a fraction object) and/or special function keys (e.g., F4) which can be used for entering the mathematical expression can also be identified graphically by text or key icons at the appropriate time during the animation (i.e., as the key commend corresponds to what is being animated at that time on the display). The expression-entry animation feature can also be provided with an audio feature which describes the animation sequence, and which can include additional descriptive information for educational purposes. (An example of a verbal explanation is as follows. For entering a mathematical expression consisting of a single fraction in the form of 1/x, as the fraction object is displayed on the display the accompanying audio description is, "first select a fraction object from the palette; the fraction object can also be selected from the keyboard by using the Forward-Slash command". Once the fraction object, with its empty constituent fields, is displayed, the audio feature next informs the user: "now enter the data in the numerator field" (during which time the entry of the number "1" is animated). The audio feature then informs the user: "after entering the information in the numerator field, send the cursor to the denominator field" (during which the cursor movement using the pointing device or keyboard is animated) Then the audio feature informs the user: "enter the data in the denominator field" (during which time the entry of the variable "X" is animated).

The expression-entry animation feature provides at least two benefits. First, it can act as an educational tool to teach a user the proper sequence for entering any given mathematical expression according to a predetermined infix entry sequence. Second, the animation routine can demonstrate to the user how to use the user-interface for entering any given mathematical expression.

The expression-entry animation feature of a mathematics system can use the data structures described above (either the object-field data structure or the object-tree data structure) in order to provide the proper sequence of the animation. Specifically, the object sequence (e.g., indicated by the indices "OI" in FIGS. 3 and 4, or in the square boxes in FIG. 6) follows the infix entry sequence (as described above), and thus indicates the order in which objects are to be presented on the display during the animation sequence.

Animation of a Solution of a Mathematical Expression

In another embodiment a mathematics system in accordance with the current disclosure can include a set of computer-executable instructions to allow animation of a solution of a mathematical expression on a display device (such as display 34 of FIG. 1). This feature can be enabled, for example, by a control on a graphical user interface (such as GUI 300 of FIG. 7), or by a keyboard command. The expression-solution animation feature can include the same kinds of controls described above for the expression-entry animation feature. The expression-solution animation feature of a mathematical system can use the data structures described above (either the object-field data structure or the object-tree data structure) in order to provide the proper sequence of the animation as well as the operations necessary for solving the expression. Optionally, those data structures can be used in conjunction with a content-tree-based data structure. Animation of solutions can follow the infix entry sequence, although other animation sequences are possible. In one variation the processor can transform the mathematical expression back and forth from the display version to the solution version as the animation progresses sequentially.

Calculator

In yet another embodiment a mathematics system in accordance with the present disclosure can be provided with a numeric calculator function in memory registers. This feature allows for automatic calculation combined with storage using the same user actions as for storage in the numeric registers. As indicate above, a user interface (e.g., interface 300 of FIG. 7) can be provided with a series of memory registers 314, which can be allocated in different manners. In one example each mathematical expression can be associated with a unique set of memory registers. Further, the memory registers can include expression registers and calculator registers. Expression memory registers can be used to store field segments that are not necessarily capable of calculation, or which the user wishes to maintain in a non-calculated form for later use. Calculator memory registers can be used to store numerical values, and can also calculate numerical expressions that are capable of being calculated. For example, if the field segment "3+5" is entered into a calculator memory register, it is stored as the numerical value 8, whereas if that field segment is entered into an expression memory register it is stored in its original form, namely "3+5". Calculator memory register contents can be represented in the display area as calculator memory variables such as N1, N2, N3, etc. where they can be used to create mathematical expressions capable of further calculation. For example, the expression "5+N1", when entered into a calculator memory register calculates the numeric value of the sum of 5 and the contents of calculator memory register N1. The numeric contents of automatically calculated numeric fields associated with objects such as table of values objects (discussed below) can also be entered by the user into the calculator memory registers and thus become available for use in further calculations. In other words, the full contents of other numeric fields, not just calculator memory registers, can be accessed by the user for further calculation, without the user having to manually enter truncated versions of their decimal representations. In one variation individual calculator registers can be associated with a particular field in the mathematical expression. The calculator register associated with a field can be designated as static (i.e., the stored value does not change as other values in the mathematical expression change) or dynamic (i.e., the stored value changes as other values in the mathematical expression change) in order to keep the mathematical expression balanced). The user interface can allow the user to assign user-selected names to memory registers to facilitate user recollection of the registers' contents. In addition to expression registers and calculator registers, the calculator memory can also include text registers so that a user can save notes or the like explaining the contents of an associated expression register or calculator register.

In another variation a first calculator register can be associated with a second calculator register by a conversion function. For example, a first calculator register can be used to store values of temperature in degrees Fahrenheit, and a second calculator register can be programmed to convert the value stored in the first register into degrees Centigrade. Thus, as the value in the first register changes, the value in the second register will also change to reflect the correct value after the conversion. Standard conversion functions can be provided by icons on a graphical user interface.

In a further variation, a user can designate the coordinate system to be used for storing values in the calculator registers. For example, a user can select whether values in a particular bank of calculator registers are to be calculated and stored in either degrees or radians. Further, changing the mode setting does not inherently cause any previously stored values to be recalculated in the new system.

In yet another variation a calculator register can be configured to convert a stored numerical (decimal) value into a fraction form (if the value is capable of conversion to a fraction), and the fraction form can be stored in an associated expression register. This functionality can be made available to the user by an icon on a graphical user interface.

Editable Numeric Fields:

In another embodiment a mathematics system in accordance with the present disclosure can include editable numeric fields. A numeric field can have an associated entry window into which symbolic expressions can be entered. (An example of a numeric field and an associated entry window is described below with respect to the Table of Values object of FIG. 24.) The symbolic expressions in these windows can be edited. When a symbolic expression which is entered into the window becomes capable of being calculated, the window can close and the calculated value can be placed in the numeric field. Further, if the symbolic expression which is entered into the window contains no variable for the numeric (calculator memory) registers, then when the entry window is re-opened the window will display the entered expression (for example the Greek symbol for "pi", which can be displayed in the numeric field as the decimal approximation "3.14"). This displays the mathematical significance of the decimal displayed in the numeric field. Otherwise an empty window is displayed, and if a new calculable expression is entered into the window, its value replaces the previous value in the field. The benefit of this feature of the editable numeric fields is that if numeric (calculator memory) register contents are changed, other numeric fields that were calculated using numeric (calculator memory) registers are not changed inadvertently by the user.

Virtual Lined Paper

In one embodiment a mathematics system of the present disclosure can display mathematical expressions on a display device (such as a computer screen) in a format resembling lined paper. This format can be more conducive to certain users in order to facilitate understanding the fundamentals of algebra. For example, the expression editor of U.S. Pat. No. 6,610,106 (Jenks) is described as being based on presenting mathematical objects in two-dimensional structures "common in mathematics". A common example used in U.S. Pat. No. '106 is the expression $$\sin\frac{2\cos xy}{z^3}.$$

This format, while "common in mathematics", is not inherently conducive to conveying fundamentals. For example, the mathematical expression $$9 - 4\left(\frac{3x-5}{x+1}\right)^2$$

is essentially a simplified method for presenting the formula $$\frac{9}{1} - \frac{4}{1}\left(\frac{3x-5}{x+1}\right)^2.$$

As can be seen, the former version of the expression does not tend to convey the full mathematical significance of the characters outside of the parentheses, or suggest steps for manipulating the expression or performing subsequent calculations, whereas the latter version does. In order to implement a virtual lined paper format it is useful to place some restrictions on the types of expressions that can be entered by the user. For example, one restriction that can be imposed is that radical objects cannot be nested within each other. Another example of a restriction that can be imposed is that fractions cannot be nested inside exponents. Nesting counts can be used to implement such restrictions.

The equation mathematics system described herein allows the foregoing expression to be presented on a display device in the format:

$$9 - 4\left(\frac{3x-5}{x+1}\right)^2.$$

(This is EQN. 1 from above.) As can be seen, in this format the non-fraction characters (objects) outside of parentheses are aligned with the characters (objects) in the numerator field of the fraction object. This format puts the expression into a more linear two dimensional form which can facilitate a better understanding of the mathematical structure of the program. This format also facilitates visualization of steps in a solution (e.g., cross-cancellation between a whole number and the denominator of a fraction, where the whole number and the fraction are being multiplied together; also the addition of a whole number and a fraction).

Figure 23A:
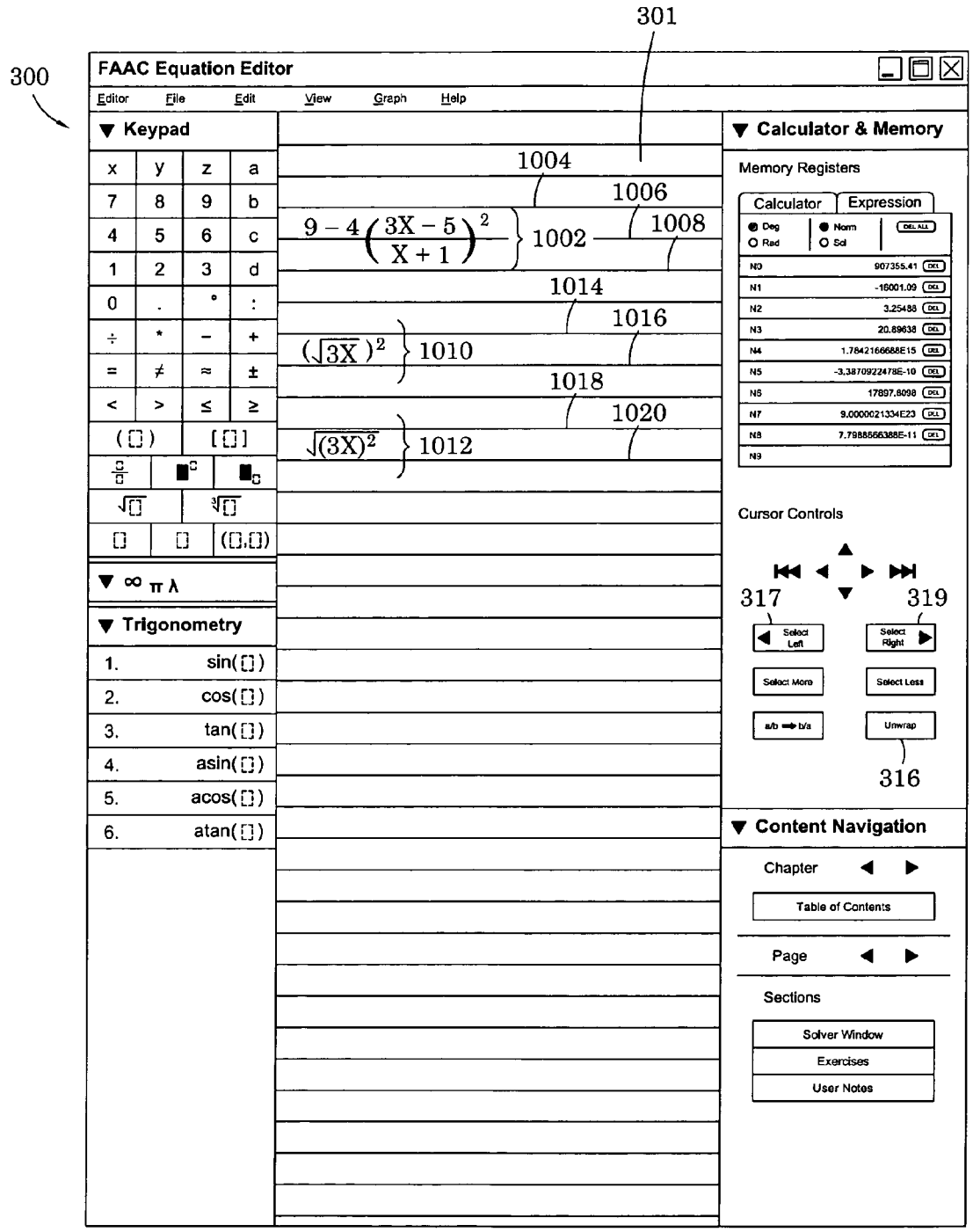
FIG. 23A is a diagram simulating a screen shot of a user display showing examples of how elements of mathematical expressions can be vertically aligned to simulate lined paper.

In addition to arranging the elements of the mathematical expression in the manner described above, the virtual-lined-paper system can include a screen display which includes lines to simulate lined paper. A display program can then be configured to display a mathematical expression on the lined screen display such that objects within the expression, and elements within objects, are aligned with respect to the lines depicted on the screen. Three examples of mathematical expressions using the virtual lined paper feature are depicted in FIG. 23A, which is a diagram depicting a screen-shot of a display which can be generated using the user interface 300 of FIG. 7 and the mathematics system of the present disclosure. As can be seen, the display area 301 of the user interface 300 includes graphical lines 1004, 1006, 1008, etc. In a first example, mathematical expression 1002 (which is EQN. 1 from above) is depicted as being displayed between graphical lines 1004 and 1008, with the fraction line (not numbered) being displayed on line 1006. In this example the contents (i.e., "3X–5") of the numerator field of the fraction object are displayed above the fraction line, between lines 1004 and 1006, while the contents (i.e., "x+1") of the denominator field of the fraction object are displayed below the fraction line, between lines 1006 and 1008. Further, the exponent object is displayed in super-script format in the upper portion of the space between lines 1004 and 1006. Significantly in this example, the sub-expression "9–4" is aligned with the contents of the numerator field, between lines 1004 and 1006. It will also be noted that the brackets for the round-bracket object are contained between lines 1004 and 1008, and do not extend beyond those lines.

A second and third example of the use of virtual lined paper in FIG. 23A are given by the two mathematical expressions 1010 (i.e., $(\sqrt{3x})^2$, bounded by lines 1014 and 1016)) and 1012 (i.e., $\sqrt{(3x)^2}$, bounded by lines 1018 and 1020)). Careful review of these two expressions (1010, 1012) shows that the height of the round brackets is the same in both expressions, the relative vertical position (between the graphical lines) of the exponent value is same in both expressions, as is the vertical position of the radicand ("$\sqrt{\phantom{x}}$"). In fact, the only essential difference between expressions 1010 and 1012 is the reversal of nesting order, resulting in a difference in horizontal length of the top bar on the radicand. As can be seen by this example, this simplified method of vertically aligning components of a mathematical expression with respect to virtual lined paper avoids any vertical formatting changes when reversing nesting order (in this example, the order in which the round bracket object and the radical object are nested). Multiple levels of nested brackets can have the same vertical format, unlike with some systems where the vertical extent of nested brackets automatically increases going outward through the nesting hierarchy. This allows the nested brackets to fit more easily between lines of virtual lined paper. In general, simplified vertical formatting facilitates use of virtual lined paper.

Figure 23B:
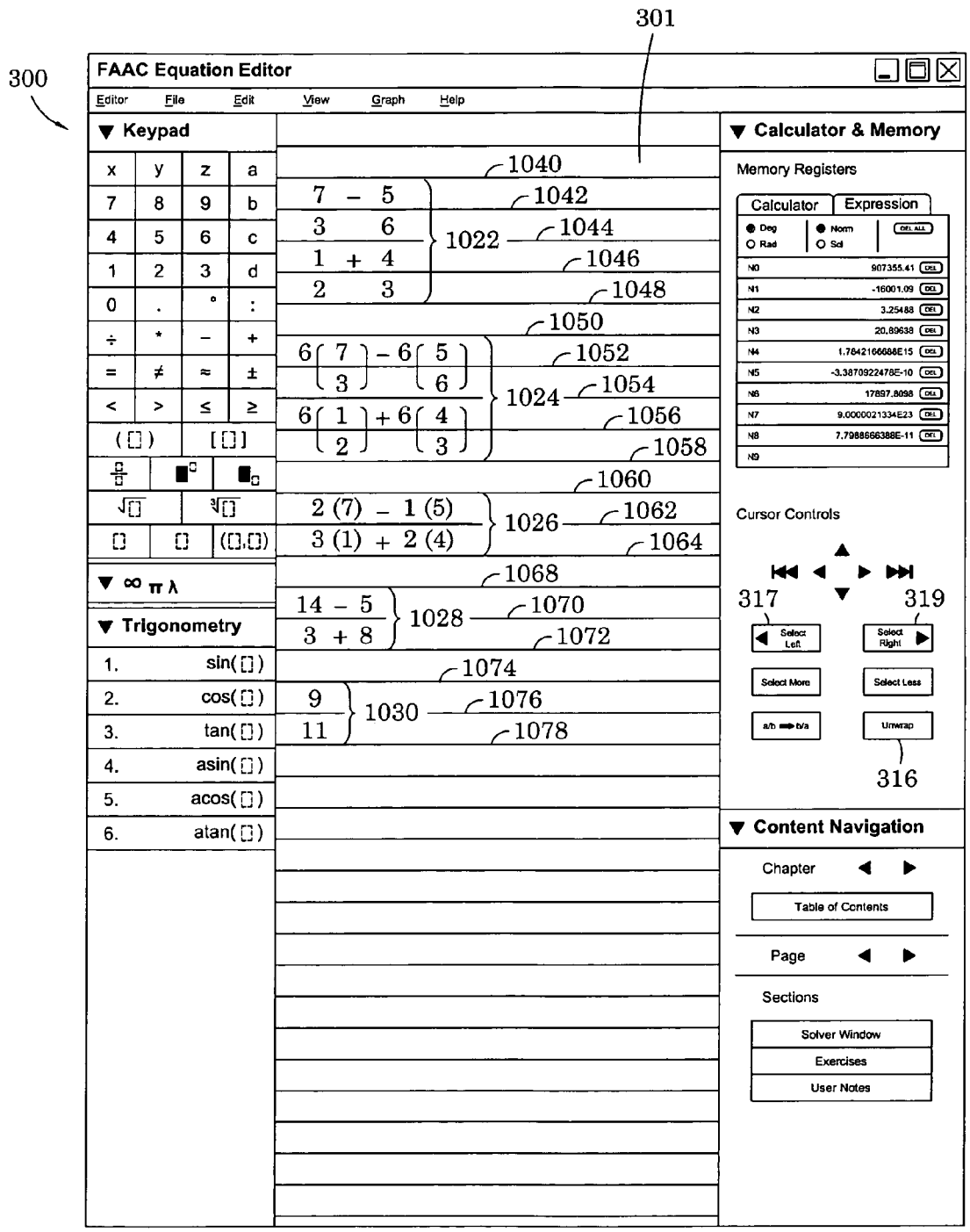
FIG. 23B is another diagram simulating a screen shot of a user display showing additional examples of how elements of mathematical expressions can be vertically aligned to simulate lined paper.

Yet another example of the use of virtual lined paper is provided in FIG. 23B, which is a diagram depicting a screen-shot of a display which can be generated using the user interface 300 of FIG. 7 and the mathematics system of the present disclosure. As can be seen, the display area 301 of the user interface 300 includes graphical lines 1040 through 1078 (even numbers only), and mathematical expressions 1022, 1024, 1026, 1028 and 1030. The series of mathematical expressions in FIG. 23B represent an exercise in simplifying the complex fraction of expression 1022 into the simple fraction of expression 1030. The example demonstrates how the use of virtual lined paper in the graphical display area 301 can facilitate understanding of the method for solving a mathematics problem such as that depicted in FIG. 23A. Specifically, as seen in expression 1022, all fraction lines are placed on lines in the display, and all numbers and operators (except for the fraction division operators) are constrained between adjacent lines (i.e., no number lies on a line). Further, each space between lines is limited to displaying only a single (full-sized as opposed to exponent-sized or subscript-sized) number in the vertical direction. In the solution step indicated by expression 1024 (i.e., multiplying each of the simple fractions by the common denominator of "6"), the number "6" is vertically aligned adjacent to the numerator of each simple fraction. This orientation of the common denominator coefficient facilitates moving the solution to the next step as shown by expression 1026. The resulting linear solution depicted by expressions 1028 and 1030 is further facilitated by the horizontal alignment of numerator objects and denominator objects.

As can be seen from the above examples, using the virtual lined paper non-primitive objects having two or more vertically stacked constituent fields can be displayed with each of those fields occupying a separate space between virtual lines with no primitive objects being displayed over a virtual line.

Table of Values and Graph Objects

A mathematics system in accordance with the present disclosure can include a "table of values" object and/or a graph object. Each of these objects will be described in turn.

Figure 24:
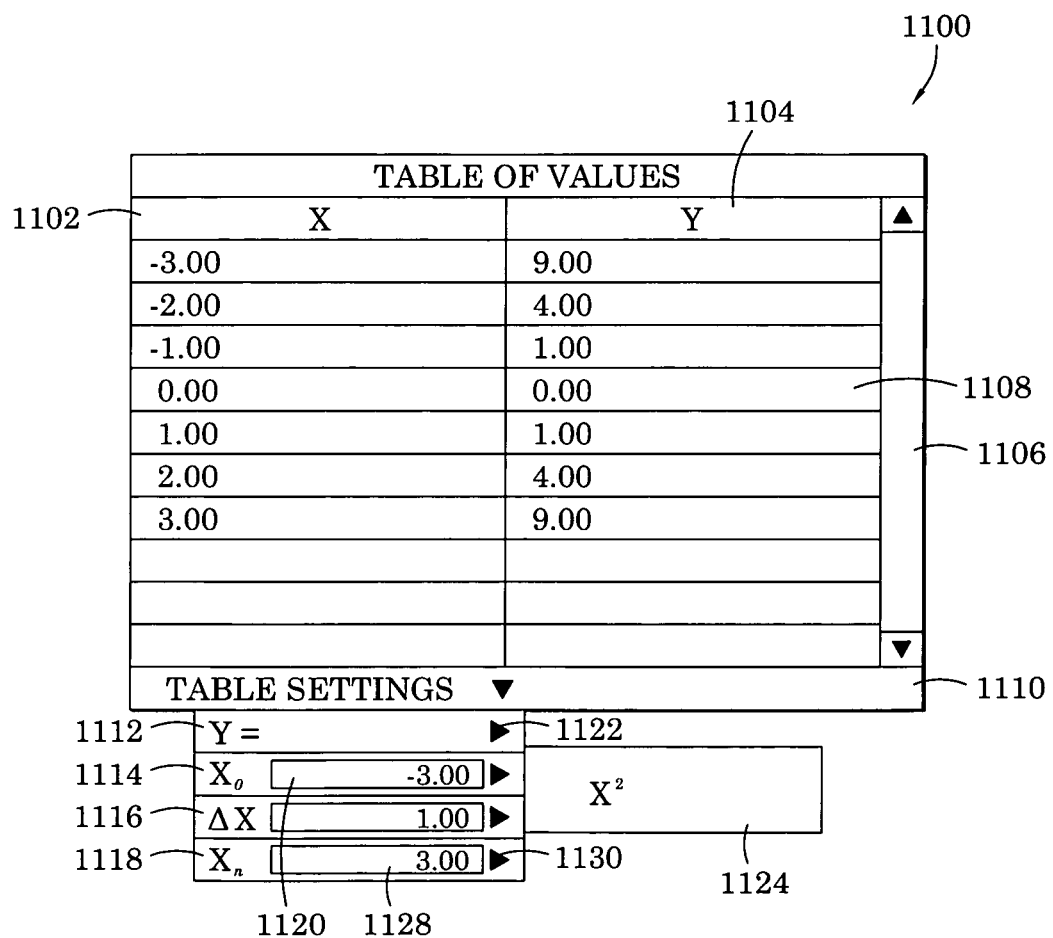
FIG. 24 is a diagram depicting a table-of-values object that can be used with a mathematics system as provided for herein.

An exemplary table of values object 1100 is depicted in FIG. 24. In general, the table of values object calculates values for a variable in a mathematical equation given a value for another variable. For example, where an equation provides a variable "Y" as a function of another variable "X" (i.e., Y=f(X)), then for a list of values of the variable "X", values of "Y" are calculated. Accordingly, the table of values object 1100 includes a first column 1102 for values of a first variable (here, "X"), and a second column 1104 for values of a second variable (here, "Y"). The values of "X" and "Y" are shown in a display area 1108. The table of values object 1100 can include an infinite scroll feature 1106, such that as a user continues to scroll down, values of the variables are generated. In order to conserve computer memory, non-displayed values can be overwritten by displayed values, and recalculated when the user scrolls back to the portion of the table where the deleted values were initially displayed. The table of values object 1100 can also include a drop-down menu 1110 for table settings. The table settings 1110 can include a function control 1112 to allow a user to enter the function relating the variables. By accessing an icon 1122 in the function control 1112, an entry window 1124 is opened. The user can then enter the mathematical expression using an equation entry program as described above. The table settings 1110 can also include an initial value ("$X_0$") control 1114 to allow a user to enter the initial value of the variable "X". The initial value can either be entered into the numeric field (e.g., "−3.00" can be entered), or if the left-arrow icon is accessed, an entry window (not shown) allows a user to enter the initial value as an expression (e.g., $X_0=\pi/2$). If a calculable expression is entered into the expression window, then the calculated value can be shown in the numeric field 1120. The table setting controls 1110 also include an increment ("$\Delta X$") control 1116 to allow a user to enter the increment between values of "X" to be used when generating the table. The increment control 1116 can include a numeric field and an entry window (not shown) similar to the initial value control 1114. The table setting controls 1110 can also include an end value ("$X_n$") control 1118 to allow a user to enter an end value of "X" for the table. (If no end value control is provided, or no information is entered into the end value control, the table will continue to generate values so long as a user continues to scroll down using the infinite scroll control 1106.) The end value control 1118 can include a numeric field entry area 1128, and a left-arrow icon 1130 can open an entry window (not shown) to allow a user to enter a mathematical expression for the end value. The numeric fields for user input with the table of values object can be editable numeric fields as described above.

Figure 25:
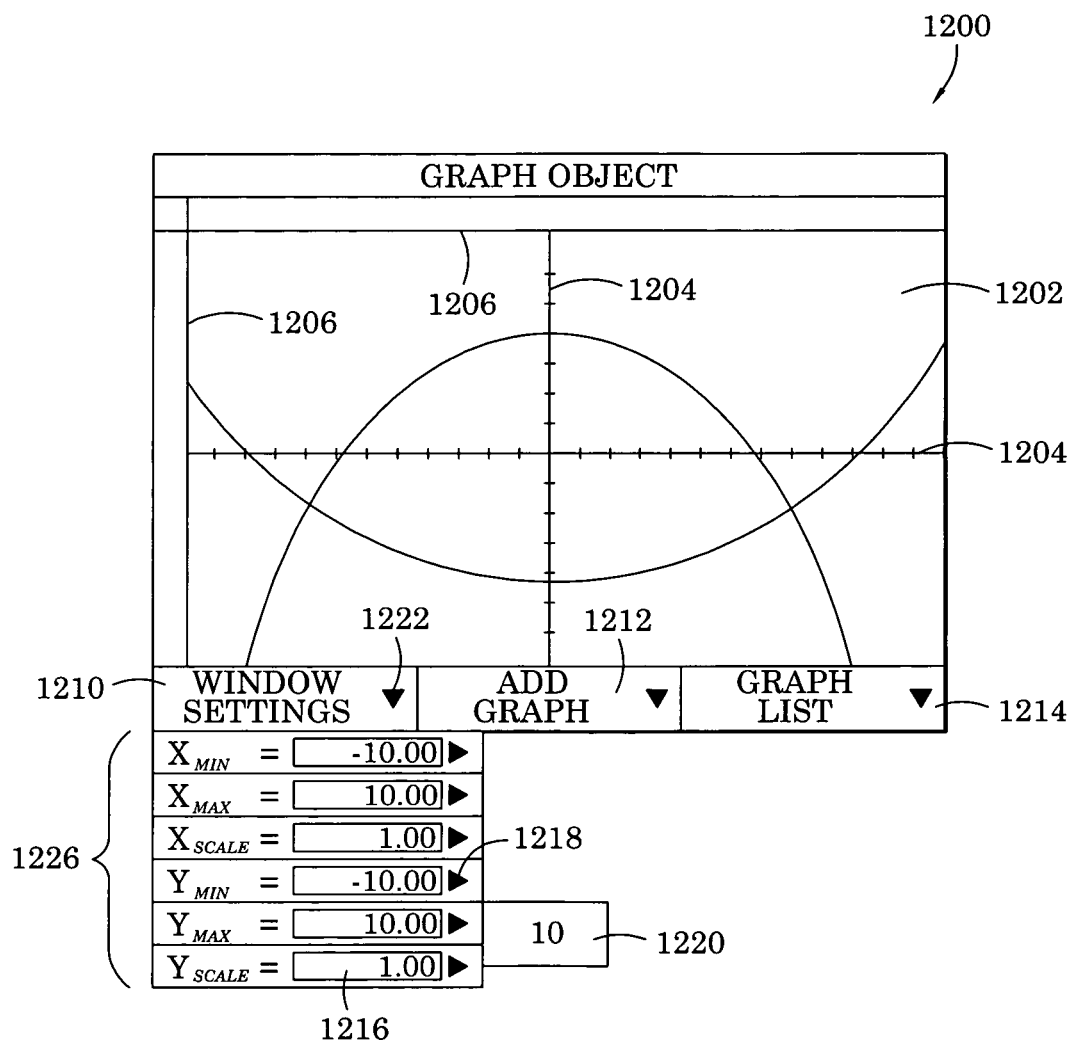
FIG. 25 is a diagram depicting a graph object that can be used with a mathematics system as provided for herein.
Figure 26:
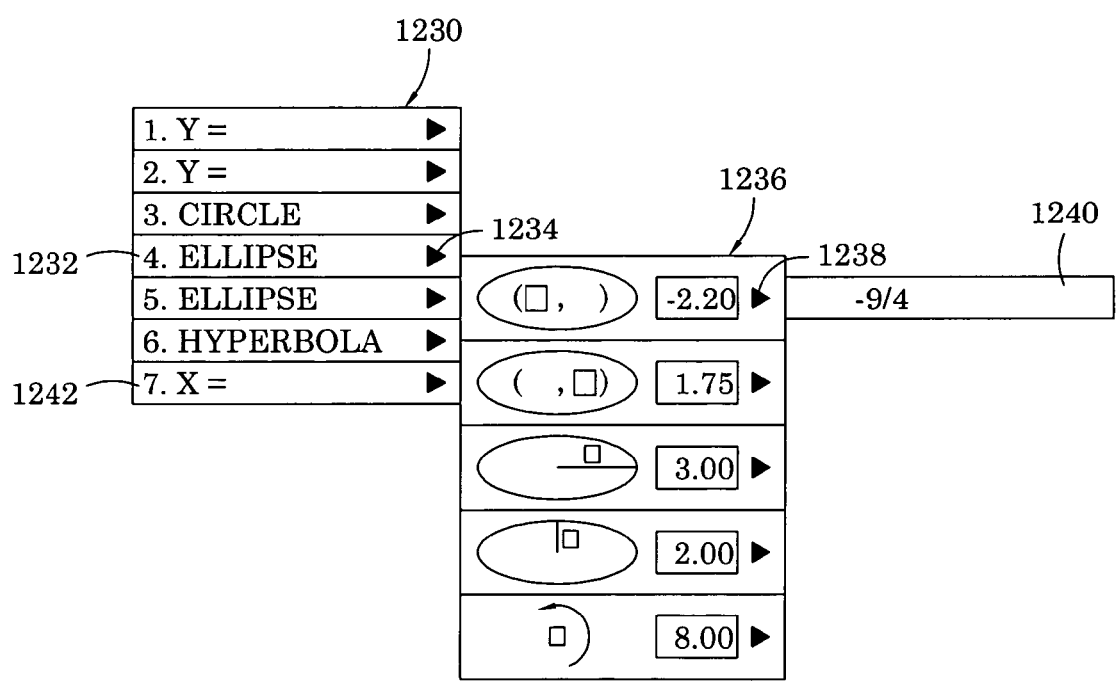
FIG. 26 is a diagram depicting a graph-list menu selection that can be used with the graph object of FIG. 25.

An exemplary graph object 1200 is depicted in FIG. 25. In general, the graph object displays graphs for mathematical expressions provided by a user. The graph object 1200 includes a display area 1202 for the graph (or graphs). The display area can include a grid (depicted here as a Cartesian grid 1204). In one variation a user can select the type of grid to be used—e.g., a polar coordinate grid can be used as an alternative to the Cartesian grid. The graph object 1200 can include graph controls including a window settings control 1210, an add-graph control 1212, and a graph list control 1214. The windows setting control 1210 can include an icon 1222 to allow a user to access a menu 1226 of specific functions under the windows setting control. Specific settings which can be controlled by a user under the windows setting control include $X_{MIN}$, $X_{MAX}$, $X_{SCALE}$, $Y_{MIN}$, $Y_{MAX}$ and $Y_{SCALE}$ controls which control the span of the grid scales 1206. Each of these window controls can include a numeric field (e.g., numeric field 1216 associated with the $Y_{MAX}$ control) to allow a user to enter a specific numeric value, as well as an entry window (e.g., entry window 1220 associated with the $Y_{MAX}$ control) which can be accessed from an icon 1218 in the control. The entry window 1220 allows a user to enter a mathematical expression for the control value using an expression entry program as described above. If an expression entered into the expression window 1220 is capable of being calculated, then the calculated value can be shown in the numeric field 1216. The add-graph control 1212 can open a menu of graph types which can be displayed in the display area 1202. Exemplary types of graphs include a straight line, a circle, an ellipse, a parabola, a hyperbola, a point, a vector, and trigonometric functions (e.g., sine, cosine, tangent, etc.). Two or more graphs can be displayed in the display window at the same time. The graph object 1200 can also include a graph list control 1214 which can enable a user to control the variables of the one of more graphs that are currently displayed in the display area 1202. FIG. 26 depicts an exemplary drop-down display 1230 when the "Graph List" control 1214 is engaged. In this example, the various exemplary graphs include functions ("Y=" and an inverse relation "X="), a circle, two ellipses, and a hyperbola. Each graph on the graph list 1230 can be provided with a graph-variable control 1234 which opens a drop-down menu 1236 of the variables associated with the particular associated graph from the graph list 1230. In this example, the graph-variable menu 1236 is associated with the ellipse graph. As such, the graph control sub-menu 1236 includes controls to specify the Cartesian coordinates for the center of the ellipse (as graphed on the grid lines 1204 of FIG. 25), the maximum and minimum radii of the ellipse, and a control to rotate the ellipse. Each variable selection in the graph-variable control menu 1236 can include an entry window for a numeric field (not numbered), as shown in the example where the values of −2.25 and 1.75 have been entered as the respective X and Y coordinates for the center of the ellipse. Further, each variable selection in the graph-variable control menu 1236 can be provided with an icon to allow a user to open an expression entry window 1240. In the example shown, a user has opened an expression window for the X-axis coordinate for the center of the ellipse, and the fraction value of −9/4 has been entered.

Long Division Object

Figure 33:
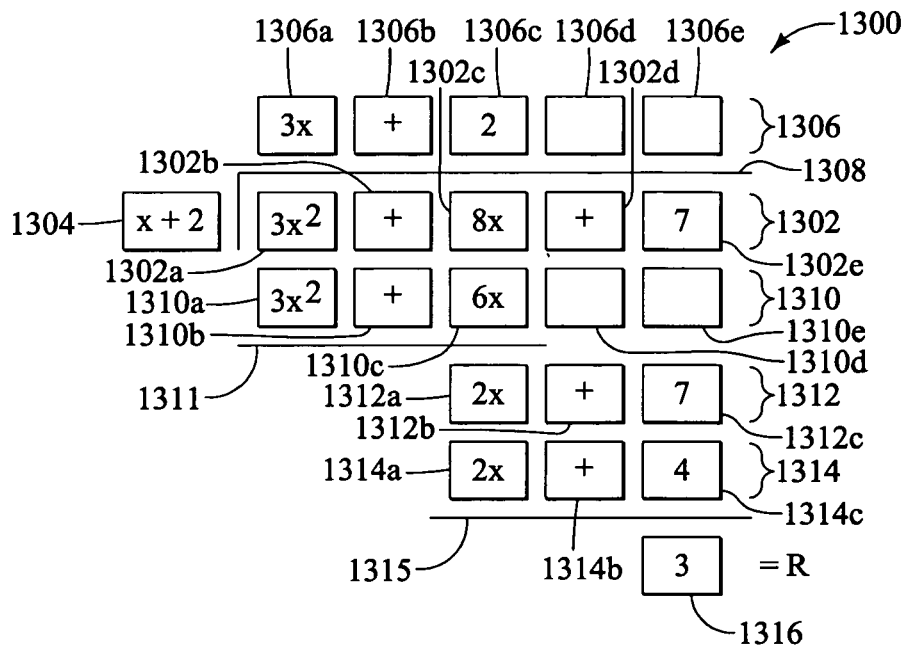
FIG. 33 is a diagram depicting a long division object that can be used with a mathematics system as provided for herein.

A mathematics system in accordance with the present disclosure can include a long division object implemented in a similar fashion to a matrix, having fields arranged in rows and columns. The fields can be contained in boxes that show their locations (in the description that follows, the words "fields" and "boxes" are often used interchangeably). An exemplary long division object 1300 is depicted in FIG. 33. In the example depicted in FIG. 33 the long division object is intended for long division of polynomials. The polynomial long division object 1300 can be generated (for example) by a user selecting a "Generate Polynomial Long Division Object" option from a graphical user interface. Upon making this selection, the user can be presented with a dialog box requesting the user to enter the number of terms of the dividend polynomial. For example, the polynomial "$3x^2 + 8x + 7$" has three terms, as follows: $3x^2$; $8x$; and 7. After the user enters the number of terms of the dividend polynomial into the dialog box and presses "enter" (or an equivalent function to have the entered value accepted), the polynomial long division object 1300 is generated on the user's display device (such as a computer screen). The polynomial long division object 1300 is essentially a matrix having: (i) a quotient row (e.g., 1306); a dividend row (e.g., row 1302); at least one product row (e.g., row 1310); and at least one remainder row (e.g., row 1312). The polynomial long division object further includes a long division symbol 1308, having a horizontal stroke separating the quotient row and the dividend row, and a vertical stroke to the left of the dividend row. A divisor field 1304 is also generated to the left of the vertical stroke of the long division symbol 1308, and in alignment with the dividend row. Further, a long division subtraction symbol is generated between the product row (e.g., row 1310) and the remainder row (e.g., row 1312).

More specifically, for a dividend polynomial having "n" terms, the polynomial long division object is generated having a dividend row having "$2n-1$" field boxes (i.e., "n" boxes for the "n" terms of the polynomial dividend, plus "$n-1$" boxes for the addition or subtraction operators between the terms of the polynomial dividend). In the example depicted in FIG. 33, the dividend row 1302 has five boxes, as follows: (i) dividend polynomial term boxes 1302a, 1302c and 1302 (one for each of the three terms of the polynomial dividend); and (ii) two addition/subtraction boxes 1302b and 1302d (one for each of the addition/subtraction operators between the three terms of the polynomial dividend). For a dividend polynomial having "n" terms the quotient row is also generated having "$2n-1$" boxes, and the boxes for the quotient row are placed in alignment above the $2n-1$ boxes of the dividend row. Thus, for even the simplest polynomial (consisting of two terms) four rows of boxes will be generated (i.e., 2n rows) consisting of (in top-down order): (i) a quotient row; (ii) a divisor/dividend row (which is separated from the quotient row by a long division symbol, and wherein the divisor and dividend are separated by a horizontal stroke); (iii) a first product row (to show the product of the first value entered into the quotient row as multiplied by the divisor); and (iv) a first remainder row (to show any remainder of the first product row when subtracted from the dividend. (The first product row is separated from the first remainder row by a horizontal subtraction line symbol.) In the example depicted in FIG. 33, the quotient row has five boxes 1306a-1306e (inclusive), corresponding to the five boxes (1302a-1302e, inclusive) of the dividend row 1302. For a dividend polynomial having "n" terms "$n-1$" product rows and "n" remainder rows are also generated. The product and remainder rows are placed beneath the quotient row in alternating format, beginning with a first product row, followed by a first remainder row, then a second product row, and so on, terminating at an "$n^{th}$" remainder row. The number of boxes for each product row are generated as follows: (i) for the first product row, $2n-1$ boxes; for the second product row, $2n-3$; and so on until for the "$n^{th}$" product row there is only one box. The number of boxes for each quotient row are generated as follows: (i) for the first quotient row, $2n-3$ boxes; for the second product row, $2n-5$ boxes; and so on until for the "$n^{th}$" quotient row there is only one box. The boxes for the product rows and the remainder rows are automatically placed in alignment below the $2n-1$ boxes of the dividend row, and are right-justified with the last box of the dividend row (although the contents of each column can be automatically center-justified to achieve alignment). In the example depicted in FIG. 33, for the three term polynomial dividend (i.e., n=3), the first product row 1310 has five boxes (i.e., $2n-1=5$ for this example) 1310a-1310e (inclusive), corresponding to the five boxes (1302a-1302e, inclusive) of the dividend row 1302. Also in FIG. 3, the first remainder row 1312 is depicted as only having three boxes, 1312a-1312c—that is, for the three-term polynomial dividend that is entered in to the dividend row, the first remainder row 1312 has $2n-3$ (i.e., $2\times3-3$), or three boxes. Likewise, the second product row 1314 is depicted as only having three boxes, 1314a-1314c (corresponding to $2n-3$ boxes), and the second remainder row (1316) is only depicted as having a single box (1316), corresponding to $2n-5$ boxes. The software governing generation of the polynomial long division object can also be configured to generate horizontal subtraction lines between each product row and the following remainder row (as for example first subtraction symbol line 1311 between first product row 1310 and first remainder row 1312, and second subtraction symbol line 1315 between second product row 1314 and second first remainder row 1316). The horizontal subtraction lines can automatically be reformatted to extend from the first non-empty box in the product row above to the last non-empty box in that row. The boxes can be removed when the cursor is no longer in a field nested in the object, or when a pointing device is not hovering over the object. The horizontal stroke of the long division symbol can automatically be reformatted to extend on the right to the last non-empty column when the cursor is no longer in a field nested within the object, or when a pointing device is not hovering over the object. When the object is empty, the boxes can be shown and the long division symbol and the horizontal subtraction lines can have default formatting. In another variation the divisor can be placed in more than one field in the same manner as the dividend. In yet another variation the arrangement of the fields (boxes), other than any boxes for the divisor, can be in the form of a rectangular matrix with each row having the same number of boxes (which thus allows both polynomial and arithmetic long division). In a further variation allowing both polynomial and arithmetic long division, the staggering of columns can be one column at a time instead of two, in other words the number of columns is reduced by one every second row down, starting with the third row down from the dividend row. Subtraction signs can be automatically generated. In the case of polynomial long division, brackets can be automatically generated around the product polynomials being subtracted. Items such as subtraction signs and brackets can be automatically generated once the cursor is no longer in a field nested in the long division object.

Software governing the polynomial long division object can be provided to restrict user input of objects into even numbered boxes (i.e., when numbering the boxes in any given row from left to right) to being either addition or subtraction symbol objects (with the sole exception being the last remainder row). That is, the software can restrict objects in fields between polynomial terms to being filled with only an addition or a subtraction object. The expressions in each of the boxes can be automatically center-justified to facilitate alignment of all contents within any given column.

In one variation the software governing the polynomial long division object can be configured to generate the maximum possible number of product rows and remainder rows which can possibly be generated for a polynomial of "n" terms. Thus, in the event that the value for the divisor entered into the divisor field 1304 is (in the simplest case) "1", then for a polynomial having "n" terms, there will be "n" product rows, and "n" remainder rows. However, in another variation, software governing the polynomial long division object can be provided with a divisor term-number-detection routine to detect the number of terms of a polynomial entered into the divisor field. (This feature can be useful since most polynomial long division consists of dividing one polynomial by another polynomial.) Further, the software governing the polynomial long division object can be additionally (or optionally) provided with a divisor term-kind-detection routine to detect the kind of terms of a polynomial entered into the divisor field. Both the divisor term-number-detection routine and the divisor term-kind-detection routine can be used to determine the number of product rows and remainder rows to be automatically generated for the polynomial long division object. However, when the polynomial long division object is being used in a tutorial environment, it is desirable to generate "n" product rows, and "n" remainder rows for a dividend polynomial of "n" terms. In yet another variation, software governing the polynomial long division object can be configured to proceed on the assumption that the number of terms in the divisor is less than or equal to the number of terms of the polynomial of the dividend, and if this case is not detected, a message can be generated to the user to modify one or both of the divisor and/or the dividend.

In general use, after a user generates the polynomial long division object, the user can thereafter perform the following operations (and in no particular order): (i) enter the dividend in to the dividend fields (e.g., fields 1302a-1302e, FIG. 33); and (ii) enter the divisor into the divisor field (e.g., field 1304, FIG. 33). Thereafter, the user can enter a first selected term for the quotient (i.e., a first quotient term) into the first field (i.e., the left-most box 1306a) of the quotient row (row 1306). At this point the user can manually perform the multiplication of the first quotient term (in box 1306a) by the expression in the divisor field (field 1304), and enter the results in the first product row (e.g., row 1310), with the results being left-justified. Thereafter, the user can manually subtract the results entered into the first product row (1310) from the values previously entered into the dividend row, and can enter the results of this subtraction operation into the first remainder row (i.e., first remainder row 1312), with the results being right-justified. The user can then enter a second selected term for the quotient (i.e., a second quotient term) into the third field (i.e., box 1306c) of the quotient row (row 1306), while also providing an appropriately selected addition or subtraction term to be added in the second quotient field (box) 1306b between the first and second quotient terms (1306a and 1306c). At this point the user can manually perform the multiplication of the second quotient term (in box 1306c) by the expression in the divisor field (field 1304), and enter the results in the second product row (row 1314). Results in the second product row 1314 are subtracted (by the user) from the results in the first remainder row 1312, and the difference is entered (by the user) the into second remainder row 1316.

In one variation, the multiplication of a value entered into a field of the quotient row (1306) by the divisor (1304) can be automatically generated and entered into the product row (e.g., product row 1310) under control of a program governing the operation of the polynomial long-division object. Further, subtraction of a product entered into a product row (e.g., product row 1310) from the dividend row (e.g., dividend row 1302), or subtraction of a later product (e.g., product in row 1314) from a prior remainder row, e.g., remainder row 1312) can be automatically generated and entered under control of a program governing the operation of the polynomial long-division object. Further, in an additional variation the user can select between manually calculating and entering values into product and/or remainder rows (based on values entered into fields of the quotient row by the user), and having the program automatically calculate and enter these values into the product and/or remainder rows.

In one variation, in order to account for the largest potential number of polynomial long division problems and solutions, a polynomial long division object generates (for a dividend polynomial of "n" terms") a matrix having 2n rows (one row of which is the quotient row), each row having 2n−1 boxes (not counting the divisor box), along with a divisor box to the left of the dividend row. As indicated above, the number of rows, and the number of boxes in each row, actually required for a complete solution of the problem by a user can vary, depending on the nature of the dividend polynomial and the divisor. Accordingly, when the variation indicated above (i.e., generating a default matrix of 2n+2 rows by 2n+1 boxes, and not including the divisor field box) is generated for the situation which will require the largest number of rows and boxes to aid the user in developing a solution to the problem, then in this situation some boxes (and rows of boxes) may end up being generated which will not used when the user is solving the problem (using the polynomial long division object). In one embodiment, boxes (indicating potential fields for data entry, either manual or automatic) are generated in a general matrix format for the polynomial long division object, and the boxes can be identified in an outline form on a user display device, as depicted in FIG. 33. An outline form around a box in the polynomial long division object (as presented on a user display device) can indicate a potential field to be filled. However, as indicated above, not all of the generated boxes for a polynomial long division object will be necessarily used when entering a solution to the problem (depending on a number of factors). Accordingly, the program governing control of the polynomial long-division object can be configured to remove the outline form around a box (as presented on a user display device) in the polynomial long-division object matrix (as presented on a user display device) once it has been determined that: (i) the user has entered a value (or values) into the box, and has subsequently exited immediate data-entry capability for that particular box; and/or (2) the program determines that no values can be entered into the box based on prior data entries (e.g., for product row 1310, once it has been determined that the product of "3x" (first term 1306a of quotient row 1306 as multiplied by divisor "x+2" in divisor field 1304) is "$3x^2$+ 6x" (as entered into boxes 1310a-1310c), it can then be determined that boxes 1310d and 1310e will remain empty, and the outlines around these boxes (1310d and 1310e) can be removed from presentation on the user display (since they no longer have any significance to the user, other than perhaps as potential place-holders). Further, this embodiment of graphical surrounds around a field (or non-primitive object) which can be later removed can be equally applied to other embodiments disclosed herein.

Expression Addition Object

Figure 34:
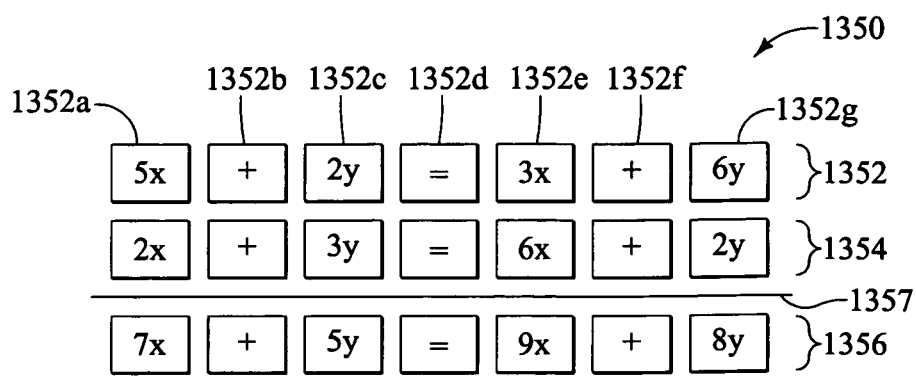
FIG. 34 is a diagram depicting an equation addition object that can be used with a mathematics system as provided for herein.

A mathematics system in accordance with the present disclosure can include an expression addition object implemented in a manner similar to a matrix, having fields arranged in rows and columns. The fields can be contained in boxes that show their locations. An exemplary expression addition object 1350 is depicted in FIG. 34. In the example depicted in FIG. 34 the expression addition object 1350 is intended for addition of polynomials or equations. The object 1350 can be generated (for example) by a user selecting a "Generate an Addition Object" option from a graphical user interface. (The user interface can also provide a "Generate a Subtraction Object" option. As will be appreciated, while the expression addition object can provide for the addition of two or more expressions, the expression subtraction object will generally be restricted to allowing the subtraction of one expression from another.) The following example (as depicted in FIG. 34) will describe an example of an expression addition object. Upon making the selection of "Generate an Addition Object", the user can be presented with a dialog box requesting the user to enter the number of expressions to be added together, and highest number of terms of any of the expressions to be added or of those appearing below the horizontal line. There can also be provision to specify the number of rows below the horizontal line (this feature can be useful for presenting aligned solutions of equations in one variable, with the final answer appearing in the bottom row). There can be an option to highlight selected rows (for example, to indicate the answer). There can be a general selection highlight option that can apply to fields or field segments; in that case highlighting the answer can involve separately highlighting several fields in the answer row. In any event, after the user enters this basic formatting information into the dialog box and presses "enter" (or an equivalent function to have the entered data accepted), the expression addition object 1350 is generated on the user's display device (such as a computer screen). The expression addition object 1350 is essentially a matrix of field boxes aligned in rows and columns. More specifically, if "m" is the number of expressions to be added together, and "n" is the highest number of boxes needed for any row, and p is the number of rows below the horizontal line (it being understood that "p" is at least one), then the matrix has (m+p) rows and (n) columns of boxes. The reason the number of rows of the expression addition object is (m+p) is so that a summation row and any further rows needing alignment can be generated below the row for the last expression to be added. The summation row is separated from the row for the last expression to be added by a horizontal summation line. The columns can be center-justified for alignment of operators as well as for alignment of terms in each column.

In one variation, the dialog box can merely request the user to enter the number of rows above and below the summation line and the number of columns, and the expression addition object is generated (with a horizontal summation line generated automatically). There can be a control to select between center-justifying and right-justifying the column. In this way, if the user selects right-justified columns and specifies one row beneath the horizontal summation line, the expression addition object can also be used for the addition or subtraction or multiplication of decimal or whole number values. Thus, the graphical user interface can allow a user the selection of either an algebraic addition object, or a simple arithmetic addition object (which can be used for ordinary arithmetic addition, subtraction, and multiplication involving integers or decimals). Another variation is for an arithmetic addition object where there is a single right-justified column, and the user merely specifies the number of field boxed above the horizontal summation line (there is just one field box below for the answer). This can likewise be used for addition, subtraction, and multiplication.

In the example depicted in FIG. 34, two polynomial expressions are to be added together. Accordingly, a polynomial addition object of three rows and seven columns is generated. More specifically, the polynomial addition object 1350 of FIG. 34 includes polynomial value rows 1352 and 1354, and polynomial summation row 1356. Polynomial summation row 1356 is separated from the last polynomial value row 1354 by the horizontal summation symbol (line) 1357.

Software governing the algebraic addition object can be provided to restrict user input of objects into even numbered boxes (i.e., when numbering the boxes in any given row from left to right) to being either addition, subtraction or equivalence objects. That is, the software can restrict objects in fields between polynomial terms to being filled with only an addition, subtraction or equivalence objects. The expressions in each of the boxes can be automatically center-justified to facilitate alignment of all contents within any given column.

When the expression addition object is generated, the fields (boxes) can be highlighted with surrounds (as indicated in FIG. 34). The surrounds can be removed when the cursor moves from one row to a next row, or they can be removed when the cursor is no longer in a field nested in the object, or when a pointing device is not hovering over the object. There can also be a surround demarking the entire object that can be removed when the cursor is no longer in a field nested within the object, or when a pointing device is not hovering over the object. This can be useful, for example, to distinguish two such objects that are identical and that are juxtaposed side-by side. A surround demarking the entire object can also be used to add or remove rows or columns by dragging its sides by means of a pointing device. The horizontal summation line can be automatically reformatted to extend from the first non-empty column to the last non-empty column. The surrounds and the full-length horizontal summation line can be displayed when the object is empty, in order to indicate its presence.

Dynamic Cyclic Menus and Alternating Horizontal and Vertical Menus

The current disclosure also provides for a user interface having improved cyclic menu presentations, and including two-dimensional cyclic menu presentations and operations. In the prior art, two-dimensional menus are known (here, two dimensional can mean that there is navigation either vertically or horizontally in one level of a menu, while navigation in the orthogonal direction is between menu levels—there can also be more than two menu levels, with the different menu levels oriented in the same direction). Typically in the prior art a primary-level (or first level) menu is presented to a user on a graphical interface as a horizontal bar offering a primary-level of menu options (e.g., in Adobe Acrobat 8 Professional, the primary-level of menu options presented in the horizontal menu are "File", "Edit", "View", "Document", "Comments", "Forms", "Tools", "Advanced", "Window" and "Help"). In other applications, the primary-level menu is presented to the user as a matrix of options on a touch screen, as for example in the Apple iPhone or iPod. In either event, selection of any primary-level menu option typically generates a vertical menu for the user to select from on the graphical user interface.

Dynamic Cycling Menus

Vertical menu systems of the prior art typically allow a user to scroll up or down the menu using respective up and down direction keys, moving a highlight bar over the menu options as the user scrolls through the options. During such scrolling, the menu remains static, and only the highlight bar moves. Once the end of a menu is reached, continued scrolling causes the highlight bar to move back to the top menu item (and, conversely, once the top of a menu is reached, continued scrolling causes the highlight bar to move back to the bottom menu item). In general, graphical user interface menus of the prior art remain static, while only the highlight bar is moved.

The current disclosure provides for dynamic menu bars. That is, rather than the highlight bar being the only moveable element in a menu, the menu can also move relative to the highlight bar. In a first variation, once the highlight bar reaches the last menu option, rather than moving the highlight bar back to the first menu option, the highlight bar stays stationary, and the menu bar scrolls past the highlight bar to present the first menu option to the highlight bar. (And, conversely, once the highlight bar reaches the first menu option, rather than moving the highlight bar back to the last menu option, the highlight bar stays stationary, and the menu bar scrolls past the highlight bar to present the last menu option to the highlight bar.) Scrolling of the menu options past the stationary highlight bar thus continues so long as the highlight bar is located either at the upper-most limit or lower-most limit of the displayed menu (and the user continues to select either respective up or down scrolling through the menu options). In one variation a user can select a scroll-lock function (e.g., by way of a "ScrlLk" keyboard option), in which case the highlight bar will always remain static, and the menu will move dynamically with respect to the static highlight bar in response to a user's commands for up and down movement (via the keyboard, mouse or other GUI device) of the highlight bar. It will be appreciated that this same methodology can be equally applied to horizontal menus with respect to left-right movement of the menu bar relative to a static highlight bar, as well as to both vertical and horizontal menus. These methods can be implemented through a series of computer executable instructions (i.e., a program) using a computer or processor, and displaying the results graphically to a user (as generated by the computer or processor) on a graphical user interface and/or display screen.

For example, with reference to FIG. 26, if a user opens the graph-object menu 1230, places a pointing device (as, for example, by using a computer mouse device) on "Circle", then the selection "Circle" is highlighted. When the user thereafter scrolls down menu 1230 (e.g., using a down-arrow key on a keyboard), upon reaching the last selection ("X=") and thereafter continuing to press the down-arrow key, the last box (or line) in the menu remains highlighted, but the list of menu items begin to cycle past the highlighted last box, beginning with "Y=" (i.e., the description of the first line or box in the menu) and continuing on down the menu. Likewise, if the user scrolls up in the menu 1230, upon reaching the first box ("Y="), the first box remains highlighted, and the list of menu items begin to scroll past the highlighted first box, beginning with the last menu item ("X=") and proceeding upward through the menu from there. Further, if the user has engaged a scroll-lock function for the keyboard and a menu item is highlighted, then the highlighted box (or line) remains stationary, and the list of menu items move past the stationary highlighted box (or line) according to up- or down-arrow instructions as entered by the user via the keyboard (or equivalent instruction entry device).

Further, these features can be implemented on a gesture-driven touch screen, as for example on the Apple iPhone. In this embodiment once a user reaches the bottom (or end) of a list of items (e.g., a list of contacts, which can require several screen displays to present in its entirety), continued "down" gestures on the screen will cause the list of contacts to be displayed starting with the top of the list and continuing downward therefrom (or, alternately, once a user reaches the top (or beginning) a list of items continued "up" gestures on the screen will cause the list to be displayed starting with the bottom of the list and continuing upward therefrom).

Alternating Horizontal and Vertical Menus

In an additional embodiment the present disclosure provides for a graphical user interface which includes a menu presentation and selection program which presents menus to a user in alternating horizontal and vertical directions. In one example, if the first level menu is presented to the user via the graphical interface in a vertical format, then a selection of any one of the menu items in that first vertical menu presents to the user a secondary menu of items in a horizontal format. Then, when a user selects one of the menu items in the second menu, a third level menu can be opened which presents further menu items to the user in a vertical format. This method of presenting alternating horizontal and vertical menus can continue until all of the potential sub-menus which can be presented to a user for the particular situation have been exhausted. Further, the lowest level of menu selection can open a data entry window configured for that menu item. An example of a two-dimensional menu system is given by FIGS. 23B and 26 in combination. In FIG. 26B the horizontal main menu (not numbered) includes, from left to right, the options of "Editor", "File", Edit", "View", "Graph" and "Help". If horizontal main menu item "Graph" is selected (e.g., by c=placing a pointing device over the "Graph" icon and selecting the "Graph" menu item), then the vertical "Graph" submenu 1230 of FIG. 26 is presented to the user via the user display device. Further, as depicted in FIG. 26, the graph menu can offer data entry windows (1236). In this example the primary menu (1230, FIG. 26) is vertical, and located on the left side of the data entry window 1236. A secondary menu (1240) can be horizontal, and aligned along the top of the data entry window 1236. Any given primary menu includes at least one item, which can be highlighted by placing a pointing device over the item (or by making a specific selection of the menu item as, for example, by performing a mouse-click operation) so that its secondary menu can appear, and consequently at least one secondary menu item will be highlighted, with any available data entry window configured for that secondary menu item. (It is also possible to have only one item in the secondary menu.) Control items within a menu can change the options in that menu itself. For example, if an integral object is chosen (using a menu item) to be a definite integral rather than an indefinite integral, additional menu items can be added to allow input of upper and lower limits of integration. Navigation through the primary (vertical) menu is vertical, while navigation through the secondary (horizontal) menu is horizontal. The menus can each be implemented as cyclical, and if they both cycle, then the controls can be thought of as lying on the direct product of two circles (i.e. on a torus). Each secondary menu item can have data entry window controls that can themselves be navigated through horizontally and/or vertically. In implementation horizontal navigation through the data entry window can also control navigation through the secondary (horizontal) menu, while vertical navigation through the data entry window can also control navigation through the primary (vertical) menu. Secondary menu items can be quite disparate, including symbolic fields, numeric fields, checkboxes, ordinary buttons, radio buttons, etc. Secondary menu items can also themselves be menus, whether arranged horizontally or vertically or in a matrix fashion. Horizontal navigation through a secondary menu item that is in a matrix format menu can simply be left or right movement of a highlight, with that movement controlled by respective left or right directional keys (or equivalent counterparts). In contrast to this, a matrix object in a symbolic field secondary menu item can be navigated through (i.e., traversed) using the left or right directional keys (or equivalent counterparts) to produce cursor movement that follows a slot sequence determined by an infix entry process. Navigating to the right end of a data entry window (using the right directional key, for example) and continuing to navigate to the right can navigate to the next menu item (on the right, if there is one) of the secondary menu, which can reconfigure the data entry window. For this reason, in this case even though the secondary menu can be cyclical, it is not necessary that a secondary menu item that itself is a menu also be cyclical (unless the secondary menu has only the single item which is a menu itself). This traversing of controls can be different from traversing symbolic expressions, where navigation is generally from one symbolic field into another and always involving cursors, and not highlights (selections). On the other hand, the secondary menu and its menu items are analogous to a non-primitive object and its fields, respectively. Vertical navigation can change the primary menu item, and thus the secondary menu item associated with it. This change need not be immediate. For example, when navigating vertically through a symbolic expression, the change can occur when the top or bottom of the expression is reached. This is analogous to navigating vertically through multi-line mathematical documents. When a primary menu item is selected, there can be a default item selected from its associated secondary menu. (The menu program can be configured such that there is always one primary menu item selected or highlighted.) There can also be defaults selected for such items as radio buttons. When navigating through the secondary menu using an edit-enter command (such as those described above), a selection highlight can go to the checked item in a radio button control (for example), and the cursor can go to the end of the symbolic expression in the case of a symbolic field input control. This can also be accomplished by means of fast right and left directional controls. (Analogous controls can also be implemented to speed vertical navigation through mathematical documents and expressions as well as menu items. This can also be used to navigate the vertical menu.) This type of layout provides a systematic means for navigation through disparate sets of controls for such things as graph objects, symbolic solvers, and conversion features. This can be generalized as follows. Two orthogonal menus are located on adjacent edges of an input window. These menus can comprise a fixed main menu, and a configurable secondary menu. Each item of the main menu can have an associated secondary menu configuration (each such configuration being essentially a submenu of the associated main menu item). Navigation through the menus can be controlled by direct use of the menu items, or by navigation through the input window. A secondary menu configuration can also consist of a single item. Navigation through the main menu can be controlled by navigation in a direction aligned with the main menu. For each main menu item, navigation through the associated secondary menu configuration (submenu) can be controlled by navigation in a direction aligned with the secondary menu. Thus, the two orthogonal menus can be controlled by means of navigation through the entry window in orthogonal directions.

Methods to be Performed by Accompanying Apparatus

All of the methods provided for herein are intended to be performed by apparatus (such as a computer or an electronic data processor) which is configured to receive instructions from a user, and to respond thereto via a series of computer-executable steps (e.g., a program) stored on a computer-readable medium which can be accessed by the computer or processor. Further, the apparatus (computer or processor) provided for herein for performing the disclosed methods is configured to generate an output (such as generating a display, or storing data in computer readable memory) in response to (i) receiving input from the user, and (ii) performing the indicated method(s) as governed by the series of computer-executable steps. The apparatus for performing the methods can be configured as a distributed system, including a central server on which the series of computer-executable steps can be stored for access via a remote user device. The remote user device can include a user interface (including a display device and a user input device), a processor, and computer readable memory which can be accessed via the processor.

We claim:

1. An apparatus comprising:
   a processor;
   a computer readable memory;
   a user interface to receive user inputs and to display outputs to a user; and wherein:
   the computer readable memory contains a series of computer-executable instructions to be executed by the processor which enable the formulation of a mathematical expression by the user via the user interface, the mathematical expression comprising a selection of objects from a library of object types contained in the computer readable memory, the object types comprising primitive objects and non-primitive objects, wherein non-primitive objects have at least one field which in turn can host additional objects, and primitive objects have no fields, and wherein:
   the mathematical expression formulated by the user is defined by a single computer readable data structure which is generated automatically by the series of computer-executable instructions in response to the user inputs, and is stored in the computer readable memory;
   each object and each field is defined by a mathematical significance assigned thereto within the single computer readable data structure;
   the single computer readable data structure combines functions of a content tree data structure, and of a presentation tree data structure, for the mathematical expression;
   the single computer readable data structure contains presentation data sufficient to enable complete, automatic formatting of the mathematical expression for the display;
   the single computer readable data structure contains content data sufficient to enable automatic computation of the mathematical expression by the processor;
   the user interface enables the user to edit the mathematical expression;

editing of the mathematical expression by the user via the user interface results in automatic modification of the single computer readable data structure; and the series of computer-executable instructions include a series of steps to identify the user inputs with at least some of the objects, and to display the mathematical expression defined by the single computer readable data structure via the display.

2. The apparatus of claim 1 and wherein the computer readable data structure further includes slot identifiers which identify slots within the fields, the slots being representative of positions where the user can place a cursor within the mathematical expression when the mathematical expression is displayed on the user interface.

3. The apparatus of claim 1 and wherein:
the objects comprise host objects and guest objects;
the single computer readable data structure uniquely identifies each object and each field, and includes pointers to define nesting of the objects and the fields in the mathematical expression; and
the pointers comprise backward pointers which identify the host object for each guest object.

4. The apparatus of claim 3 and wherein:
the fields comprise host fields which contain guest objects; and
the pointers comprise backward pointers which identify the host field for each guest object.

5. The apparatus of claim 3 and wherein the pointers comprise forward pointers which identify the guest objects for each host object.

6. The apparatus of claim 3 and wherein:
the fields comprise host fields which contain guest objects; and
the pointers comprise forward pointers which identify the guest objects for each host field.

7. The apparatus of claim 1 and wherein the series of computer-executable instructions include a series of steps to calculate nesting counts which count numbers of nestings of at least one of objects or fields within different types of objects or fields.

8. The apparatus of claim 1 and wherein the series of computer-executable instructions include a series of steps to calculate nesting counts which count numbers of types of nestings subsequent to a particular type of nesting.

9. The apparatus of claim 1 and wherein the series of computer-executable instructions include a series of steps to transform the single computer readable data structure into a content tree format for use with a processor-based mathematical computation system.

10. The apparatus of claim 1 and wherein the series of computer-executable instructions include a series of steps to transform a content tree format for use with a processor-based mathematical computation system into the single computer readable data structure.

11. The apparatus of claim 2 and wherein:
the objects comprise host objects and guest objects;
the single computer readable data structure is capable of representation by an object-field diagram comprising a primary sequence of said objects, subsequences of which are organized into the fields, and for each non-primitive object its fields are ordered with respect to an infix entry sequence;
the object field diagram further identifies the slots;
indices are assigned to the objects which give the order of the objects as entered by the user using the infix entry sequence; and
the infix entry process defines a slot sequence of the slots.

12. The apparatus of claim 11 and wherein:
each object has an associated object slot, an object and its associated object slot defining an object segment;
for each field there is a field slot at one end of the field; and
for any object in the field the object slot is on the side of the object segment that is facing away from the field slot.

13. The apparatus of claim 1 and wherein the series of computer-executable instructions include a series of steps to identify juxtapositions of objects where an implicit multiplication operation will occur when the mathematical expression is presented for calculation, and to insert an implicit multiplication object between the juxtaposed objects.

14. The apparatus of claim 1 and wherein the series of computer-executable instructions include a series of steps to identify if a first object within any field was entered by the user as a negative sign, and if so, to interpret the negative sign as a unary negative, otherwise the negative sign is interpreted as a binary negative.

15. The apparatus of claim 1 and wherein the series of computer-executable instructions include a series of steps to identify if a first object within any field was entered by the user as a negative sign, and if so, to format the minus sign as a unary negative, otherwise the negative sign is formatted as a binary negative.

16. The apparatus of claim 2 and wherein the series of computer-executable instructions include a series of steps to:
identify erroneous syntax within the mathematical expression comprising one of: incorrect juxtaposition of objects based on their respective assigned mathematical significance; and an invalid object located at one of a beginning of a field or an end of a field;
identify from among the slots a proximal slot which is located proximate the erroneous syntax; and
generate a visual cue at the proximal slot via the user interface.

17. The apparatus of claim 16 and wherein the series of computer-executable instructions include a series of steps to generate a message, and to display the message on the user interface, describing the erroneous syntax causing the visual cue to be generated.

18. The apparatus of claim 16 and wherein the series of computer-executable instructions include a series of steps to remove the visual cue when a cursor driven by the user interface is placed in the slot at the location of the erroneous syntax.

19. The apparatus of claim 1 and wherein the series of computer-executable instructions include a series of steps to:
identify erroneous syntax within the mathematical expression comprising an invalid numeric string; and
generate a visual cue identifying the invalid numeric string.

20. The apparatus of claim 2 and wherein the series of computer-executable instructions include a series of steps to enable the user to place a cursor within any slot via the user interface, and to thereafter select only a group of contiguous objects in the field hosting that slot.

21. The apparatus of claim 2 and wherein the series of computer-executable instructions include a series of steps to enable the user to place a cursor within any slot via the user interface, and to thereafter select portions of the mathematical expression while the cursor remains stationary in that slot.

22. The apparatus of claim 21 and wherein the series of computer-executable instructions further include a series of steps to limit the selection to portions of the mathematical expression having the stationary cursor in a slot at one end of the portion.

23. The apparatus of claim 1 and wherein:
the objects and fields representing the mathematical expression are all contained in a root field;
for every field there is a uniquely defined object-field sequence, the object-field sequence having:
a first term which is an empty selection;
a second term comprising the field itself; and
if the field is not the root field a third term comprising the non-primitive object to which the field belongs; and
the selection sequence continues with additional terms, alternating between fields and non-primitive objects containing them until the selection sequence terminates with the selection of the root field; and
the user interface allows the user to optionally select one of more or less of the mathematical expression using respective select-more and select-less functions, and wherein:
the select-more function selects the smallest term of a first subsequence of the object-field sequence that contains a current selection but is not equal to it; and
the select-less function selects the largest term in a second subsequence of the object-field sequence that is contained by the current selection but is not equal to it.

24. The apparatus of claim 23 and wherein:
the single computer readable data structure further includes slot identifiers which identify slots within the fields, the slots being representative of positions where the user can place a cursor within the mathematical expression when the mathematical expression is displayed on the user interface; and
the series of computer-executable instructions include a series of steps to enable the user to place a cursor within any slot via the user interface, and to thereafter select portions of the mathematical expression while the cursor remains stationary in that slot.

25. The apparatus of claim 23 and wherein the user interface comprises a pointing device having at least one pointing device control, and the series of computer-executable instructions comprise a series of steps to allow the user to operate the select-more function by repeated engagement of the pointing device control.

26. The apparatus of claim 1 and wherein the series of computer-executable instructions comprise instructions to enable editing by the user of a pre-existing mathematical expression stored in the computer readable memory.

27. The apparatus of claim 12 and wherein:
the objects comprise host objects and guest objects;
one or more contiguous objects and their associated object slots are defined as a segment of a field; and
the series of computer-executable instructions include a series of steps to replace one segment of a field corresponding to a guest object of that field with another segment comprising one of the fields of that guest object.

28. The apparatus of claim 1 and wherein each object has an associated slot which is representative of a potential cursor position, and one or more contiguous objects and their associated slots are defined as a segment of a field, and the series of computer-executable instructions include a series of steps to allow the user to select one segment of a field, to save the selected segment of the field to the memory, and if the mathematical sub-expression corresponding to the selected segment is capable of being calculated numerically, to automatically calculate the numerical value and save it in the memory.

29. The apparatus of claim 28 and wherein the series of computer-executable instructions to allow the user to select one segment of a field, and then as a result of a single instruction entered by the user via the user interface, the selected segment of the field is saved to the memory, and if the mathematical sub-expression corresponding to the selected segment is capable of being calculated numerically, a numerical value is automatically calculated and saved in the memory.

30. The apparatus of claim 28 and wherein and wherein the numerical value saved in memory is assigned a register identification displayed to the user indicating a register in the memory where the numerical value is saved, and the user interface allows the user to enter the register identification in the mathematical expression as an object.

31. The apparatus of claim 1 and wherein the series of computer-executable instructions to display the mathematical expression represented by the single computer readable data structure via the display include a series of steps to reformat the mathematical expression on the display as the mathematical expression is modified by the user.

32. The apparatus of claim 31 and wherein and wherein the objects are arranged in the data structure in a sequential order according to an infix entry process defined by an infix entry order, and the series of steps to reformat the mathematical expression on the display performs the formatting on at least one of the fields or the objects in reverse of the infix entry order.

33. The apparatus of claim 1 and wherein the series of computer-executable instructions to display the mathematical expression represented by the single computer readable data structure via the display further includes a series of steps to display lines on the display representative of lined paper, and to align selected components of the mathematical expression with the lines on the display.

34. The apparatus of claim 33 and wherein the objects comprise host objects and guest objects, and the lines displayed on the display device are equally spaced-apart horizontal lines, and every field whose primitive guest objects are to be displayed in a full-sized format has an associated main horizontal line amongst the lines, with all objects comprising primitive objects aligned in a space between the main line and a line immediately above it, and fractions that are guest objects of that field have their fraction lines drawn along the main line.

35. The apparatus of claim 11 and wherein and wherein the objects comprise host objects and guest objects, and the user interface allows a user to perform a backspace operation which reverses the infix entry sequence for guest objects of the non-primitive object in one of whose fields the cursor is located, sequentially removing primitive objects which precede the cursor, and once the cursor reaches a first slot with respect to the slot sequence of the slots contained in the fields of the host object in which the cursor is currently located, backspacing is disabled if the non-primitive object still contains any guest objects.

36. The apparatus of claim 35 and further wherein:
the mathematical expression is contained in a root object;
if the root object has no further guest objects, it is termed an empty root object; and
if the host object is not the empty root object the host object is removed, and if the host object is the empty root object the backspace operation is disabled.

37. The apparatus of claim 11 and wherein the objects comprise host objects and guest objects, and the user interface allows a user to perform a backspace operation which reverses the infix entry sequence for guest objects of the non-primitive object in one of whose fields the cursor is located, sequentially removing primitive objects which precede the cursor, and once the cursor reaches a first slot with respect to the slot sequence of the slots contained in the field in which the cursor is currently located, backspacing is disabled if the field still has any guest objects.

38. The apparatus of claim 11 and wherein the objects comprise host objects and guest objects, and the user interface allows a user to perform a delete operation which follows the infix entry sequence for guest objects of the non-primitive object in one of whose fields the cursor is located, sequentially removing primitive objects which follow the cursor, and once the cursor reaches a last slot with respect to the slot sequence of the slots contained in fields of the non-primitive object in which the cursor is currently located, deleting is disabled if the non-primitive object still contains any guest objects.

39. The apparatus of claim 38 and wherein and wherein:
the mathematical expression is contained in a root object;
if the root object contains no further objects, it is termed an empty root object; and
if the host object is not the empty root object the non-primitive object is deleted, and if the non-primitive object is the empty root object the backspace operation is disabled.

40. The apparatus of claim 11 and wherein and wherein the objects comprise host objects and guest objects, and the user interface allows a user to perform a delete operation which follows the infix entry sequence for guest objects of the non-primitive object in one of whose fields the cursor is located, sequentially removing primitive objects which follow the cursor, and once the cursor reaches a last slot with respect to the slot sequence of the slots contained in the field in which the cursor is currently located, deleting is disabled if the field still has any guest objects.

41. The apparatus of claim 2 and wherein the user interface comprises a plurality of user controls to enable a user to select portions of the mathematical expression and to edit the mathematical expression, and wherein the user controls are selectively disabled based on at least one of cursor position, a current selection, and rules contained in the series of computer-executable instructions.

42. The apparatus of claim 41 and wherein the user controls are selected from the group consisting of keys on a keyboard, icons on a display device, a microphone and voice recognition software, a digital pen interface and handwriting recognition software, and a gesture-driven touch screen.

43. The apparatus of claim 41 and wherein and wherein the user interface further comprises a display device, and the user controls comprise icons displayed on the display device, and selected icons can be changed to provide a visual cue indicating whether the icon is currently enabled or currently disabled.

44. The apparatus of claim 2 and wherein one or more contiguous objects and their associated slots are defined as a segment of a field, the user interface comprises a display device and a pointing device, a control to enable a paste function to allow a user to insert a segment from the memory device at one of the slots, and wherein the series of computer-executable instructions include a series of steps to determine a proximal slot for a current position of the pointer, and if insertion of the segment into the proximal slot creates an expression that is not prohibited by the series of computer executable instructions, to enable the insertion, and if not, to generate a visual cue on the user display.

45. The apparatus of claim 2 and wherein the user interface comprises a display device and a pointing device to allow the user to move a visual display pointer, over the display device, and wherein the series of computer-executable instructions include a series of steps to determine a proximal slot for a current position of the visual display pointer, and to provide via the display device a visual cue showing the extent of the field hosting the proximal slot.

46. The apparatus of claim 1 and wherein:
the user interface includes a display device; and
the series of computer-executable instructions include a series of steps to enable the user to select one of a field or non-primitive object, and thereafter to display on the display device one or more enabled object menus based on the mathematical significance assigned to selected item.

47. The apparatus of claim 1 and wherein the series of computer-executable instructions include a series of steps to enable the user to select a non-primitive object, and the user interface allows a user to replace the selected object with a new non-primitive object, the new non-primitive object having at least one field whose contents are the same as a field of the selected object.

48. The apparatus of claim 12 and wherein one or more contiguous objects and their object slots are defined as a segment of a field, and the series of computer-executable instructions include a series of steps to enable the user to select a non-primitive object, to remove the corresponding object segment, and to replace it with another segment comprising one of the fields of the primitive object prior to its deletion.

49. The apparatus of claim 1 and wherein the user interface comprises a display device, and the library of object types comprises a space object which is defined by a space object width, to allow a user to vertically align objects in the mathematical expression when the mathematical expression is displayed on the display device.

50. The apparatus of claim 49 and wherein the series of computer-executable instructions include a series of steps to provide a visual cue on the display device to indicate an extent of the space object.

51. The apparatus of claim 1 and wherein the user interface comprises a display device, and the library of object types comprises a textbox object.

52. The apparatus of claim 51 and wherein the series of computer-executable instructions include a series of steps to provide a visual cue on the display device to indicate an extent of the textbox object.

53. The apparatus of claim 1 and wherein the library of object types comprises a graph object.

54. The apparatus of claim 1 and wherein the library of object types comprises a table of values object.

55. The apparatus of claim 1 and wherein the user interface comprises a display device, the memory device contains an exemplary mathematical expression, and the series of computer-executable instructions include a series of steps to animate on the display a methodology for entering the mathematical expression using the user interface.

56. The apparatus of claim 1 and wherein the user interface comprises a display device, the memory device contains an exemplary mathematical problem, and the series of computer-executable instructions include a series of steps to animate on the display a methodology for solving the mathematical problem using the user interface.

57. The apparatus of claim 1 and wherein the user interface comprises a display device, and the series of computer-executable instructions include a series of steps to allow multiple pages of content to be presented on the display device in an offset overlapping fashion, and to allow the user to selectively increase and decrease an amount of each page displayed by moving at least one of a top edge or a bottom edge of one of the pages over content of another page.

58. The apparatus of claim 1 and wherein the mathematical expression is a first mathematical expression, and user interface comprises a display device and a user control to allow a user to begin entry of a second mathematical expression while the first mathematical expression is being displayed on the display device.

59. An apparatus comprising:
a processor;
a computer readable memory;
a user interface to receive user inputs and to display outputs to a user; and wherein:
the computer readable memory contains a series of computer-executable instructions to be executed by the processor which enable the formulation of a mathematical expression by the user via the user interface, the mathematical expression comprising a selection of objects from a library of object types contained in the computer readable memory, and wherein:
the mathematical expression formulated by the user is defined by a single computer readable data structure which is generated automatically by the series of computer-executable instructions in response to the user inputs, and is stored in the computer readable memory;
the single computer readable data structure combines functions of a content tree data structure, and of a presentation tree data structure, for the mathematical expression;
the single computer readable data structure contains presentation data sufficient to enable complete, automatic formatting of the mathematical expression for the display;
the single computer readable data structure contains content data sufficient to enable automatic computation of the mathematical expression by the processor;
the user interface enables the user to edit the mathematical expression;
editing of the mathematical expression by the user via the user interface results in automatic modification of the single computer readable data structure; and
the series of computer-executable instructions include a series of steps to identify the user inputs with at least some of the objects, and to display the mathematical expression defined by the single computer readable data structure via the display.

* * * * *